US012196163B2

(12) United States Patent
Harada et al.

(10) Patent No.: US 12,196,163 B2
(45) Date of Patent: Jan. 14, 2025

(54) FUEL INJECTION VALVE

(71) Applicant: DENSO CORPORATION, Kariya (JP)

(72) Inventors: Yuunosuke Harada, Kariya (JP); Kouichi Mochizuki, Kariya (JP); Keita Imai, Kariya (JP); Masaru Motoki, Kariya (JP); Jun Yamashita, Kariya (JP); Kouta Maekawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 17/955,322

(22) Filed: Sep. 28, 2022

(65) Prior Publication Data

US 2023/0016650 A1 Jan. 19, 2023

Related U.S. Application Data

(63) Continuation of application No. PCT/JP2021/013683, filed on Mar. 30, 2021.

(30) Foreign Application Priority Data

Mar. 31, 2020 (JP) ................................ 2020-063118
Mar. 26, 2021 (JP) ................................ 2021-053154

(51) Int. Cl.
*B05B 1/30* (2006.01)
*F02M 51/06* (2006.01)
*F02M 61/10* (2006.01)

(52) U.S. Cl.
CPC ........ *F02M 51/0671* (2013.01); *F02M 61/10* (2013.01); *F02M 2200/08* (2013.01)

(58) Field of Classification Search
CPC ....... F02M 2200/08; F02M 2200/8061; F02M 51/061; F02M 51/0682; F02M 47/027
USPC ....................................................... 239/585.1
See application file for complete search history.

(56) References Cited

U.S. PATENT DOCUMENTS

2003/0183201 A1 10/2003 Hans
2010/0001214 A1* 1/2010 Sakai .................. F02M 61/168 251/129.01
2015/0001318 A1 1/2015 Honjo
2016/0025051 A1 1/2016 Kromer et al.
2016/0025052 A1* 1/2016 Yasukawa .......... F02M 51/0671 239/585.1
2016/0265499 A1 9/2016 Shingu et al.
2017/0114764 A1 4/2017 Honjo
2019/0277237 A1* 9/2019 Imai ................... F02M 61/1886
(Continued)

FOREIGN PATENT DOCUMENTS

EP 2 570 648 3/2013
JP 2004-68600 3/2004
(Continued)

*Primary Examiner* — Long T Tran
*Assistant Examiner* — James J Kim
(74) *Attorney, Agent, or Firm* — Nixon & Vanderhye P.C.

(57) ABSTRACT

An upper housing is provided between a fixed core and a housing opposite to a nozzle hole with respect to a coil. The upper housing is configured to form a magnetic circuit with the fixed core and the housing. The upper housing has a first tapered surface formed on an outer peripheral wall and a first cylindrical surface formed on an inner peripheral wall. The housing has a second tapered surface that radially faces the first tapered surface. The fixed core has a second cylindrical surface that radially faces the first cylindrical surface.

14 Claims, 49 Drawing Sheets

(56) References Cited

U.S. PATENT DOCUMENTS

| | | | | |
|---|---|---|---|---|
| 2020/0165998 | A1* | 5/2020 | Miyake | F02M 51/0614 |
| 2020/0224621 | A1* | 7/2020 | Yamamoto | F02M 51/0682 |

FOREIGN PATENT DOCUMENTS

| | | |
|---|---|---|
| JP | 2010-169041 | 8/2010 |
| JP | 2010-185318 | 8/2010 |
| JP | 2010-203411 | 9/2010 |
| JP | 2018-25184 | 2/2018 |

* cited by examiner

FUEL INJECTION VALVE

CROSS REFERENCE TO RELATED APPLICATION

The present application is a continuation application of International Patent Application No. PCT/JP2021/013683 filed on Mar. 30, 2021, which designated the U.S. and claims the benefit of priority from Japanese Patent Applications No. 2020-063118 filed on Mar. 31, 2020 and No. 2021-053154 filed on Mar. 26, 2021. The entire disclosures of all of the above applications are incorporated herein by reference.

TECHNICAL FIELD

The present disclosure relates to a fuel injection valve.

BACKGROUND

Conventionally, a fuel injection valve has been used to inject fuel.

SUMMARY

According to an aspect of the present disclosure, a fuel injection valve includes components such as a nozzle portion, a housing, a needle, a movable core, a fixed core, and a coil.

BRIEF DESCRIPTION OF THE DRAWINGS

These and other objects and novel features of the present disclosure may be readily ascertained by reference to the following description and appended drawings in which.

DETAILED DESCRIPTION

Figure 1:
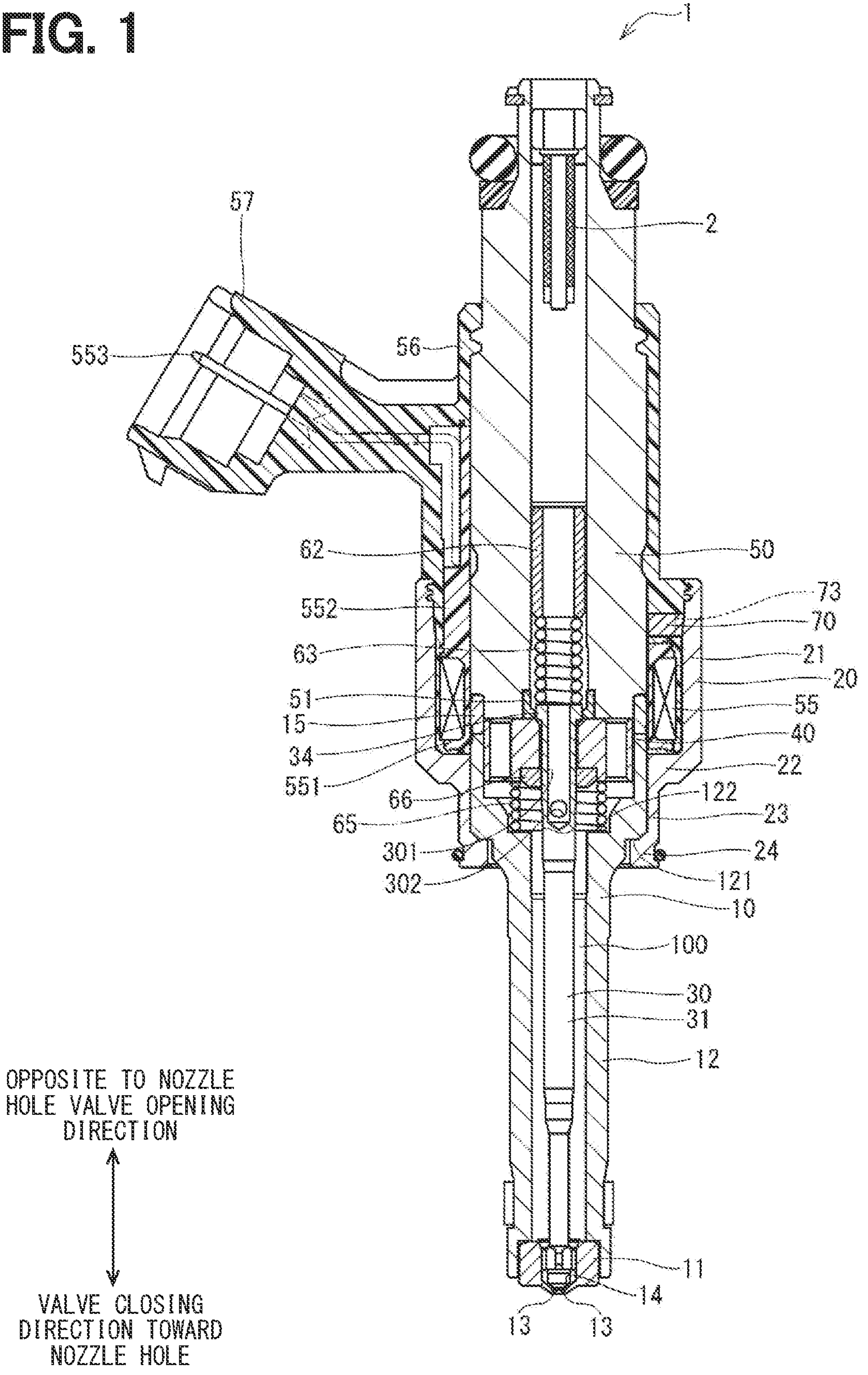
FIG. 1 is a sectional view illustrating the fuel injection valve according to a first embodiment.

Hereinafter, examples of the present disclosure will be described.

According to an example of the present disclosure, a fuel injection valve includes an upper housing between a fixed core and a housing, and, when a coil is energized, forms a magnetic circuit through the fixed core, the upper housing, and the housing. According to an example of the present disclosure, the fuel injection valve includes the upper housing provided between the fixed core and the housing and provided on an opposite side of the coil from the nozzle hole. The outer peripheral wall of the upper housing is screwed to the inner peripheral wall of the housing. The surface of the inner edge portion toward the nozzle hole is pressed against the stepped surface of the fixed core. The fixed core, the upper housing, and the housing may aim to form an efficient magnetic circuit having a small magnetic gap and a low magnetic resistance.

However, the fuel injection valve according to this example requires forming threaded portions on the outer peripheral wall of the upper housing and the inner peripheral wall of the housing. The upper housing needs to be assembled by tightening screws. It would be difficult to process and assemble the upper housing. Costs of processing and assembling the upper housing may increase.

An attempt may be made to press-fit the upper housing between the fixed core and the housing for the purpose of easily processing and assembling the upper housing. Specifically, both the inner peripheral wall and the outer peripheral wall of the upper housing may be press-fitted between the outer peripheral wall of the fixed core and the inner peripheral wall of the housing. However, it may be difficult to assemble the upper housing due to uneven clearances among the upper housing, the fixed core, and the housing.

Suppose one of the inner and outer peripheral walls of the upper housing is press-fitted to the outer peripheral wall of the fixed core or the inner peripheral wall of the housing. Then, a gap is generated between the other of the inner and outer peripheral walls of the upper housing and the inner peripheral wall of the housing or the outer peripheral wall of the fixed core. It may be difficult to form an efficient magnetic circuit having a small magnetic gap and a low magnetic resistance through the fixed core, the upper housing, and the housing. In this case, it may be difficult to efficiently generate an attractive force corresponding to the current applied to the coil. The energy required to drive the fuel injection valve may increase.

A fuel injection valve according to an example of the present disclosure comprises a nozzle portion, a housing, a needle, a movable core, a fixed core, a coil, and an upper housing. The housing is cylindrical and connected to an opposite side of the nozzle portion from the nozzle hole.

The needle can open and close the nozzle hole when the end of the needle separates from or abuts on the valve seat. The movable core is provided for the needle. The fixed core is cylindrically formed and is provided opposite to the nozzle hole with respect to the movable core. At least part of the fixed core in the axial direction is positioned radially inside the housing.

The coil is provided between the fixed core and the housing and, when energized, can attract the movable core along with the needle toward the fixed core. The upper housing is provided between the fixed core and the housing and provided on an opposite side of the coil from the nozzle hole and can form a magnetic circuit with the fixed core and the housing.

According to an example of the present disclosure, the upper housing has a first tapered surface and a first cylindrical surface. The first tapered surface is formed on one of the outer and inner peripheral walls. The first cylindrical surface is formed on an other of the outer and inner peripheral walls. One of the housing and the fixed core has a second tapered surface that radially faces the first tapered surface. An other of the housing and the fixed core has a second cylindrical surface that radially faces the first cylindrical surface.

Before assembling the upper housing, configure appropriate diameters for the first tapered surface, the second tapered surface, the first cylindrical surface, and the second cylindrical surface. When assembling the upper housing, insert the upper housing between the fixed core and the housing with respect to the coil opposite to the nozzle hole. Then, the upper housing can be deformed radially inward or outward while sliding the first tapered surface and the second tapered surface in the axial direction. The first cylindrical surface and the second cylindrical surface can be abutted and closely adhered to each other.

After the upper housing is assembled, the first tapered surface and the second tapered surface closely adhere to each other. The first cylindrical surface and the second cylindrical surface closely adhere to each other.

It is possible to form an efficient magnetic circuit having a small magnetic gap and a low magnetic resistance through the fixed core, the upper housing, and the housing. Therefore, it is possible to efficiently generate an attractive force corresponding to the current supplied to the coil and decrease the energy required to drive the fuel injection valve. Consequently, it is possible to reduce the power consumption of the fuel injection valve.

According to an example of the present disclosure, the upper housing includes an inner member and an outer member provided radially outside the inner member. The inner member has a first tapered surface formed on an outer peripheral wall and a first cylindrical surface formed on an inner peripheral wall. The outer member has a second tapered surface formed on the inner peripheral wall to radially face the first tapered surface and a second cylindrical surface formed on the outer peripheral wall. The fixed core has a third cylindrical surface that radially faces the first cylindrical surface. The housing has a fourth cylindrical surface that radially faces the second cylindrical surface.

Before assembling the upper housing, configure appropriate diameters for the first tapered surface, the second tapered surface, the first cylindrical surface, the second cylindrical surface, the third cylindrical surface, and the fourth cylindrical surface. When assembling the upper housing, for example, insert the inner member between the fixed core and the outer member with respect to the coil opposite to the nozzle hole while the outer member is inserted between the fixed core and the housing. Then, the inner member can be deformed radially inward to allow the first cylindrical surface and the third cylindrical surface to be abutted and closely adhered to each other while sliding the first tapered surface and the second tapered surface in the axial direction. The outer member can be deformed radially outward to allow the second cylindrical surface and the fourth cylindrical surface to be abutted and closely adhered to each other.

When assembling the upper housing, for example, insert the outer member between the inner member and the housing with respect to the coil opposite to the nozzle hole while the inner member is inserted between the fixed core and the housing. Then, the outer member can be deformed radially outward to allow the second cylindrical surface and the fourth cylindrical surface to be abutted and closely adhered to each other while sliding the first tapered surface and the second tapered surface in the axial direction. The inner member can be deformed radially inward to allow the first cylindrical surface and the third cylindrical surface to be abutted and closely adhered to each other.

After the upper housing is assembled, the first tapered surface and the second tapered surface closely adhere to each other. The first cylindrical surface and the third cylindrical surface closely adhere to each other. The second cylindrical surface and the fourth cylindrical surface closely adhere to each other.

It is possible to form an efficient magnetic circuit having a small magnetic gap and a low magnetic resistance through the fixed core, the upper housing, and the housing. Therefore, it is possible to efficiently generate an attractive force corresponding to the current supplied to the coil and decrease the energy required to drive the fuel injection valve. Consequently, it is possible to reduce the power consumption of the fuel injection valve.

According to the present example, the upper housing is composed of two members, the inner member and the outer member. This makes it possible to reduce the radial size or the width of each member. When the upper housing is assembled, the inner member and the outer member of the upper housing can be easily deformed radially. This makes it possible to reduce assembling loads on the upper housing and improve assembly efficiency. After the upper housing is assembled, the first tapered surface more closely adheres to the second tapered surface. The first cylindrical surface more closely adheres to the third cylindrical surface. The second cylindrical surface more closely adheres to the fourth cylindrical surface.

According to an example of the present disclosure, the upper housing includes a bottom portion, an inward extended portion, and an outward extended portion. The inward extended portion is formed to extend from an inner edge portion of the bottom portion in the axial direction of the bottom portion. The outward extended portion is formed to extend from an outer edge portion of the bottom portion in the axial direction of the bottom portion.

Before assembling the upper housing, appropriately configure the inner diameter of the inward extended portion and the outer diameter of the outward extended portion of the upper housing, the outer diameter of the fixed core, and the inner diameter of the housing. When assembling the upper housing, insert the upper housing between the fixed core and the housing with respect to the coil opposite to the nozzle hole. Then, the inner peripheral wall of the inward extended portion and the outer peripheral wall of the fixed core can axially slide. The outer peripheral wall of the outward extended portion and the inner peripheral wall of the housing can axially slide. Meanwhile, the inward extended portion can be deformed radially outward. Alternatively, the outward extended portion can be deformed radially inward.

After the upper housing is assembled, the inner peripheral wall of the inward extended portion and the outer peripheral wall of the fixed core closely adhere to each other. The outer peripheral wall of the outward extended portion and the inner peripheral wall of the housing closely adhere to each other.

It is possible to form an efficient magnetic circuit having a small magnetic gap and a low magnetic resistance through the fixed core, the upper housing, and the housing. Therefore, it is possible to efficiently generate an attractive force corresponding to the current supplied to the coil and decrease the energy required to drive the fuel injection valve. Consequently, it is possible to reduce the power consumption of the fuel injection valve.

Embodiments of the fuel injection valve will be described based on the accompanying drawings. In the embodiments, substantially the same configuration parts are depicted by the same reference numerals and a detailed description is omitted for simplicity.

First Embodiment

FIG. 1 illustrates the fuel injection valve according to the first embodiment. A fuel injection valve 1 is used for a gasoline engine (hereinafter simply referred to as "engine") 80 as an internal combustion engine mounted on an unshown vehicle, for example. The fuel injection valve 1 injects gasoline as fuel and supplies it to the engine.

The fuel injection valve 1 includes a nozzle portion 10, a housing 20, a needle 30, a movable core 40, a fixed core 50, a coil 55, an upper housing 70, a spring 63, and a spring 65, for example.

The nozzle portion 10 includes a nozzle end portion 11 and a nozzle cylinder portion 12.

The nozzle end portion 11 is formed into a bottomed cylinder made of metal, for example. The nozzle end portion 11 includes a nozzle hole 13 and a valve seat 14. Multiple nozzle holes 13 are formed to pierce the bottom of the nozzle end portion 11 from the inside to the outside. The valve seat 14 is annularly formed around the nozzle holes 13 inside the bottom of the nozzle end portion 11.

The nozzle cylinder portion 12 is cylindrically formed and is made of a magnetic material such as metal. The nozzle cylinder portion 12 is provided integrally with the nozzle end portion 11 so that an inner peripheral wall at one end in the axial direction engages with an outer peripheral wall of the nozzle end portion 11. The nozzle cylinder portion 12 and the nozzle end portion 11 are joined by welding, for example.

The housing 20 is cylindrically formed and is made of a magnetic material such as metal. The housing 20 is connected to the nozzle portion 10 opposite to the nozzle hole 13.

Figure 2:
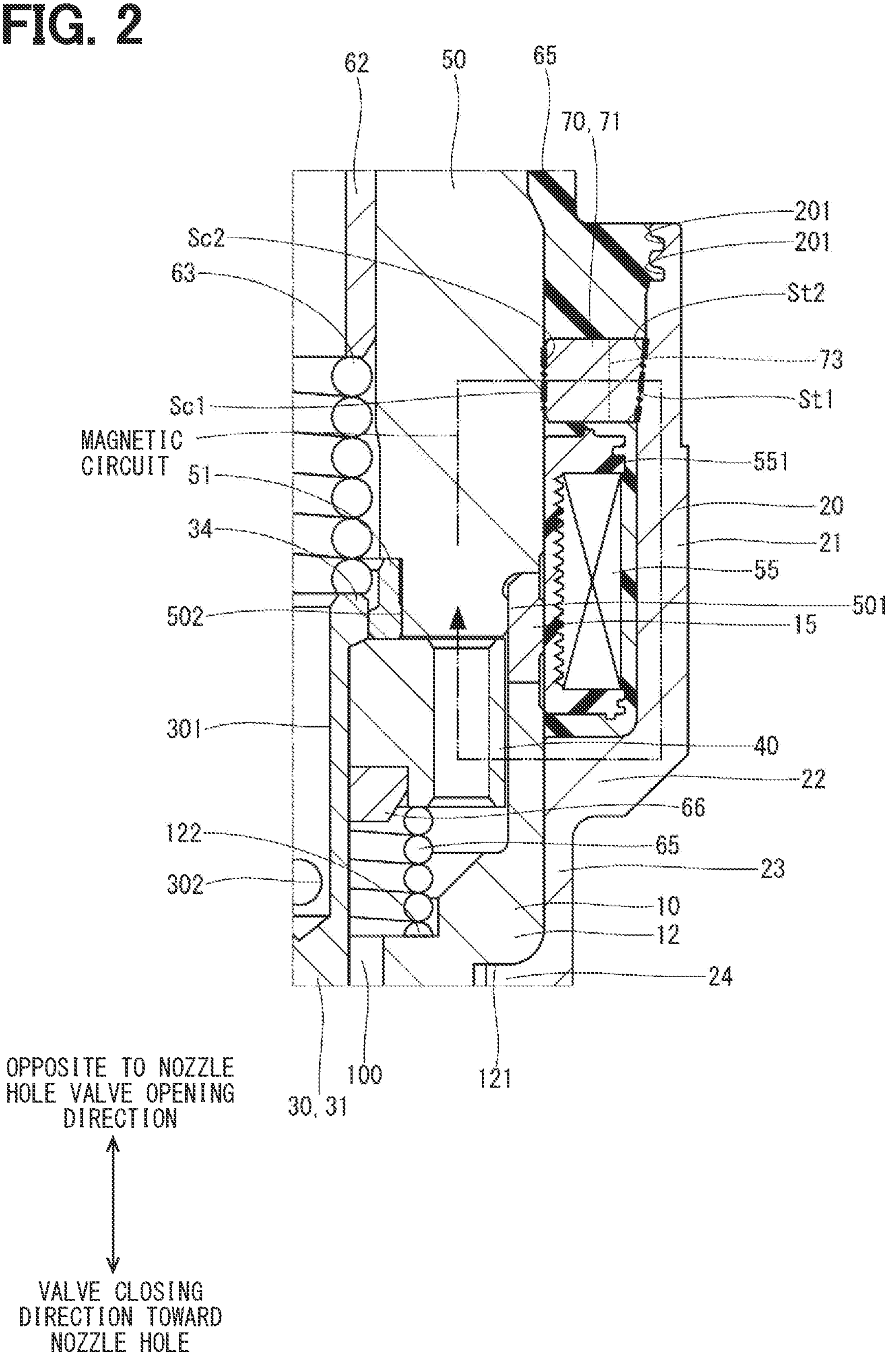
FIG. 2 is a sectional view illustrating an upper housing and the vicinity of the fuel injection valve according to the first embodiment.

More specifically, the housing 20 includes an outer cylinder portion 21, an outer annular portion 22, an inner cylinder portion 23, and an inner annular portion 24 (see FIG. 2).

The outer cylinder portion 21 is cylindrically formed. The outer annular portion 22 is annularly formed to extend radially inward from one end of the outer cylinder portion 21 in the axial direction. The inner cylinder portion 23 is cylindrically formed to extend from the inner edge of the outer annular portion 22 toward the side opposite to the outer cylinder portion 21. The inner annular portion 24 is annularly formed to extend radially inward from the end of the inner cylinder portion 23 opposite to the outer annular portion 22.

An annular housing recessed portion 201, radially recessed outward, is formed on the inner peripheral wall at the end of the outer cylinder portion 21 opposite to the outer annular portion 22. Two housing recessed portions 201 are formed in the axial direction of the outer cylinder portion 21.

An annular nozzle stepped surface 121 is formed on the outer peripheral wall opposite to the nozzle end portion 11 of the nozzle cylinder portion 12 of the nozzle portion 10. The housing 20 is provided to be connected opposite to the nozzle hole 13 of the nozzle cylinder portion 12 so that the end face of the inner annular portion 24 abuts on the nozzle stepped surface 121 and the inner peripheral wall of the inner cylinder portion 23 abuts on the outer peripheral wall of the nozzle cylinder portion 12.

The needle 30 is made of non-magnetic metal, for example. The needle 30 includes a needle body 31 and a flange portion 34.

The needle body 31 is formed into a rod. The flange portion 34 is annularly formed to extend radially outward from the end portion of the needle body 31. The needle 30 is provided inside the nozzle portion 10 to be able to axially reciprocate inside the nozzle cylinder portion 12 and the nozzle end portion 11.

The needle 30 is formed with an axial flow channel 301 and a radial flow channel 302. The axial flow channel 301 is formed to axially extend from the end face of the needle body 31 opposite to the nozzle end portion 11. The radial flow channel 302 extends radially from the needle body 31 and is formed to connect the axial flow channel 301 and the outer wall of the needle body 31. Fuel opposite to the nozzle end portion 11 with respect to the needle 30 can flow between the outer peripheral wall of the needle body 31 and the inner wall of the nozzle cylinder portion 12 via the axial flow channel 301 and the radial flow channel 302.

One end of the needle 30 corresponds to the end portion of the needle body 31 toward the nozzle end portion 11 and separates from the valve seat 14 (unseated) or abuts on the same (seated) to open and close the nozzle hole 13. Hereinafter, as appropriate, the direction to separate the needle 30 from the valve seat 14 is referred to as a valve opening direction. The direction to cause the needle 30 to abut on the valve seat 14 is referred to as a valve closing direction.

The movable core 40 is cylindrically formed and is made of a magnetic material such as metal. The movable core 40 is provided radially outside the needle body 31 to be able to move axially relative to the needle 30 toward the nozzle end portion 11 with respect to the flange portion 34. The flange portion 34 restrains the movable core 40 from moving relative to the needle 30 in the valve opening direction.

The fixed core 50 is cylindrically formed and is made of a magnetic material such as metal. The fixed core 50 includes a core recessed portion 501 and a core recessed portion 502. The core recessed portion 501 is annularly formed to be radially inward recessed from the outer peripheral wall at one end of the fixed core 50 in the axial direction. The core recessed portion 502 is annularly formed to be radially outward recessed from the inner peripheral wall at one end of the fixed core 50 in the axial direction.

The fixed core 50 includes a magnetic flux adjustment portion 15 and a sleeve 51.

The magnetic flux adjustment portion 15 is cylindrically formed and is made of non-magnetic metal, for example. The magnetic flux adjustment portion 15 is provided to engage with the core recessed portion 501. The magnetic flux adjustment portion 15 and the fixed core 50 are joined by welding, for example.

The sleeve 51 is cylindrically formed and is made of non-magnetic metal, for example. The sleeve 51 is provided to engage with the core recessed portion 502.

The fixed core 50 is provided opposite to the nozzle hole 13 with respect to the movable core 40. The end of the magnetic flux adjustment portion 15 opposite to the core recessed portion 501 is connected to the end of the nozzle cylinder portion 12 opposite to the nozzle end portion 11. The magnetic flux adjustment portion 15 and the nozzle cylinder portion 12 are joined by welding, for example.

The inner peripheral wall at the end of the sleeve 51 toward the nozzle hole 13 is slidable on the outer peripheral wall of the flange portion 34. The end face of the sleeve 51 toward the nozzle hole 13 can abut on the end face of the movable core 40 opposite to the nozzle hole 13.

A cylindrical adjusting pipe 62 is press-fitted inside the fixed core 50. The spring 63 is a coil spring, for example, and is provided between the adjusting pipe 62 inside the fixed core 50 and the needle 30. One end of the spring 63 abuts on the adjusting pipe 62. The other end of the spring 63 abuts on the needle 30. The spring 63 can press the needle 30 and the movable core 40 toward the nozzle hole 13 in the valve closing direction. The pressing force of the spring 63 is adjusted by the position of the adjusting pipe 62 with respect to the fixed core 50.

The coil 55 is cylindrically formed and is provided between the fixed core 50 and the housing 20. The coil 55 is formed by winding a conducting wire around a cylindrical bobbin 551 made of resin.

More specifically, the coil 55 and the bobbin 551 are provided between the outer and inner peripheral walls of the following, namely, the outer peripheral wall of the fixed core 50, the magnetic flux adjustment portion 15, and the nozzle cylinder portion 12 and the inner peripheral wall of the outer cylinder portion 21 of the housing 20 (See FIG. 2).

Figure 3:
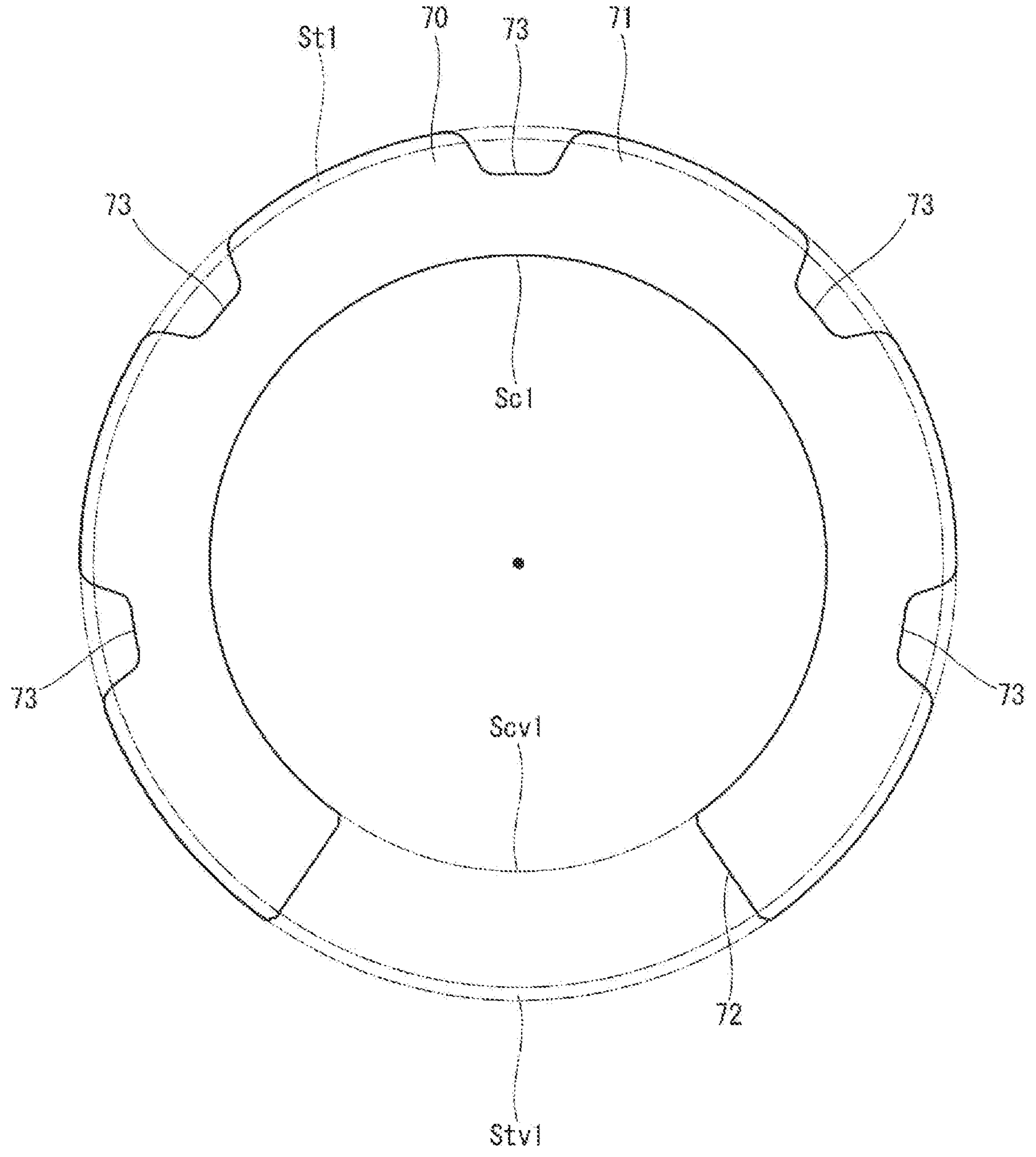
FIG. 3 is a plan view illustrating the upper housing of the fuel injection valve according to the first embodiment.

The upper housing 70 is approximately C-shaped and is made of a magnetic material such as metal (see FIG. 3). The upper housing 70 is provided between the fixed core 50 and the housing 20 opposite to the nozzle hole 13 with respect to the coil 55. The inner peripheral wall of the upper housing 70 closely adheres to the outer peripheral wall of the fixed core 50. The outer peripheral wall of the upper housing 70 closely adheres to the inner peripheral wall of the outer cylinder portion 21 of the housing 20.

The coil 55 is supplied with electric power (energized) to generate a magnetic force. When the coil 55 generates a magnetic force, a magnetic circuit is formed through the fixed core 50, the upper housing 70, the outer cylinder portion 21, the outer annular portion 22, the nozzle cylinder portion 12, and the movable core 40 except the magnetic flux adjustment portion 15 (See FIG. 2).

Consequently, a magnetic attractive force is generated between the fixed core 50 and the movable core 40. The movable core 40 is attracted along with the needle 30 toward the fixed core 50. The needle 30 moves in the valve opening direction. The end of the needle 30 separates from the valve seat 14 to open the valve. Then, the nozzle hole 13 is opened to inject fuel from the nozzle hole 13. The coil 55, when energized, can attract the movable core 40 toward the fixed core 50 and move the needle 30 opposite to the valve seat 14 in the valve opening direction.

When the magnetic attractive force attracts the movable core 40 toward the fixed core 50 (valve opening direction), the flange portion 34 of the needle 30 moves axially inside the sleeve 51. At this time, the outer peripheral wall of the flange portion 34 slides on the inner peripheral wall of the sleeve 51. Therefore, the sleeve 51 guides the axial reciprocation of the needle 30 at the end toward the flange portion 34.

When the magnetic attractive force attracts the movable core 40 toward the fixed core 50 (valve opening direction), the end face toward the fixed core 50 collides with the end face of the sleeve 51 toward the nozzle hole 13. The movable core 40 is thereby restrained from moving in the valve opening direction.

Consider stopping the energization of the coil 55 while the movable core 40 is attracted toward the fixed core 50. Then, the pressing force of the spring 63 presses the needle 30 and the movable core 40 toward the valve seat 14. The needle 30 moves in the valve closing direction. The end of the needle 30 abuts on the valve seat 14 to close the valve. Consequently, the nozzle hole 13 is closed.

The spring 65 is a coil spring, for example, and is provided so that one end abuts on the surface of the movable core 40 toward the nozzle hole 13 and the other end abuts on an annular nozzle stepped surface 122 formed on the inner peripheral wall of the nozzle cylinder portion 12 (See FIG. 2). The spring 65 can press the movable core 40 toward the fixed core 50 in the valve opening direction. The pressing force of the spring 65 is smaller than the pressing force of the spring 63. When the coil 55 is not energized, the needle 30 is pressed against the valve seat 14 by the spring 63 and the movable core 40 is pressed against the flange portion 34.

According to the present embodiment, the needle 30 is provided with a stopper 66. The stopper 66 is annularly formed and is made of non-magnetic metal, for example. The stopper 66 is press-fitted to the movable core 40 so that the inner peripheral wall engages with the outer peripheral wall of the needle body 31 toward the nozzle hole 13. The movable core 40 is axially movable relative to the needle body 31 between the flange portion 34 and the stopper 66. The stopper 66 abuts on the surface of the movable core 40 toward the nozzle hole 13, making it possible to restrain the movement of the movable core 40 in the valve closing direction.

As illustrated in FIG. 1, a mold portion 56 made of resin molds the periphery of the coil 55 and the bobbin 551, and the outer peripheral wall of the fixed core 50.

The fuel injection valve 1 includes a connector portion 57. The connector portion 57 and the mold portion 56 are integrally resin molded so that the connector portion 57 radially protrudes outward from the mold portion 56.

A terminal 553 is insert-molded into the connector portion 57 and the mold portion 56. The terminal 553 is made of a conductor such as metal. One end of the terminal 553 is connected to the coil 55 and the other end thereof is positioned inside the connector portion 57.

The end of the terminal 553 toward the coil 55 is molded by a bobbin extension portion 552. The bobbin extension portion 552 is formed integrally with the bobbin 551 to extend from the bobbin 551 toward opposite the nozzle hole 13 (see FIG. 1).

A fuel channel 100 is formed inside the fixed core 50, the magnetic flux adjustment portion 15, and the nozzle portion 10. The fuel channel 100 is connected to the nozzle hole 13.

Piping (unshown) is connected to the end of the fixed core 50 opposite to the nozzle hole 13. Fuel from a fuel supply source (fuel pump) flows into the fuel channel 100 via the piping. The fuel channel 100 guides the fuel to the nozzle hole 13.

The fuel flows into the fuel channel 100 from the end of the fixed core 50 opposite to the nozzle hole 13. Then, the fuel flows through the inside of the fixed core 50 and the adjusting pipe 62, through the axial flow channel 301 and the radial flow channel 302, between the needle 30 and the nozzle portion 10, and is guided to the nozzle hole 13.

A filter 2 is provided in the fixed core 50 at the end opposite to the nozzle hole 13. The filter 2 can collect foreign matters in the fuel flowing through the fuel channel 100.

The terminal 553 connects with an unshown electronic control unit (ECU). The ECU is a small computer including a CPU as a calculation portion, ROM and RAM as storage portions, and I/O as an input/output portion, for example. The ECU controls operations of an engine, instruments, and devices, for example, mounted on a vehicle and controls the travel of the vehicle based on information from various sensors installed on respective parts of the vehicle.

The ECU controls the energization of the coil 55 via the terminal 553 and thereby controls operations of the fuel injection valve 1 and the engine to control the vehicle. When the ECU energizes the coil 55, a magnetic attractive force is generated between the fixed core 50 and the movable core 40. The movable core 40 and the needle 30 move in the valve opening direction against the pressing force of the spring 63. The needle 30 is separated from the valve seat 14 to open the valve. The fuel in the fuel channel 100 is injected through the nozzle hole 13 into a combustion chamber of the engine outside the fuel injection valve 1.

The description below explains in detail the upper housing 70.

As shown in FIG. 3, the upper housing 70 includes a body 71, a cutout portion 72, and a recessed portion 73.

The body 71 is annularly formed and is made of a magnetic material such as metal. The cutout portion 72 is formed by partially removing the body 71 along its circumference. Consequently, the body 71 of the upper housing 70 is opened at a given part in the circumferential direction and is approximately C-shaped when viewed in the axial direction.

The recessed portion 73 is formed to be radially inward recessed from the outer peripheral wall of the body 71. Five recessed portions 73 are formed at equal intervals in the circumferential direction of the body 71. The recessed portions 73 formed in the body 71 can easily deform the body 71 in the radial direction.

The upper housing 70 has a first tapered surface St1 and a first cylindrical surface Sc1.

FIG. 3 illustrates the upper housing 70 before it is assembled between the fixed core 50 and the housing 20. The first tapered surface St1 is formed on the outer peripheral wall of the body 71 of the upper housing 70. The first tapered surface St1 is positioned on a virtual tapered surface Stv1 centering around the axis of the body 71 of the upper housing 70 (see FIG. 3). The virtual tapered surface Stv1 approaches the axis of the body 71 at a predetermined ratio from one side to the other side of the body 71 in the axial direction.

The first tapered surface St1 is tapered to approach the axis of the upper housing 70 at a predetermined ratio from opposite the nozzle hole 13 toward the nozzle hole 13 with respect to the upper housing 70 (see FIGS. 2 and 3).

The first cylindrical surface Sc1 is formed on the inner peripheral wall of the body 71 of the upper housing 70. The first cylindrical surface Sc1 is positioned on a virtual cylindrical surface Scv1 centering around the axis of the body 71 of the upper housing 70 (see FIG. 3). The virtual cylindrical surface Scv1 maintains a constant distance from the axis of the body 71 in the axial direction of the body 71.

The first cylindrical surface Sc1 is cylindrically formed centering around the axis of the upper housing 70 (see FIGS. 2 and 3).

As illustrated in FIG. 2, the housing 20 has a second tapered surface St2. The second tapered surface St2 is formed on the inner peripheral wall of the outer cylinder portion 21 of the housing 20 to radially face the first tapered surface St1 formed on the outer peripheral wall of the upper housing 70. The second tapered surface St2 is tapered to approach the axis of the outer cylinder portion 21 at a predetermined ratio from the outer cylinder portion 21 opposite to the nozzle hole 13 toward the nozzle hole 13 in the axial direction.

As illustrated in FIG. 2, the fixed core 50 has a second cylindrical surface Sc2. The second cylindrical surface Sc2 is formed on the outer peripheral wall of the fixed core 50 to radially face the first cylindrical surface Sc1 formed on the inner peripheral wall of the upper housing 70. The second cylindrical surface Sc2 is cylindrically formed centering around the axis of the fixed core 50.

The description below explains how to assemble the upper housing 70 between the fixed core 50 and the housing 20, namely, how to manufacture the fuel injection valve 1.

The method of manufacturing the fuel injection valve 1 includes the following processes.

Housing Assembling Process

Assemble the nozzle end portion 11, the nozzle cylinder portion 12, the spring 65, the needle 30, the movable core 40, the stopper 66, the magnetic flux adjustment portion 15, the fixed core 50, and the sleeve 51. Then, assemble the housing 20 to the nozzle cylinder portion 12. Specifically, insert the housing 20 from the nozzle end portion 11 of the nozzle portion 10 so that the inner annular portion 24 abuts on the nozzle stepped surface 121. Then, weld to fix the nozzle cylinder portion 12 and the housing 20.

Coil Assembling Process

After the housing assembling process, insert the coil 55 between the fixed core 50 and the housing 20. The coil 55 is integrated with the bobbin 551, the bobbin extension portion 552, and the terminal 553. Specifically, insert the coil 55 from the fixed core 50 opposite to the nozzle hole 13 so that the coil 55 is positioned between the magnetic flux adjustment portion 15 and the housing 20.

Upper Housing Assembling Process

After the coil assembling process, insert the upper housing 70 between the fixed core 50 and the housing 20. Specifically, insert the upper housing 70 from the fixed core 50 opposite to the nozzle hole 13. Press-fit the upper housing 70 into the housing 20 while the bobbin extension portion 552 is positioned to the cutout portion 72 of the upper housing 70.

Figure 4:
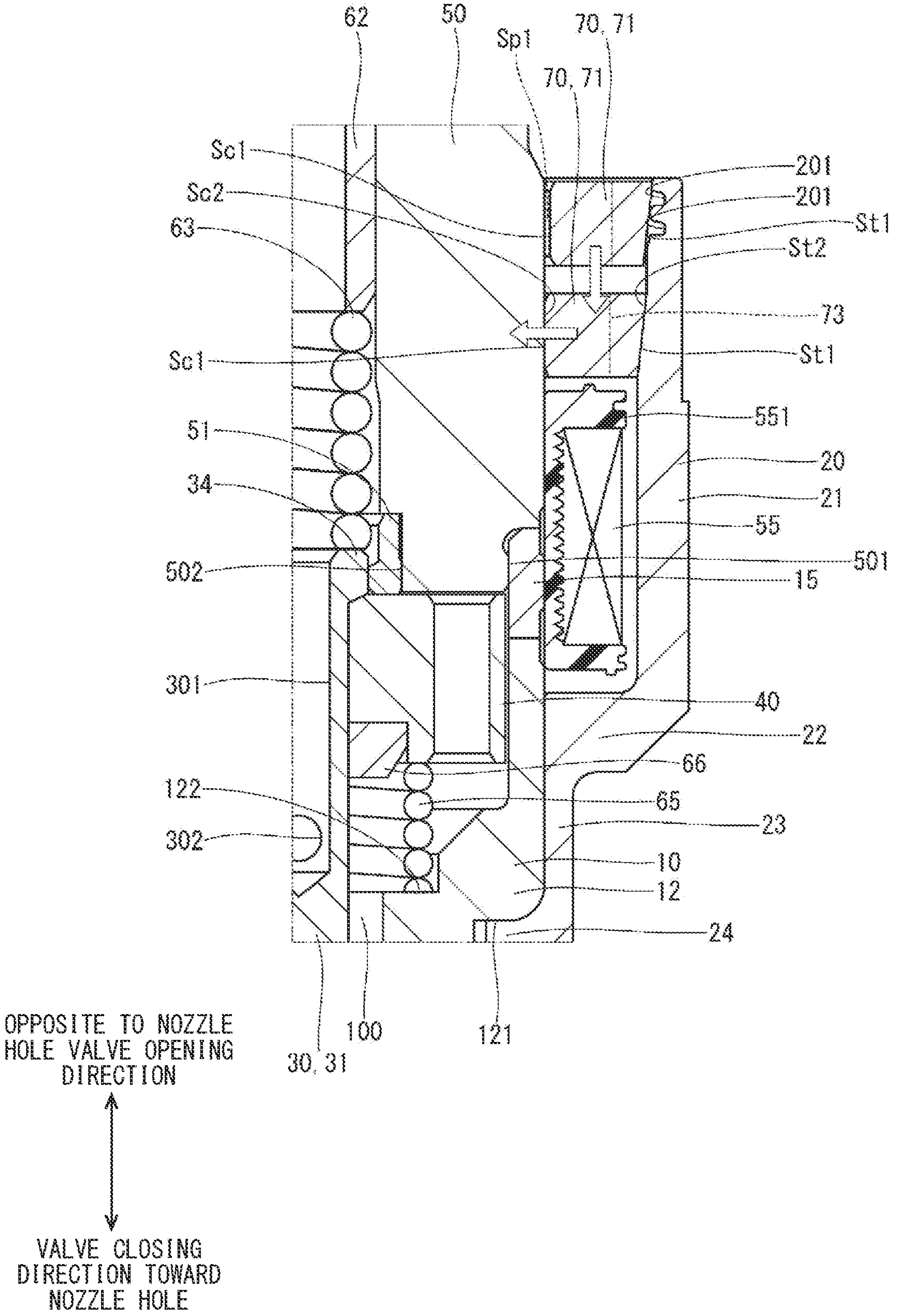
FIG. 4 is a sectional view illustrating an assembling process for the upper housing of the fuel injection valve according to the first embodiment.

When the upper housing 70 is press-fitted inside the housing 20, as illustrated in FIG. 4, the outer peripheral wall of the upper housing 70, namely, the first tapered surface St1 first touches the inner peripheral wall of the outer cylinder portion 21 of the housing 20 at the end opposite to the nozzle hole 13. In this state, the first tapered surface St1 and the second tapered surface St2 do not radially face. Then, the inner diameter of the first cylindrical surface Sc1 is larger than the outer diameter of the second cylindrical surface Sc2. Therefore, a gap Sp1 is formed between the inner peripheral wall of the upper housing 70, namely, the first cylindrical surface Sc1 and the outer peripheral wall of the fixed core 50 at least at a part in the circumferential direction of the upper housing 70.

When the first tapered surface St1 and the second tapered surface St2 do not radially face, the outer diameter at the end of the first tapered surface St1 toward the nozzle hole 13 is larger than the inner diameter at the end of the second tapered surface St2 toward the nozzle hole 13.

Figure 5:
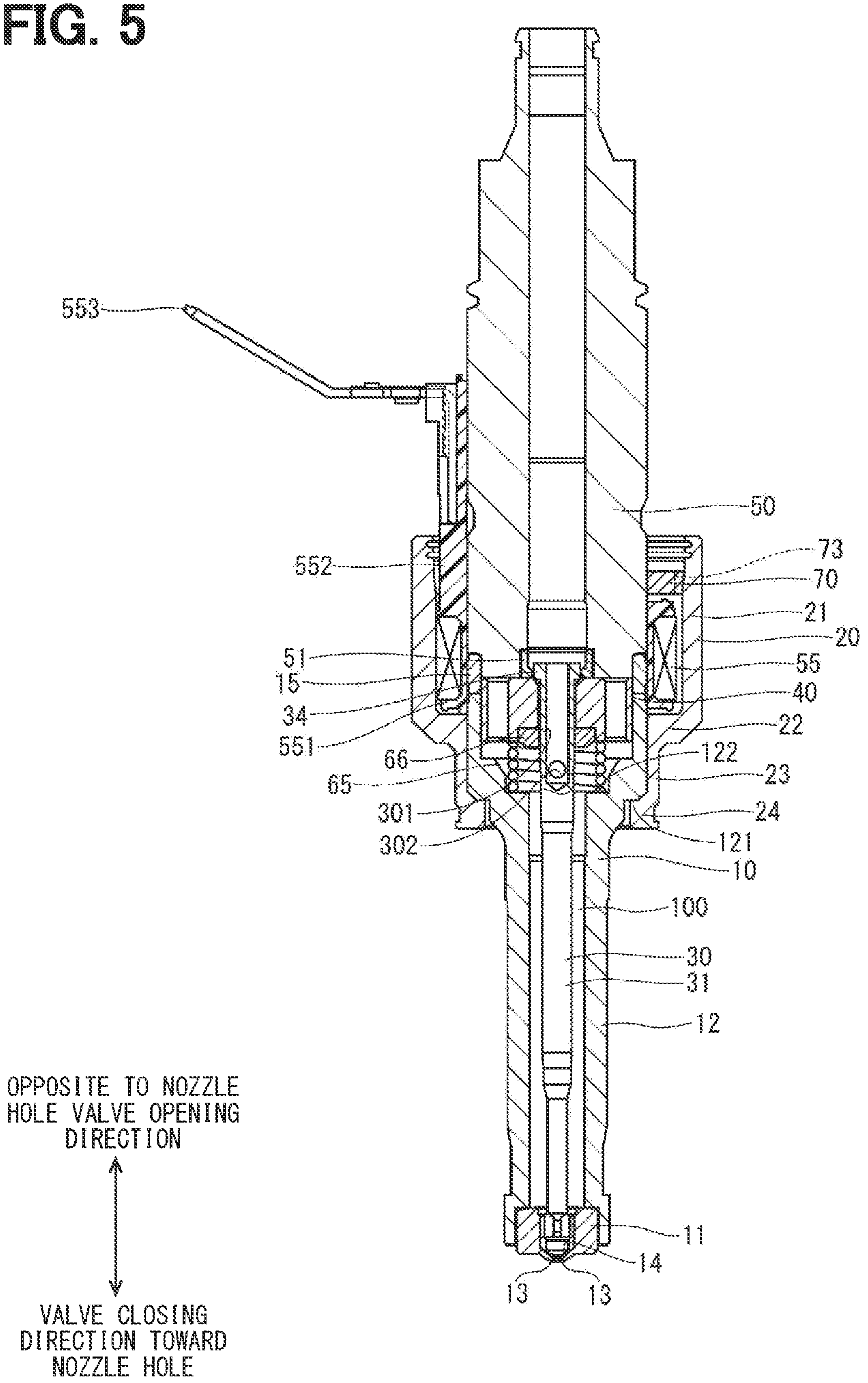
FIG. 5 is a sectional view illustrating the state after assembling the upper housing of the fuel injection valve according to the first embodiment.

In this state, move the upper housing 70 further toward the nozzle hole 13. The first tapered surface St1 of the upper housing 70 slides on the second tapered surface St2 of the housing 20. At this time, the upper housing 70 deforms radially inward to decrease the inner and outer diameters. Therefore, the first cylindrical surface Sc1 of the upper housing 70 abuts on and closely adheres to the second cylindrical surface Sc2 of the fixed core 50. After the upper housing 70 is assembled, the first tapered surface St1 closely adheres to the second tapered surface St2. The first cylindrical surface Sc1 closely adheres to the second cylindrical surface Sc2 (see FIGS. 4 and 5).

Molding Process

After the upper housing assembling process, inject the melted resin between the fixed core 50 and the housing 20 and between the outside of the fixed core 50 and the mold to form the mold portion 56 and the connector portion 57. At this time, the melted resin flows from the upper housing 70 opposite to the nozzle hole 13 toward the coil 55 through the recessed portion 73 and the cutout portion 72. Finally, the coil 55 is covered with resin.

The description below compares the present embodiment with a first comparative mode and explains the technical advantages of the present embodiment over the first comparative mode.

Figure 6:
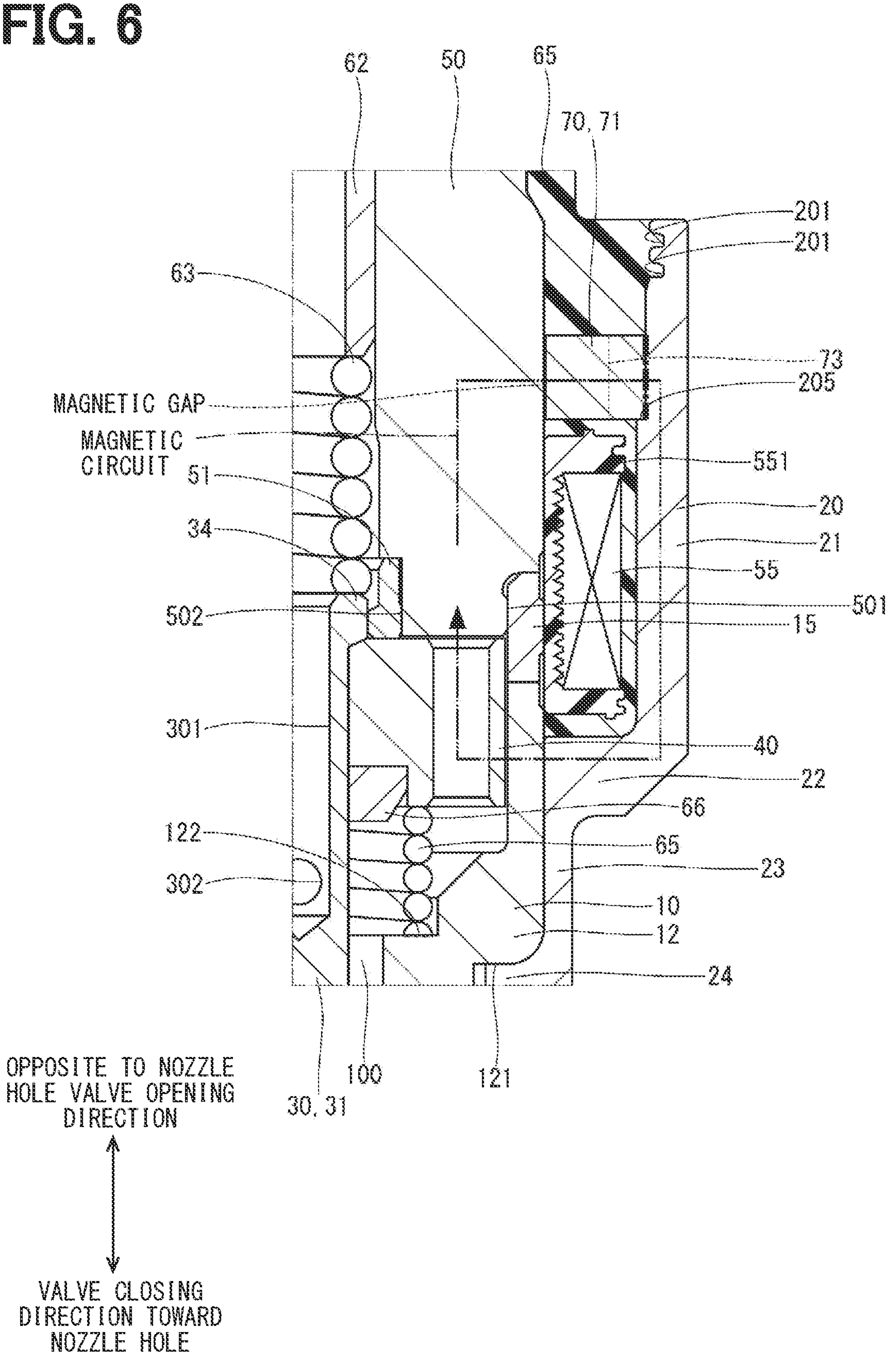
FIG. 6 is a sectional view illustrating the upper housing and the vicinity of the fuel injection valve according to a first comparative mode.

The first comparative mode differs from the first embodiment in the configurations of the upper housing 70 and the housing 20. According to the first comparative mode, as illustrated in FIG. 6, the outer peripheral wall of the upper housing 70 is cylindrically formed. The inner peripheral wall of the outer cylinder portion 21 of the housing 20 is cylindrically formed. According to the first comparative mode, the upper housing 70 does not include the first tapered surface St1 and the housing 20 does not include the second tapered surface St2.

An annular stepped surface 205 is formed on the inner peripheral wall of the outer cylinder portion 21. The upper housing 70 abuts on the stepped surface 205 and is restrained from moving toward the nozzle hole 13.

According to the first comparative mode, the upper housing 70 has an inner diameter larger than the outer diameter of the fixed core 50 and an outer diameter larger than the inner diameter of the outer cylinder portion 21 of the housing 20 before the assembly. During the assembly, the upper housing 70 is press-fitted while the outer peripheral wall touches the inner peripheral wall of the outer cylinder portion 21 of the housing 20. After the upper housing 70 is assembled, a gap as a magnetic gap may be formed between the outer peripheral wall of the fixed core 50 and the inner peripheral wall of the upper housing 70 at least at a part in the circumferential direction of the upper housing 70.

When the coil 55 is energized, it may be difficult to form an efficient magnetic circuit having a small magnetic gap and a low magnetic resistance through the fixed core 50, the upper housing 70, and the housing 20. It may be difficult to efficiently generate an attractive force corresponding to a current supplied to the coil 55. Therefore, it may be necessary to increase the energy required to drive the fuel injection valve.

According to the present embodiment, the upper housing 70 includes the first tapered surface St1. The housing 20 includes the second tapered surface St2. After the upper housing 70 is assembled, the first tapered surface St1 of the upper housing 70 closely adheres to the second tapered surface St2 of the housing 20. The first cylindrical surface Sc1 of the upper housing 70 closely adheres to the second cylindrical surface Sc2 of fixed core 50.

When the coil 55 is energized, it is possible to form an efficient magnetic circuit having a small magnetic gap and a low magnetic resistance through the fixed core 50, the upper housing 70, and the housing 20 (see FIG. 2). Therefore, it is possible to efficiently generate an attractive force corresponding to the current supplied to the coil 55 and decrease the energy required to drive the fuel injection valve 1. Consequently, it is possible to reduce the power consumption of the fuel injection valve 1.

In FIG. 2, a thick dash-dot-dash line indicates a location where the members closely adhere to each other due to press fitting (the same applies hereinafter). According to the present embodiment, the outer peripheral wall (first tapered surface St1) of the upper housing 70 closely adheres to the inner peripheral wall (second tapered surface St2) of the housing 20. The inner peripheral wall (first cylindrical surface Sc1) of the upper housing 70 closely adheres to the outer peripheral wall (second cylindrical surface Sc2) of the fixed core 50. The magnetic gap and the magnetic resistance are reduced at the points of close adhesion.

According to the present embodiment, the end of the first tapered surface St1 on the side of the nozzle hole 13 is slightly distant from the end of the second tapered surface St2 toward the nozzle hole 13. The end of the first tapered surface St1 opposite to the nozzle hole 13 abuts on the end of the second tapered surface St2 opposite to the nozzle hole 13.

During the molding process, it is possible to prevent the melted resin from entering between the first tapered surface St1 and the second tapered surface St2 from the upper housing 70 opposite to the nozzle hole 13. Consequently, it is possible to prevent the first tapered surface St1 and the second tapered surface St2 from separating from each other.

According to the present embodiment, the fixed core 50, the upper housing 70, and the housing 20 can form an efficient magnetic circuit having a small magnetic gap and a low magnetic resistance. It is possible to increase an induced electromotive force generated by the behavior of the movable core 40 and improve the controllability when the induced electromotive force is used as signals.

The control using the induced electromotive force as signals can adopt the example of detecting the valve closed by the needle 30 based on the detected induced electromotive force (JP-A No. 2017-61882), for example.

According to the present embodiment, as above, the upper housing 70 includes the first tapered surface St1 and the first cylindrical surface Sc1. The first tapered surface St1 is formed on the outer peripheral wall in terms of the outer peripheral wall and the inner peripheral wall. The first cylindrical surface Sc1 is formed on the inner peripheral wall in terms of the outer peripheral wall and the inner peripheral wall. In terms of the housing 20 and the fixed core 50, the housing 20 includes the second tapered surface St2 radially facing the first tapered surface St1. In terms of the housing 20 and the fixed core 50, the fixed core 50 includes the second cylindrical surface Sc2 radially facing the first cylindrical surface Sc1.

Before assembling the upper housing 70, configure appropriate diameters for the first tapered surface St1, the second tapered surface St2, the first cylindrical surface Sc1, and the second cylindrical surface Sc2. When assembling the upper housing 70, insert the upper housing 70 between the fixed core 50 and the housing 20 with respect to the coil 55 opposite to the nozzle hole 13. Then, the upper housing 70 can be deformed radially inward while sliding the first tapered surface St1 and the second tapered surface St2 in the axial direction. The first cylindrical surface Sc1 and the second cylindrical surface Sc2 can be abutted and closely adhered to each other.

After the upper housing 70 is assembled, the first tapered surface St1 closely adheres to the second tapered surface St2. The first cylindrical surface Sc1 closely adheres to the second cylindrical surface Sc2.

The fixed core 50, the upper housing 70, and the housing 20 can form an efficient magnetic circuit having a small magnetic gap and a low magnetic resistance. It is possible to efficiently generate a suction force corresponding to the current supplied to the coil 55 and reduce the energy required to drive the fuel injection valve 1. The power consumption of the fuel injection valve 1 can be reduced.

According to the present embodiment, the inner diameter of the first cylindrical surface Sc1 is larger than the outer diameter of the second cylindrical surface Sc2 when the first tapered surface St1 and the second tapered surface St2 do not radially face. The first cylindrical surface Sc1 abuts on the second cylindrical surface Sc2 when the first tapered surface St1 and the second tapered surface St2 radially face.

When assembling the upper housing 70, the upper housing 70 can be easily inserted between the fixed core 50 and the housing 20 with respect to the coil 55 opposite to the nozzle hole 13. After assembling the upper housing 70, the first tapered surface St1 and the second tapered surface St2 can closely adhere. The first cylindrical surface Sc1 and the second cylindrical surface Sc2 can closely adhere. Therefore, the fixed core 50, the upper housing 70, and the housing 20 can form an efficient magnetic circuit having a small magnetic gap and a low magnetic resistance.

According to the present embodiment, the second cylindrical surface Sc2 is formed on the fixed core 50. The second tapered surface St2 is formed on the housing 20.

When assembling the upper housing 70, the upper housing 70 can be deformed radially inward or toward a compressing side, not radially outward or toward a pulling side. Consequently, the strength of the upper housing 70 can be ensured.

According to the present embodiment, the end of the first tapered surface St1 on the side of the nozzle hole 13 is distant from the end of the second tapered surface St2 toward the nozzle hole 13.

According to the present embodiment, the upper housing 70 is provided so that the outer peripheral wall at the end on the side of the nozzle hole 13 is distant from the inner peripheral wall of the housing 20.

Before the upper housing 70 is assembled into the housing 20 according to the present embodiment, the first tapered surface St1 of the upper housing 70 shows a diameter reduction rate slightly larger than that of the second tapered surface St2 of the housing 20. The diameter reduction rate represents a degree of decreasing the diameter. When the upper housing 70 is press-fitted into the housing 20 during the upper housing assembling process, the outer peripheral wall of the upper housing 70 at the end opposite to the nozzle hole 13 first touches the inner peripheral wall of the housing 20. After the housing 70 is completely press-fitted, the outer peripheral wall (first tapered surface St1) of the upper housing 70 at the end on the side of the nozzle hole 13 is slightly distant from the inner peripheral wall (second tapered surface St2) of the housing 20.

During the molding process, the melted resin is prevented from entering between the first tapered surface St1 of the upper housing 70 and the second tapered surface St2 of the housing 20 from the upper housing 70 opposite to the nozzle hole 13. It is possible to suppress the separation between the first tapered surface St1 of the upper housing 70 and the second tapered surface St2 of the housing 20. Therefore, the fixed core 50, the upper housing 70, and the housing 20 can reliably form an efficient magnetic circuit having a small magnetic gap and a low magnetic resistance.

According to the present embodiment, the upper housing 70 includes the cutout portion 72 at a given part in the circumferential direction and is approximately C-shaped when viewed in the axial direction.

When the upper housing 70 is assembled, the upper housing 70 can be easily deformed radially inward. After the upper housing 70 is assembled, the first cylindrical surface Sc1 and the second cylindrical surface Sc2 can more closely adhere to each other.

Second Embodiment

Figure 7:
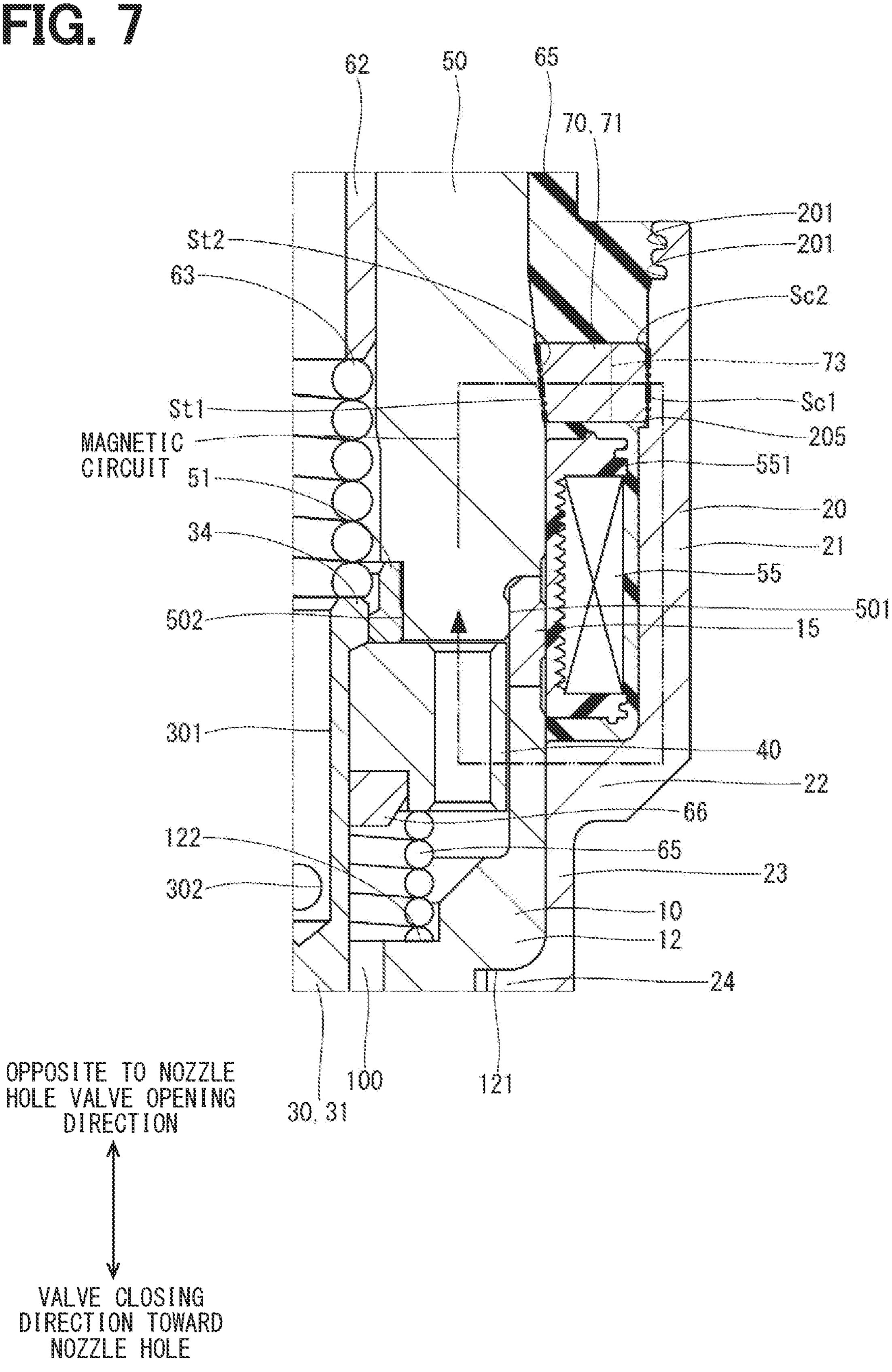
FIG. 7 is a sectional view illustrating the upper housing and the vicinity of the fuel injection valve according to a second embodiment.

FIG. 7 illustrates part of the fuel injection valve according to the second embodiment. The second embodiment differs from the first embodiment in the configurations of the upper housing, the fixed core, and the housing, for example.

According to the present embodiment, the first tapered surface St1 is formed on the inner peripheral wall of the body 71 of the upper housing 70. The first tapered surface St1 is tapered to approach the axis of the upper housing 70 at a predetermined ratio from the side toward the nozzle hole 13 to the side opposite to the nozzle hole 13 with respect to the upper housing 70 (see FIG. 7).

The first cylindrical surface Sc1 is formed on the outer peripheral wall of the body 71 of the upper housing 70. The first cylindrical surface Sc1 is cylindrically formed centering around the axis of the upper housing 70 (see FIG. 7).

As illustrated in FIG. 7, the fixed core 50 includes the second tapered surface St2. The second tapered surface St2 is formed on the outer peripheral wall of the fixed core 50 to radially face the first tapered surface St1 formed on the inner peripheral wall of the upper housing 70. The second tapered surface St2 is tapered to approach the axis of the fixed core 50 at a predetermined ratio from the side toward the nozzle hole 13 to the side opposite to the nozzle hole 13 in the axial direction of the fixed core 50.

As illustrated in FIG. 7, the housing 20 includes the second cylindrical surface Sc2. The second cylindrical surface Sc2 is formed on the inner peripheral wall of the outer cylinder portion 21 of the housing 20 to radially face the first cylindrical surface Sc1 formed on the outer peripheral wall of the upper housing 70. The second cylindrical surface Sc2 is cylindrically formed centering around the axis of the outer cylinder portion 21 of the housing 20.

The annular stepped surface 205 is formed on the inner peripheral wall of the outer cylinder portion 21. The upper housing 70 does not abut on the stepped surface 205.

The description below explains how to assemble the upper housing 70 between the fixed core 50 and the housing 20.

In terms of the method for manufacturing the fuel injection valve 1 according to the present embodiment, "housing assembling process", "coil assembling process", and "molding process" are similar to the first embodiment and a description is omitted for brevity. Only the "upper housing assembling process" will be described below.

Upper Housing Assembling Process

Figure 8:
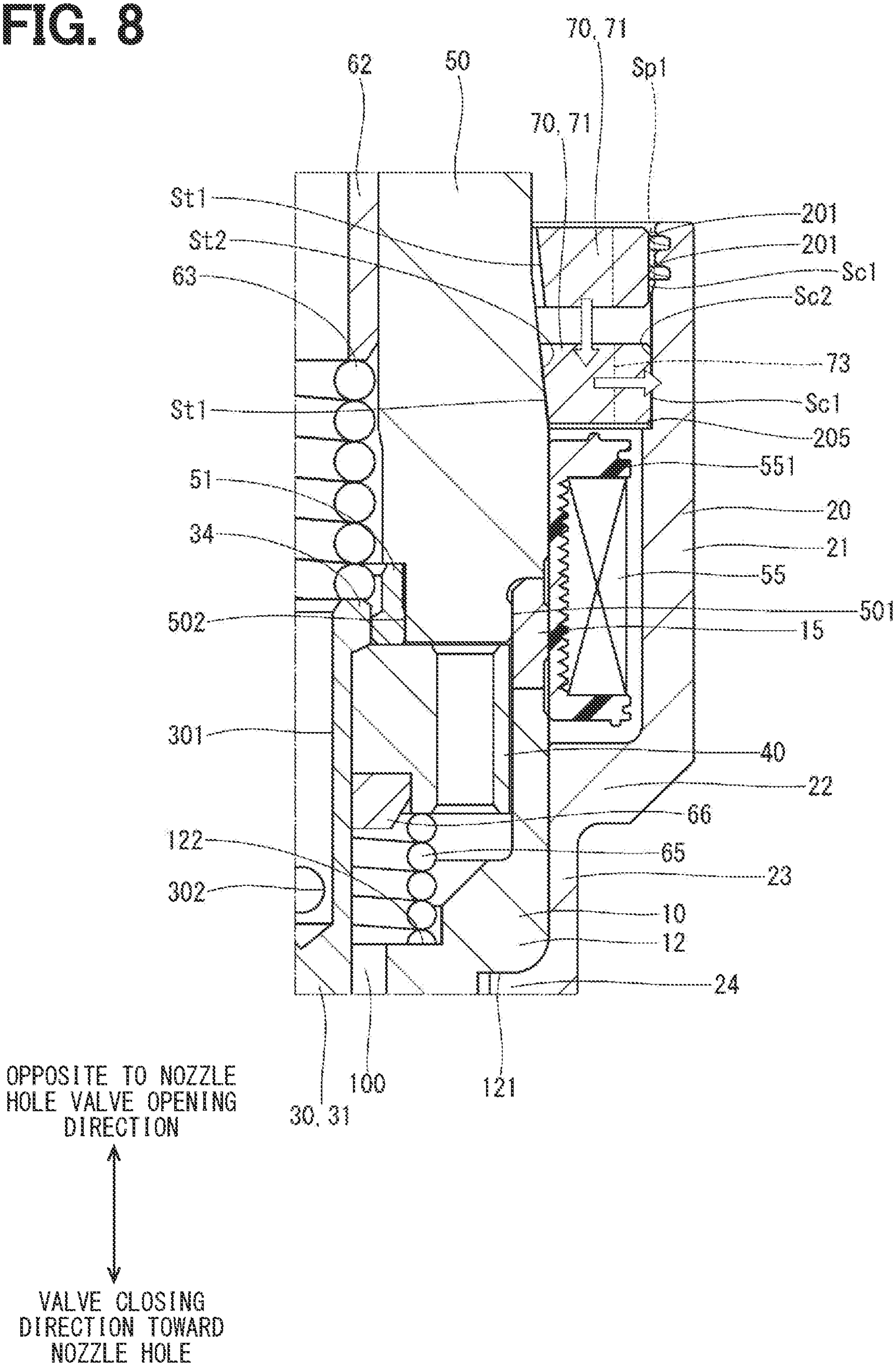
FIG. 8 is a sectional view illustrating an assembling process for the upper housing of the fuel injection valve according to the second embodiment.

After the coil assembling process, insert the upper housing 70 between the fixed core 50 and the housing 20. Specifically, insert the upper housing 70 from the fixed core 50 opposite to the nozzle hole 13. Press-fit the upper housing 70 into the outside of the housing 20 while the bobbin extension portion 552 is positioned to the cutout portion 72 of the upper housing 70, As illustrated in FIG. 8, the upper housing 70 is press-fitted to the outside of the fixed core 50. The inner peripheral wall of the upper housing 70, namely, the first tapered surface St1 is positioned opposite to the nozzle hole 13 with respect to the second tapered surface St2 and radially faces the outer peripheral wall of the fixed core 50. When the first tapered surface St1 and the second tapered surface St2 do not radially face, the outer diameter of the first tapered surface St1 is smaller than the inner diameter of the second tapered surface St2. Therefore, the gap Sp1 is formed between the outer peripheral wall of the upper housing 70, namely, the first cylindrical surface Sc1 and the inner peripheral wall of the housing 20 at least at part of the upper housing 70 in the circumferential direction.

When the first tapered surface St1 and the second tapered surface St2 do not radially face, the inner diameter of the first tapered surface St1 at the end toward the nozzle hole 13 is smaller than the outer diameter of the second tapered surface St2 at the end toward the nozzle hole 13.

In this state, move the upper housing 70 further toward the nozzle hole 13. The first tapered surface St1 of the upper housing 70 touches and slides on the second tapered surface St2 of the housing 20. At this time, the upper housing 70 deforms radially outward to increase the inner and outer diameters. Therefore, the first cylindrical surface Sc1 of the upper housing 70 abuts on and closely adheres to the second cylindrical surface Sc2 of the housing 20. After the upper housing 70 is assembled, the first tapered surface St1 closely adheres to the second tapered surface St2. The first cylindrical surface Sc1 closely adheres to the second cylindrical surface Sc2 (see FIGS. 7 and 8).

As above, according to the present embodiment, the upper housing 70 includes the first tapered surface St1 and the first cylindrical surface Sc1. The first tapered surface St1 is formed on the inner peripheral wall in terms of the outer peripheral wall and the inner peripheral wall. The first cylindrical surface Sc1 is formed on the outer peripheral wall in terms of the outer peripheral wall and the inner peripheral wall. In terms of the housing 20 and the fixed core 50, the fixed core 50 includes the second tapered surface St2 radially facing the first tapered surface St1. In terms of the housing 20 and the fixed core 50, the housing 20 includes the second cylindrical surface Sc2 radially facing the first cylindrical surface Sc1.

Before assembling the upper housing 70, configure appropriate diameters for the first tapered surface St1, the second tapered surface St2, the first cylindrical surface Sc1, and the second cylindrical surface Sc2. When assembling the upper housing 70, insert the upper housing 70 between the fixed core 50 and the housing 20 with respect to the coil 55 opposite to the nozzle hole 13. Then, the upper housing 70 can be deformed radially outward while axially sliding the first tapered surface St1 and the second tapered surface St2. The first cylindrical surface Sc1 and the second cylindrical surface Sc2 can be abutted and closely adhered to each other.

After the upper housing 70 is assembled, the first tapered surface St1 closely adheres to the second tapered surface St2. The first cylindrical surface Sc1 closely adheres to the second cylindrical surface Sc2.

The fixed core 50, the upper housing 70, and the housing 20 can form an efficient magnetic circuit having a small magnetic gap and a low magnetic resistance. It is possible to efficiently generate a suction force corresponding to the current supplied to the coil 55 and reduce the energy required to drive the fuel injection valve 1. The power consumption of the fuel injection valve 1 can be reduced.

According to the present embodiment, the upper housing 70 maintains the same axial length on inner and outer edge portions. The area of a magnetic path formed on the inner peripheral wall of the upper housing 70 is smaller than the area of a magnetic path formed on the outer peripheral wall of the upper housing 70. According to the present embodiment, the upper housing 70 is press-fitted into the fixed core 50 while the inner peripheral wall of the upper housing 70, namely, the first tapered surface St1 slides on the outer peripheral wall of the fixed core 50, namely, the second tapered surface St2. Therefore, the inner peripheral wall of the upper housing 70 as a pressing side stably adheres to the outer peripheral wall of the fixed core 50. It becomes easier to ensure the magnetic path area on the inner peripheral wall of the upper housing 70. The inner peripheral wall tends to cause the magnetic path area to be smaller than the outer peripheral wall of the upper housing 70. The present embodiment has an advantage over the first embodiment in this respect.

According to the present embodiment, the outer diameter of the first cylindrical surface Sc1 is smaller than the inner diameter of the second cylindrical surface Sc2 when the first tapered surface St1 and the second tapered surface St2 do not radially face. The first cylindrical surface Sc1 abuts on the second cylindrical surface Sc2 when the first tapered surface St1 and the second tapered surface St2 radially face.

When assembling the upper housing 70, the upper housing 70 can be easily inserted between the fixed core 50 and the housing 20 with respect to the coil 55 opposite to the nozzle hole 13. After assembling the upper housing 70, the first tapered surface St1 and the second tapered surface St2 can closely adhere. The first cylindrical surface Sc1 and the second cylindrical surface Sc2 can closely adhere. Therefore, the fixed core 50, the upper housing 70, and the housing 20 can form an efficient magnetic circuit having a small magnetic gap and a low magnetic resistance.

According to the present embodiment, the end of the first tapered surface St1 on the side of the nozzle hole 13 is distant from the end of the second tapered surface St2 toward the nozzle hole 13.

According to the present embodiment, the upper housing 70 is provided so that the inner peripheral wall at the end on the side of the nozzle hole 13 is distant from the outer peripheral wall of the fixed core 50.

Before the upper housing 70 is assembled outside the fixed core 50 according to the present embodiment, the first tapered surface St1 of the upper housing 70 shows a diameter reduction rate slightly larger than that of the second tapered surface St2 of the fixed core 50. The diameter reduction rate represents a degree of decreasing the diameter. When the upper housing 70 is press-fitted outside the fixed core 50 during the upper housing assembling process, the inner peripheral wall of the upper housing 70 at the end opposite to the nozzle hole 13 first touches the outer peripheral wall of the fixed core 50. After the housing 70 is completely press-fitted, the inner peripheral wall (first tapered surface St1) of the upper housing 70 at the end on the side of the nozzle hole 13 is slightly distant from the outer peripheral wall (second tapered surface St2) of the fixed core 50.

During the molding process, the melted resin is prevented from entering between the first tapered surface St1 of the upper housing 70 and the second tapered surface St2 of the fixed core 50 from the upper housing 70 opposite to the nozzle hole 13. It is possible to suppress the separation between the first tapered surface St1 of the upper housing 70 and the second tapered surface St2 of the fixed core 50. Therefore, the fixed core 50, the upper housing 70, and the housing 20 can reliably form an efficient magnetic circuit having a small magnetic gap and a low magnetic resistance.

Third Embodiment

Figure 9:
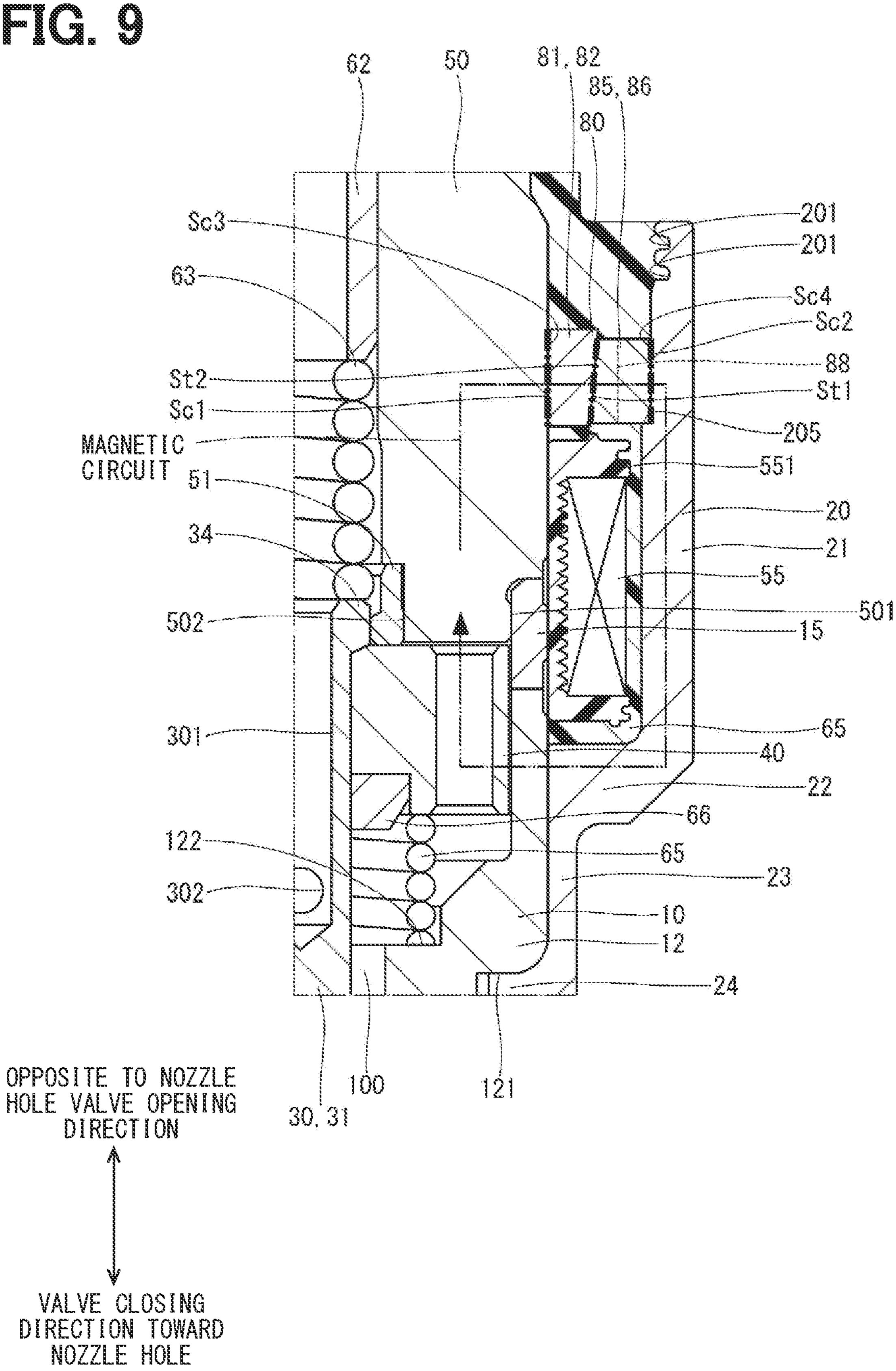
FIG. 9 is a sectional view illustrating the upper housing and the vicinity of the fuel injection valve according to a third embodiment.

FIG. 9 illustrates part of the fuel injection valve according to the third embodiment. The third embodiment differs from the first embodiment in the configurations of the upper housing, the fixed core, and the housing, for example.

According to the present embodiment, the upper housing 80 includes an inner member 81 and an outer member 85.

Figure 10:
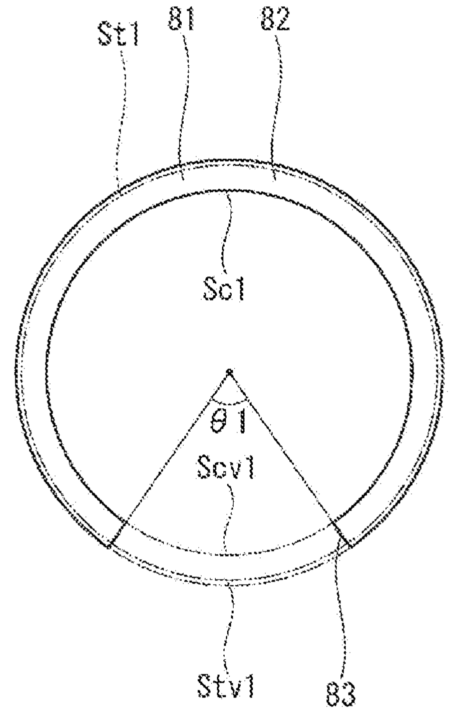
FIG. 10 is a plan view illustrating an inner member of the upper housing of the fuel injection valve according to the third embodiment.
Figure 11:
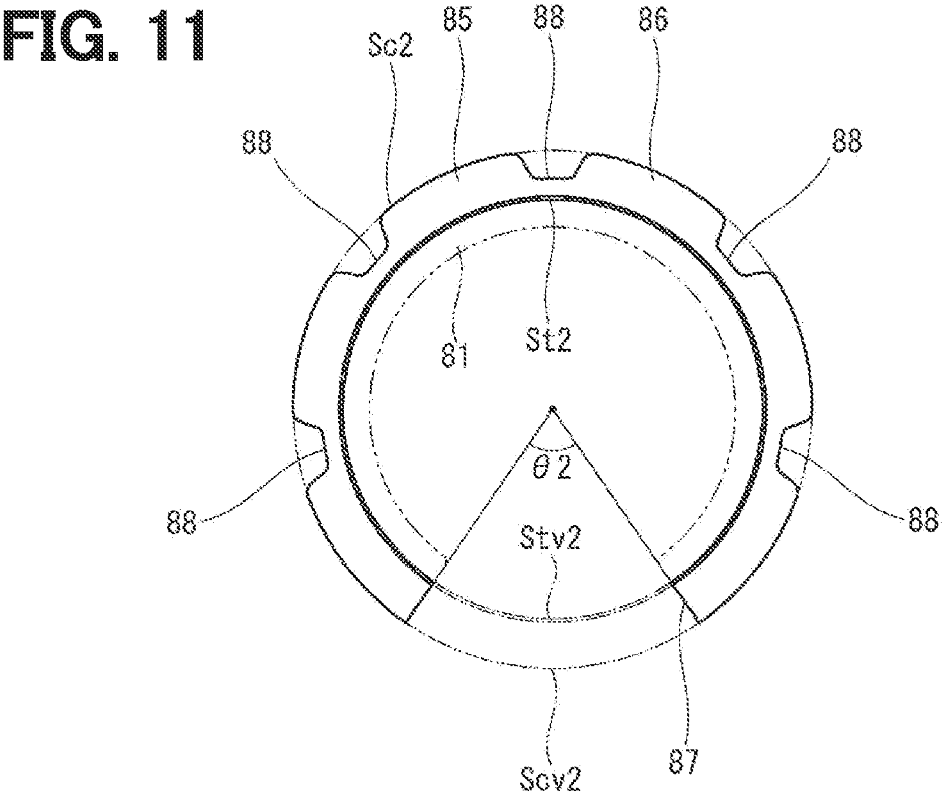
FIG. 11 is a plan view illustrating an outer member of the upper housing of the fuel injection valve according to the third embodiment.

The inner member 81 and the outer member 85 are approximately C-shaped and are made of a magnetic material such as metal (See FIGS. 10 and 11).

As illustrated in FIG. 9, the upper housing 80 is provided between the fixed core 50 and the housing 20 opposite to the nozzle hole 13 with respect to the coil 55. The inner peripheral wall of the inner member 81 of the upper housing 80 closely adheres to the outer peripheral wall of the fixed core 50. The outer peripheral wall of the inner member 81 closely adheres to the inner peripheral wall of the outer member 85. The outer peripheral wall of the outer member 85 of the upper housing 80 closely adheres to the inner peripheral wall of the outer cylinder portion 21 of the housing 20.

The coil 55 is supplied with electric power (energized) to generate a magnetic force. When the coil 55 generates a magnetic force, a magnetic circuit is formed through the fixed core 50, the upper housing 80, the outer cylinder portion 21, the outer annular portion 22, the nozzle cylinder portion 12, and the movable core 40 except the magnetic flux adjustment portion 15 (See FIG. 9).

The upper housing 80 will be described in more detail.

As illustrated in FIG. 10, the inner member 81 includes an inner member body 82 and a cutout portion 83.

The inner member body 82 is annularly formed and is made of a magnetic material such as metal. The cutout portion 83 is formed by partially removing the inner member body 82 along its circumference. Consequently, the inner member body 82 of the upper housing 80 is opened at a given circumferential part and is approximately C-shaped when viewed in the axial direction.

As illustrated in FIG. 11, the outer member 85 includes an outer member body 86, a cutout portion 87, and a recessed portion 88.

The outer member body 86 is annularly formed and is made of a magnetic material such as metal. The cutout portion 87 is formed by partially removing the outer member body 86 along its circumference. Consequently, the outer member body 86 of the upper housing 80 is opened at a given circumferential part and is approximately C-shaped when viewed in the axial direction.

The recessed portion 88 is formed to be radially inward recessed from the outer peripheral wall of the outer member body 86. Five recessed portions 88 are formed at equal intervals in the circumferential direction of the outer member body 86. The recessed portions 88 formed in the outer member body 86 can easily deform the outer member body 86 in the radial direction.

According to the above-described configuration, the inner member 81 and the outer member 85 of the upper housing 80 include the cutout portion 83 and the cutout portion 87 at circumferential parts and are approximately C-shaped when viewed in the axial direction.

The inner member 81 of the upper housing 80 includes the first tapered surface St1 and the first cylindrical surface Sc1.

FIG. 10 illustrates the inner member 81 of the upper housing 80 before it is assembled between the fixed core 50 and the housing 20. The first tapered surface St1 is formed on the outer peripheral wall of the inner member body 82 of the upper housing 80. The first tapered surface St1 is positioned on a virtual tapered surface Stv1 centering around the axis of the inner member body 82 of the upper housing 80 (see FIG. 10). The virtual tapered surface Stv1 approaches the axis of the inner member body 82 at a predetermined ratio from one side to the other side of the inner member body 82 in the axial direction.

The first tapered surface St1 is tapered to approach the axis of the upper housing 80 at a predetermined ratio from the side opposite to the nozzle hole 13 to the side toward the nozzle hole 13 with respect to the upper housing 80 (see FIGS. 9 and 10).

The first cylindrical surface Sc1 is formed on the inner peripheral wall of the inner member body 82 of the upper housing 80. The first cylindrical surface Sc1 is positioned on a virtual cylindrical surface Scv1 centering around the axis of the inner member body 82 of the upper housing 80 (see FIG. 10). The virtual cylindrical surface Scv1 maintains a constant distance from the axis of the inner member body 82 in the axial direction of the inner member body 82.

The first cylindrical surface Sc1 is cylindrically formed centering around the axis of the upper housing 80 (see FIGS. 9 and 10).

The outer member 85 of the upper housing 80 includes the second tapered surface St2 and the second cylindrical surface Sc2.

FIG. 11 illustrates the outer member 85 of the upper housing 80 before it is assembled between the fixed core 50 and the housing 20. The second tapered surface St2 is formed on the inner peripheral wall of the outer member 85 of the upper housing 80. The second tapered surface St2 is positioned on a virtual tapered surface Stv2 centering around the axis of the outer member body 86 of the upper housing 80 (see FIG. 11). The virtual tapered surface Stv2 approaches the axis of the outer member body 86 at a predetermined ratio from one side to the other side of the outer member body 86 in the axial direction.

The second tapered surface St2 is tapered to approach the axis of the upper housing 80 at a predetermined ratio from the side opposite to the nozzle hole 13 to the side toward the nozzle hole 13 with respect to the upper housing 80 (see FIGS. 9 and 11).

The second cylindrical surface Sc2 is formed on the outer peripheral wall of the outer member body 86 of the upper housing 80. The second cylindrical surface Sc2 is positioned on a virtual cylindrical surface Scv2 centering around the axis of the outer member body 86 of the upper housing 80 (see FIG. 11). The virtual cylindrical surface Scv2 maintains a constant distance from the axis of the outer member body 86 in the axial direction of the outer member body 86.

Figure 12:
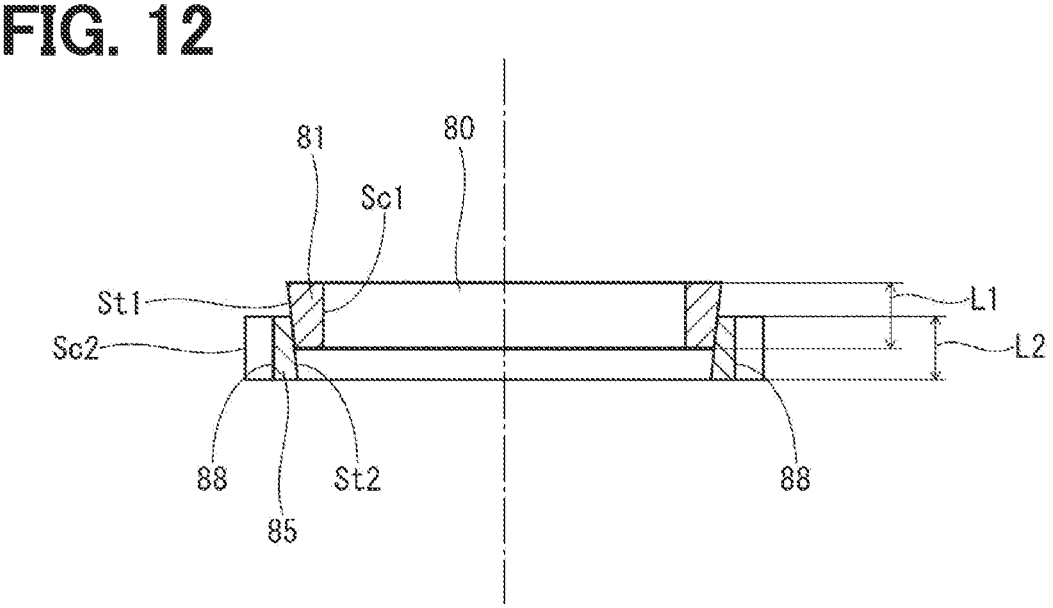
FIG. 12 is a sectional view illustrating the upper housing of the fuel injection valve according to the third embodiment.

As illustrated in FIG. 12, the axial length L1 of the inner member 81 is larger than the axial length L2 of the outer member 85.

As illustrated in FIG. 9, the end face of the inner member 81 toward the nozzle hole 13 is positioned nearer to the nozzle hole 13 than the end face of the outer member 85 toward the nozzle hole 13. The end face of the inner member 81 opposite to the nozzle hole 13 is positioned farther from the nozzle hole 13 than the end face of the outer member 85 opposite to the nozzle hole 13. Namely, the outer member 85 is axially positioned within the axial length of the inner member 81.

As illustrated in FIG. 9, the fixed core 50 has a third cylindrical surface Sc3. The third cylindrical surface Sc3 is formed on the outer peripheral wall of the fixed core 50 to radially face the first cylindrical surface Sc1 of the inner member 81. The third cylindrical surface Sc3 is cylindrically formed centering around the axis of fixed core 50 (see FIG. 9).

As illustrated in FIG. 9, housing 20 has a fourth cylindrical surface Sc4. The fourth cylindrical surface Sc4 is formed on the inner peripheral wall of the outer cylinder portion 21 of housing 20 to radially face the second cylindrical surface Sc2 of the outer member 85. The fourth cylindrical surface Sc4 is cylindrically formed centering around the axis of the outer cylinder portion 21 (see FIG. 9).

The annular stepped surface 205 is formed on the inner peripheral wall of the outer cylinder portion 21. The outer member 85 of the upper housing 80 abuts on the stepped surface 205 and is restrained from moving toward the nozzle hole 13.

The description below explains how to assemble the upper housing 80 between the fixed core 50 and the housing 20.

In terms of the method for manufacturing the fuel injection valve 1 according to the present embodiment, "housing assembling process", "coil assembling process", and "molding process" are similar to the first embodiment and a description is omitted for brevity. Only the "upper housing assembling process" will be described below.

Upper Housing Assembling Process

After the coil assembling process, insert the upper housing 80 between the fixed core 50 and the housing 20. Specifically, insert the outer member 85 of the upper housing 80 from the fixed core 50 opposite to the nozzle hole 13. Insert or press fit the outer member 85 into the outer cylinder portion 21 of housing 20 while the bobbin extension portion 552 is positioned at the cutout portion 87 of the outer member 85. The outer member 85 abuts on the stepped surface 205 and is restrained from moving toward the nozzle hole 13.

Then, insert the inner member 81 of the upper housing 80 from the fixed core 50 opposite to the nozzle hole 13. Press-fit the inner member 81 into the outer member 85 while the bobbin extension portion 552 is positioned at the cutout portion 83 of the inner member 81.

Figure 13:
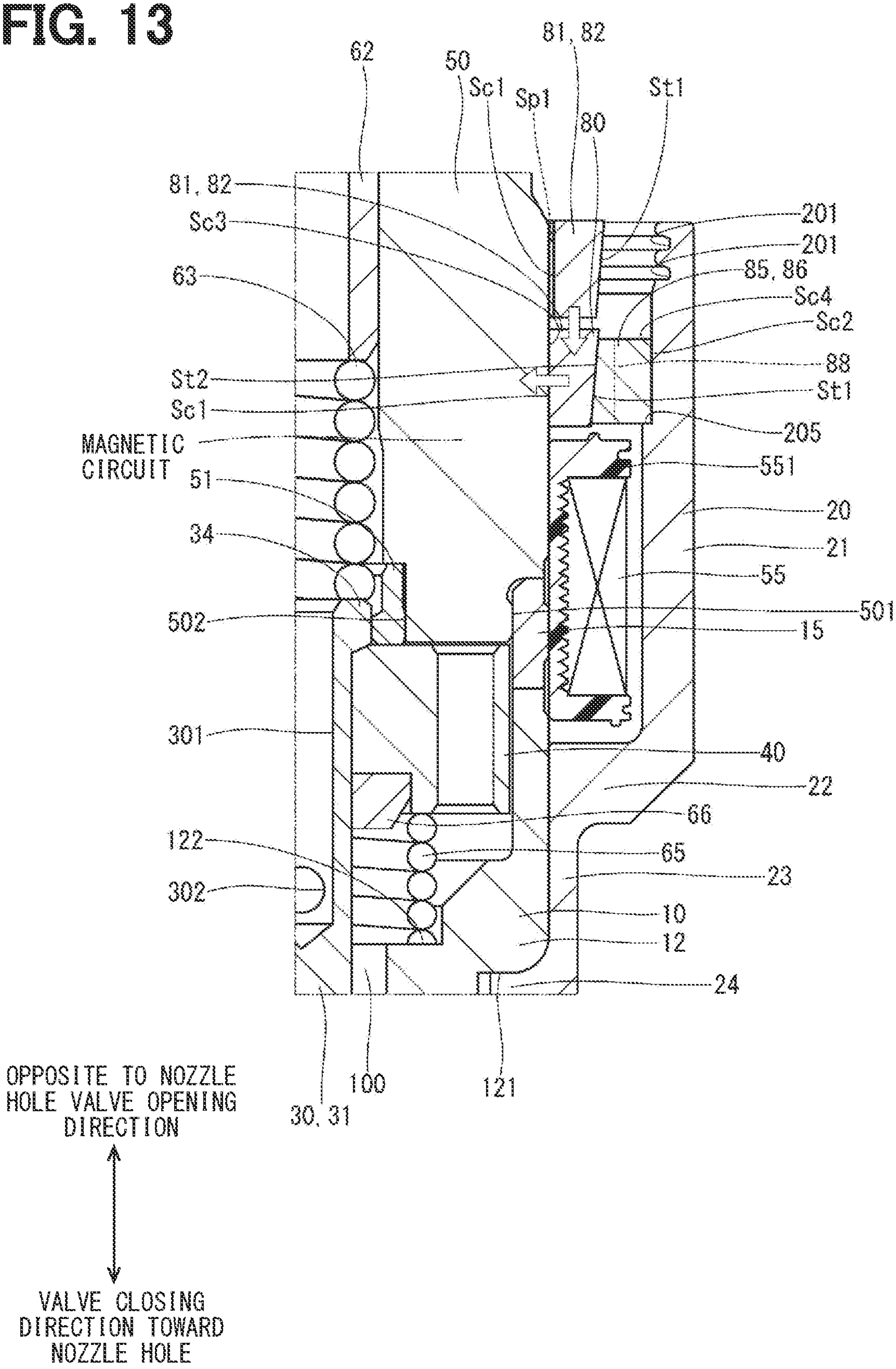
FIG. 13 is a sectional view illustrating an assembling process for the upper housing of the fuel injection valve according to the third embodiment.

As illustrated in FIG. 13, the inner member 81 is press-fitted inside of the outer member 85. The outer peripheral wall of the inner member 81, namely, the first tapered surface St1 is positioned farther from the nozzle hole 13 than the second tapered surface St2 and radially faces the inner peripheral wall of the outer cylinder portion 21 of housing 20. When the first tapered surface St1 and the second tapered surface St2 do not radially face, the inner diameter of the first cylindrical surface Sc1 is larger than the outer diameter of the third cylindrical surface Sc3. Therefore, the gap Sp1 is formed between the inner peripheral wall of the inner member 81, namely, the first cylindrical surface Sc1 and the outer peripheral wall of the fixed core 50 at least at part of the inner member 81 of the upper housing 80 in the circumferential direction.

When the first tapered surface St1 and the second tapered surface St2 do not radially face, the outer diameter of the first tapered surface St1 at the end toward the nozzle hole 13 is larger than the inner diameter of the second tapered surface St2 at the end toward the nozzle hole 13.

In this state, move the upper housing 81 further toward the nozzle hole 13. The first tapered surface St1 of the upper housing 81 touches and slides on the second tapered surface St2 of the outer member 85. At this time, the upper housing 81 deforms radially inward to decrease the inner and outer diameters. Therefore, the first cylindrical surface Sc1 of the upper housing 81 abuts on and closely adheres to the third cylindrical surface Sc3 of the fixed core 50.

At this time, the outer member 85 deforms radially outward to increase the inner and outer diameters. Therefore, the second cylindrical surface Sc2 of the outer member 85 closely adheres to the fourth cylindrical surface Sc4 of the housing 20.

After the upper housing 80 is assembled, the first tapered surface St1 closely adheres to the second tapered surface St2. The first cylindrical surface Sc1 closely adheres to the third cylindrical surface Sc3. The second cylindrical surface Sc2 closely adheres to the fourth cylindrical surface Sc4 (see FIGS. 9 and 13).

The inner member 81 is managed based on loads instead of constantly sized press-fitting. It is possible to inhibit the first tapered surface St1 and the second tapered surface St2 from causing variations due to constantly sized press-fitting of both the outer member 85 and the inner member 81.

As illustrated in FIGS. 10 and 11, angle θ1 is formed by lines connecting the axis of inner member 81 and both ends of cutout portion 83, and angle θ2 is formed by lines connecting the axis of outer member 85 and both ends of cutout portion 87. Angle θ1 is larger than angle θ2 before the upper housing 80 is assembled between the fixed core 50 and the housing 20. Angle θ1 is approximately equal to angle θ2 after the upper housing 80 is assembled between the fixed core 50 and the housing 20 (see FIGS. 9 and 13). As above, angle θ1 is formed by lines connecting the axis of inner member 81 and both ends of cutout portion 83, and angle θ2 is formed by lines connecting the axis of outer member 85 and both ends of cutout portion 87.

The present embodiment assumes that H1 denotes the hardness of the fixed core 50, H2 denotes the hardness of the inner member 81, H3 denotes the hardness of the outer member 85, and H4 denotes the hardness of the housing 20. Then, the fixed core 50, the inner member 81, the outer member 85, and the housing 20 are formed to satisfy the relationship of H1, H4>H2, H3 due to the heat treatment, for example. Therefore, the inner member 81 and the outer member 85 can be easily deformed radially when the upper housing 80 is assembled between the fixed core 50 and the housing 20.

The description below compares the present embodiment with a second comparative mode and explains the technical advantages of the present embodiment over the second comparative mode.

The second comparative mode differs from the first comparative mode in that a magnetic material ring 79 is further included. The magnetic ring 79 is approximately C-shaped and is made of a magnetic material such as metal. The magnetic ring 79 is provided between the fixed core 50 and the housing 20 farther from the nozzle hole 13 than the upper housing 70.

Before the assembly, the magnetic ring 79 has an inner diameter smaller than the outer diameter of the fixed core 50 and an outer diameter smaller than the inner diameter of the outer cylinder portion 21 of housing 20. During the assembly, the magnetic ring 79 is press-fitted while the inner peripheral wall touches the outer peripheral wall of the fixed core 50. The magnetic ring 79 is pushed until abutting on the upper housing 70.

The second comparative mode may cause springback when the magnetic ring 79 is press-fitted. After the magnetic ring 79 is assembled, a gap as a magnetic gap may be formed between the end face of the upper housing 70 toward the magnetic ring 79 and the end face of the magnetic ring 79 toward the upper housing 70.

When the coil 55 is energized, the fixed core 50, the magnetic ring 79, the upper housing 70, and the housing 20 may hardly form an efficient magnetic circuit having a small magnetic gap and a low magnetic resistance. In this case, it may be difficult to efficiently generate an attractive force corresponding to the current supplied to the coil 55. The energy required to drive the fuel injection valve may increase.

According to the present embodiment, the inner member 81 of the upper housing 80 includes the first tapered surface St1 and the outer member 85 of the upper housing 80 includes the second tapered surface St2. After the upper housing 80 is assembled, the first tapered surface St1 of the inner member 81 closely adheres to the second tapered surface St2 of the outer member 85. The first cylindrical surface Sc1 of the inner member 81 closely adheres to the third cylindrical surface Sc3 of the fixed core 50. The second cylindrical surface Sc2 of outer member 85 closely adheres to the fourth cylindrical surface Sc4 of the housing 20.

The present embodiment causes no springback when the inner member 81 is press-fitted. The inner member 81, the fixed core 50, and outer member 85 can remain closely adhered to each other.

When the coil 55 is energized, it is possible to form an efficient magnetic circuit having a small magnetic gap and a low magnetic resistance through the fixed core 50, the inner member 81 of the upper housing 80, the outer member 85, and the housing 20 (see FIG. 9). Therefore, it is possible to efficiently generate an attractive force corresponding to the current supplied to the coil 55 and decrease the energy required to drive the fuel injection valve 1. Consequently, it is possible to reduce the power consumption of the fuel injection valve 1.

According to the present embodiment, the outer member 85 of the upper housing 80 abuts on the stepped surface 205 of the housing 20 and is restrained from moving toward the nozzle hole 13. Even when the inner member 81 is press-fitted into the outer member 85, the distance between the outer member 85 and the bobbin 551 can remain constant.

Before the inner member 81 is assembled into the outer member 85 according to the present embodiment, the first tapered surface St1 of the inner member 81 shows a diameter reduction rate slightly larger than that of the second tapered surface St2 of the outer member 85. The diameter reduction rate represents a degree of decreasing the diameter. When the inner member 81 is press-fitted into the outer member 85 during the upper housing assembling process, the outer peripheral wall of the inner member 81 at the end opposite to the nozzle hole 13 first touches the inner peripheral wall of the outer member 85.

According to the present embodiment, as above, the upper housing 80 includes the inner member 81 and the outer member 85 provided radially outside the inner member 81. The inner member 81 includes the first tapered surface St1 formed on the outer peripheral wall and the first cylindrical surface Sc1 formed on the inner peripheral wall. The outer member 85 includes the second tapered surface St2 formed on the inner peripheral wall and the second cylindrical surface Sc2 formed on the outer peripheral wall. The second tapered surface St2 radially faces the first tapered surface St1. The fixed core 50 includes the third cylindrical surface Sc3 that radially faces the first cylindrical surface Sc1. The housing 20 includes the fourth cylindrical surface Sc4 that radially faces the second cylindrical surface Sc2.

Before assembling the upper housing 80, configure appropriate diameters for the first tapered surface St1, the second tapered surface St2, the first cylindrical surface Sc1, the second cylindrical surface Sc2, the third cylindrical surface Sc3, and the fourth cylindrical surface Sc4. When assembling the upper housing 80, insert the inner member 81 between the fixed core 50 and the outer member 85 with respect to the coil 55 opposite to the nozzle hole 13 while the outer member 85 is inserted between the fixed core 50 and the housing 20. Then, the inner member 81 can be deformed radially inward to allow the first cylindrical surface Sc1 and the third cylindrical surface Sc3 to be abutted and closely adhered to each other while sliding the first tapered surface St1 and the second tapered surface St2 in the axial direction. The outer member 85 can be deformed radially outward to allow the second cylindrical surface Sc2 and the fourth cylindrical surface Sc4 to be abutted and closely adhered to each other.

After the upper housing 80 is assembled, the first tapered surface St1 closely adheres to the second tapered surface St2. The first cylindrical surface Sc1 closely adheres to the third cylindrical surface Sc3. The second cylindrical surface Sc2 closely adheres to the fourth cylindrical surface Sc4.

Therefore, the fixed core 50, the upper housing 80, and the housing 20 can form an efficient magnetic circuit having a small magnetic gap and a low magnetic resistance. It is possible to efficiently generate an attractive force corresponding to the current supplied to the coil 55 and decrease the energy required to drive the fuel injection valve 1. Consequently, it is possible to reduce the power consumption of the fuel injection valve 1.

According to the present embodiment, the upper housing 80 is composed of two members, the inner member 81 and the outer member 85. This makes it possible to reduce the radial size or the width of each member. When the upper housing 80 is assembled, the inner member 81 and the outer member 85 of the upper housing 80 can be easily deformed radially. This makes it possible to reduce assembling loads on the upper housing 80 and improve assembly efficiency. After the upper housing 80 is assembled, the first tapered surface St1 more closely adheres to the second tapered surface St2. The first cylindrical surface Sc1 more closely adheres to the third cylindrical surface Sc3. The second cylindrical surface Sc2 more closely adheres to the fourth cylindrical surface Sc4.

According to the present embodiment, the inner diameter of the first cylindrical surface Sc1 is larger than the outer diameter of the third cylindrical surface Sc3 when the first tapered surface St1 and the second tapered surface St2 do not face radially. The first cylindrical surface Sc1 abuts on the third cylindrical surface Sc3 when the first tapered surface St1 and the second tapered surface St2 face radially.

When the upper housing 80 is assembled, the inner member 81 can be easily inserted radially outside the fixed core 50 with respect to the coil 55 opposite to the nozzle hole 13. After the upper housing 80 is assembled, the first tapered surface St1 can closely adhere to the second tapered surface St2. The first cylindrical surface Sc1 can closely adhere to the third cylindrical surface Sc3. Therefore, the fixed core 50, the upper housing 80, and the housing 20 can form an efficient magnetic circuit having a small magnetic gap and a low magnetic resistance.

According to the present embodiment, the axial length of the inner member 81 is larger than the axial length of the outer member 85.

Suppose the axial length of the inner member 81 is equal to the axial length of the outer member 85. Then, the area of a magnetic path formed on the inner peripheral wall of the inner member 81 is smaller than the area of a magnetic path formed on the outer peripheral wall of the outer member 85. According to the present embodiment, the axial length of the inner member 81 is larger than the axial length of the outer member 85. Therefore, the area of a magnetic path formed on the inner peripheral wall of the inner member 81 can be approximately equal to the area of a magnetic path formed on the outer peripheral wall of the outer member 85. The fixed core 50, the upper housing 80, and the housing 20 can form a more efficient magnetic circuit.

The end face of the inner member 81 toward the nozzle hole 13 is positioned nearer to the nozzle hole 13 than the end face of the outer member 85 toward the nozzle hole 13. The end face of the inner member 81 opposite to the nozzle hole 13 is positioned farther from the nozzle hole 13 than the end face of the outer member 85 opposite to the nozzle hole 13. Namely, the outer member 85 is axially positioned within the axial length of the inner member 81.

It is possible to ensure the maximum axial length of contact between the first tapered surface St1 and the second tapered surface St2 and the maximum area of a magnetic path between the first tapered surface St1 and the second tapered surface St2.

Fourth Embodiment

Figure 15:
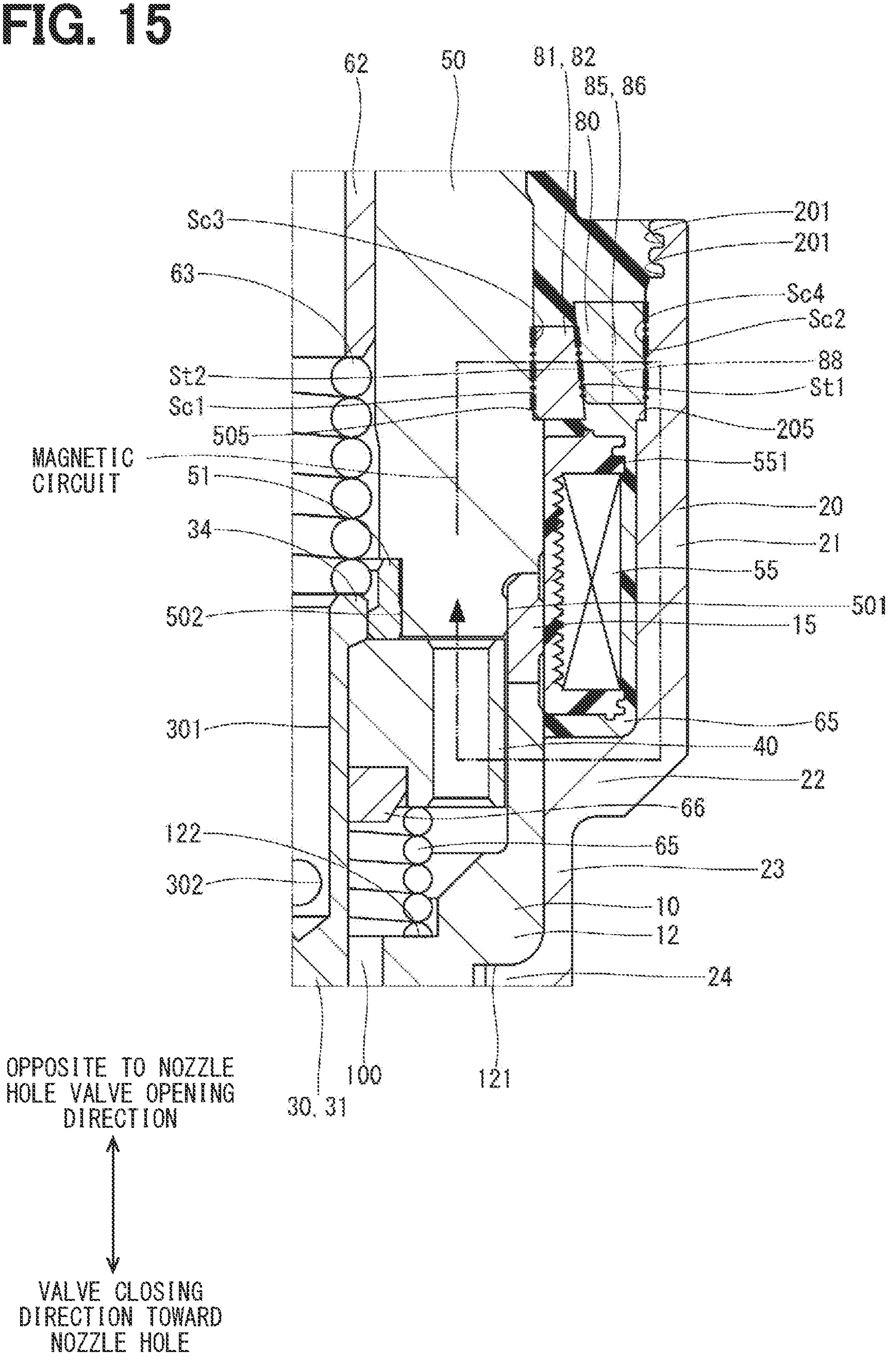
FIG. 15 is a sectional view illustrating the upper housing and the vicinity of the fuel injection valve according to a fourth embodiment.

FIG. 15 illustrates part of the fuel injection valve according to the fourth embodiment. The fourth embodiment differs from the third embodiment in the configurations of the upper housing 80 and the fixed core 50, for example.

According to the present embodiment, the first tapered surface St1 and the second tapered surface St2 are tapered to approach the axis of the upper housing 80 at a predetermined ratio from the side toward the nozzle hole 13 to the side opposite to the nozzle hole 13 with respect to the upper housing 80 (see FIG. 15).

An annular stepped surface 505 is formed on the outer peripheral wall of the fixed core 50. The inner member 81 of the upper housing 80 abuts on the stepped surface 505 and is restrained from moving toward the nozzle hole 13.

The description below explains how to assemble the upper housing 80 between the fixed core 50 and the housing 20.

Upper Housing Assembling Process

After the coil assembling process, insert the upper housing 80 between the fixed core 50 and the housing 20. Specifically, insert the inner member 81 of the upper housing 80 from the fixed core 50 opposite to the nozzle hole 13. Press-fit the inner member 81 outside the fixed core 50 while the bobbin extension portion 552 is positioned at the cutout portion 83 of the inner member 81. The inner member 81 abuts on the stepped surface 505 and is restrained from moving toward the nozzle hole 13.

Then, insert the outer member 85 of the upper housing 80 from the fixed core 50 opposite to the nozzle hole 13. Press-fit the outer member 85 outside the inner member 81 while the bobbin extension portion 552 is positioned at the cutout portion 87 of the outer member 85.

Figure 16:
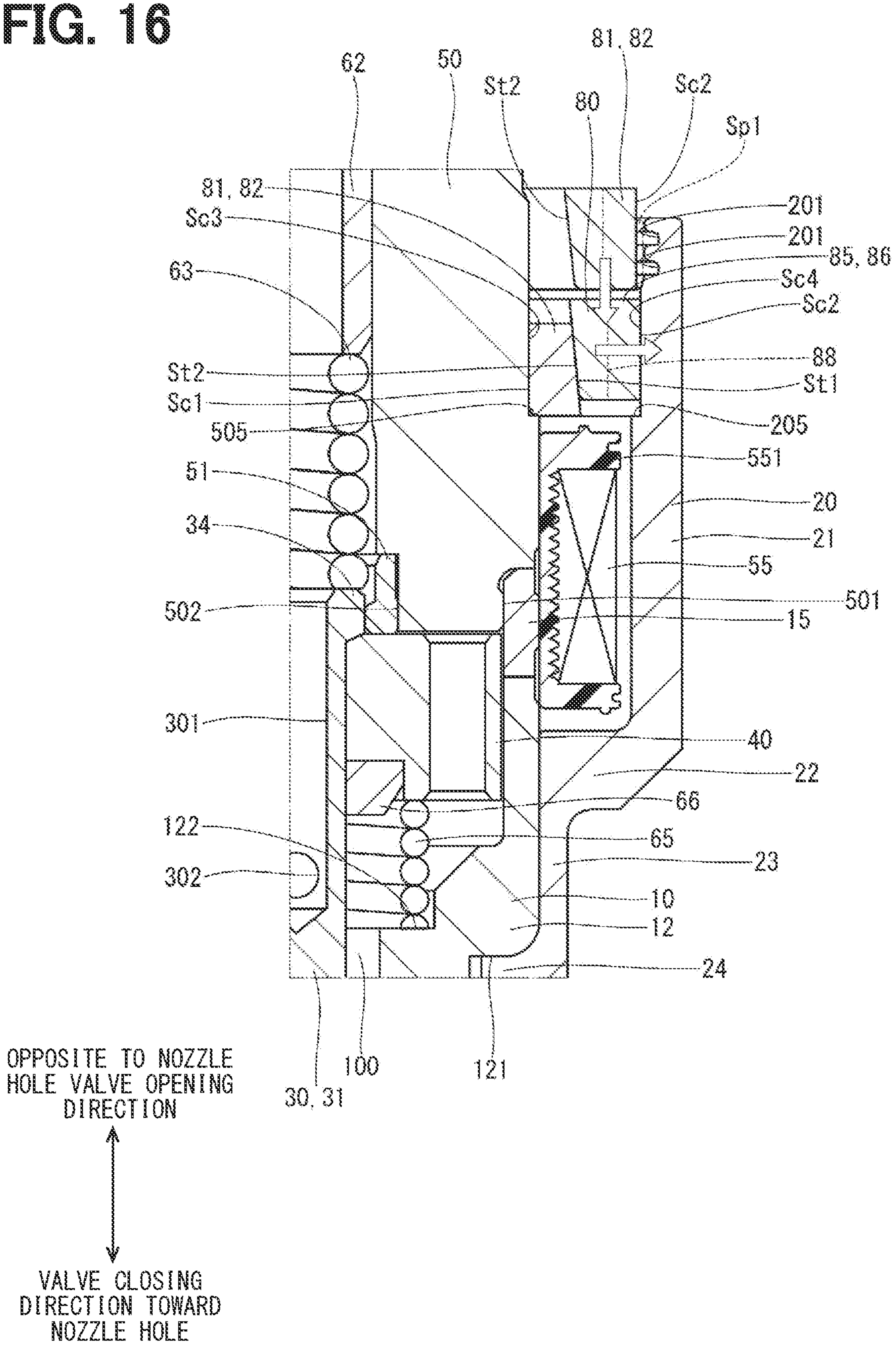
FIG. 16 is a sectional view illustrating an assembling process for the upper housing of the fuel injection valve according to the fourth embodiment.

As illustrated in FIG. 16, the outer member 85 is press-fitted outside the inner member 81. The inner peripheral wall of the outer member 85, namely, the second tapered surface St2 is positioned opposite to the nozzle hole 13 with respect to the first tapered surface St1 and radially faces the outer peripheral wall of the fixed core 50. When the first tapered surface St1 and the second tapered surface St2 do not radially face, the outer diameter of the second cylindrical surface Sc2 is smaller than the inner diameter of the fourth cylindrical surface Sc4. Therefore, the gap Sp1 is formed between the outer peripheral wall of the outer member 85, namely, the second cylindrical surface Sc2 and the inner peripheral wall of the outer cylinder portion 21 of the housing 20 at least at a part of the outer member 85 of the upper housing 80 in the circumferential direction.

When the first tapered surface St1 and the second tapered surface St2 do not radially face, the inner diameter of the second tapered surface St2 at the end toward the nozzle hole 13 is smaller than the outer diameter of the first tapered surface St1 at the end toward the nozzle hole 13.

In this state, move the outer member 85 further toward the nozzle hole 13. The second tapered surface St2 of the outer member 85 touches and slides on the first tapered surface St1 of the inner member 81. At this time, the outer member 85 deforms radially outward to increase the inner and outer diameters. Therefore, the second cylindrical surface Sc2 of the outer member 85 abuts on and closely adheres to the fourth cylindrical surface Sc4 of the housing 20.

The inner member 81 deforms radially inward to decrease the inner and outer diameters. Therefore, the first cylindrical surface Sc1 of the inner member 81 closely adheres to the third cylindrical surface Sc3 of the fixed core 50.

After the upper housing 80 is assembled, the first tapered surface St1 closely adheres to the second tapered surface St2. The first cylindrical surface Sc1 closely adheres to the third cylindrical surface Sc3. The second cylindrical surface Sc2 closely adheres to the fourth cylindrical surface Sc4 (see FIGS. 15 and 16).

According to the present embodiment, the inner member 81 of the upper housing 80 abuts on the stepped surface 505 of the fixed core 50 and is restrained from moving toward the nozzle hole 13. Even when the outer member 85 is press-fitted outside the inner member 81, the distance between the inner member 81 and the bobbin 551 can remain constant.

Before the outer member 85 is assembled outside the inner member 81 according to the present embodiment, the second tapered surface St2 of the outer member 85 shows a diameter reduction rate slightly larger than that of the first tapered surface St1 of the inner member 81. The diameter reduction rate represents a degree of decreasing the diameter. When the outer member 85 is press-fitted outside the inner member 81 during the upper housing assembling process, the inner peripheral wall of the outer member 85 at the end opposite to the nozzle hole 13 first touches the outer peripheral wall of the inner member 81.

According to the present embodiment, as above, before assembling the upper housing 80, configure appropriate diameters for the first tapered surface St1, the second tapered surface St2, the first cylindrical surface Sc1, the second cylindrical surface Sc2, the third cylindrical surface Sc3, and the fourth cylindrical surface Sc4. When assembling the upper housing 80, insert the outer member 85 between the inner member 81 and the housing 20 with respect to the coil 55 opposite to the nozzle hole 13 while the inner member 81 is inserted between the fixed core 50 and the housing 20. Then, the outer member 85 can be deformed radially outward to allow the second cylindrical surface Sc2 and the fourth cylindrical surface Sc4 to be abutted and closely adhered to each other while sliding the first tapered surface St1 and the second tapered surface St2 in the axial direction. The inner member 81 can be deformed radially inward to allow the first cylindrical surface Sc1 and the third cylindrical surface Sc3 to be abutted and closely adhered to each other.

After the upper housing 80 is assembled, the first tapered surface St1 closely adheres to the second tapered surface St2. The first cylindrical surface Sc1 closely adheres to the third cylindrical surface Sc3. The second cylindrical surface Sc2 closely adheres to the fourth cylindrical surface Sc4.

Similar to the third embodiment, the fixed core 50, the upper housing 80, and the housing 20 can form an efficient magnetic circuit having a small magnetic gap and a low magnetic resistance.

According to the present embodiment, the inner member 81 is press-fitted into the fixed core 50 when the upper housing 80 is assembled. Therefore, the inner peripheral wall of the inner member 81 as a pressing side stably adheres to the outer peripheral wall of the fixed core 50. It is possible to easily ensure the magnetic path area on the inner peripheral wall of the inner member 81 of the upper housing 80. The inner peripheral wall of the inner member 81 tends to cause the magnetic path area to be smaller than the outer peripheral wall of the outer member 85 in the upper housing 80.

According to the present embodiment, the outer diameter of the second cylindrical surface Sc2 is smaller than the inner diameter of the fourth cylindrical surface Sc4 when the first tapered surface St1 and the second tapered surface St2 do not face radially. The second cylindrical surface Sc2 abuts on the fourth cylindrical surface Sc4 when the first tapered surface St1 and the second tapered surface St2 face radially.

When the upper housing 80 is assembled, the outer member 85 can be easily inserted radially inside the outer cylinder portion 21 of the housing 20 with respect to the coil 55 opposite to the nozzle hole 13. After the upper housing 80 is assembled, the first tapered surface St1 can closely adhere to the second tapered surface St2. The second cylindrical surface Sc2 can closely adhere to the fourth cylindrical surface Sc4. Therefore, the fixed core 50, the upper housing 80, and the housing 20 can form an efficient magnetic circuit having a small magnetic gap and a low magnetic resistance.

Fifth Embodiment

Figure 17:
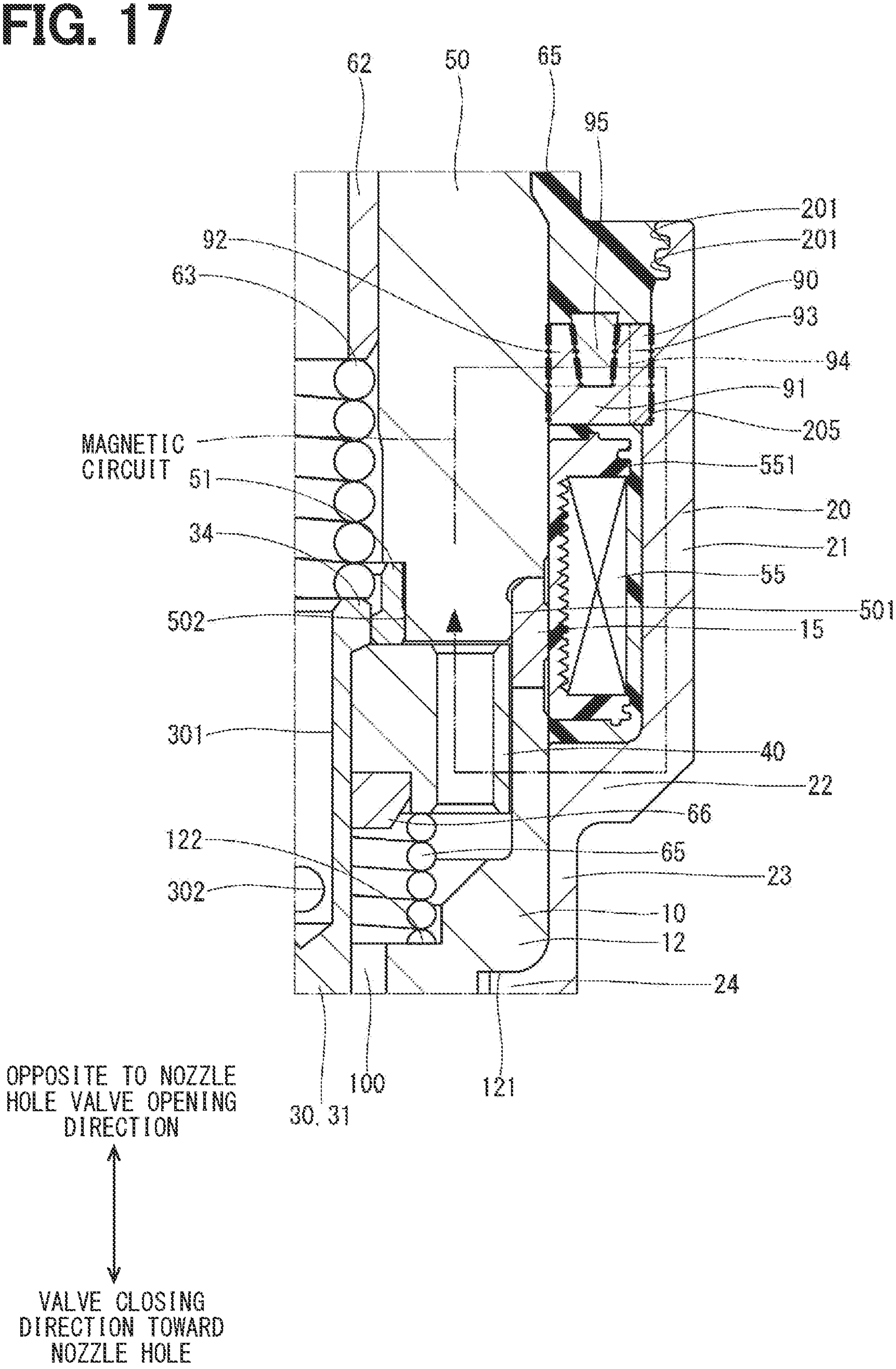
FIG. 17 is a sectional view illustrating the upper housing and the vicinity of the fuel injection valve according to a fifth embodiment.

FIG. 17 illustrates part of the fuel injection valve according to the fifth embodiment. The fifth embodiment differs from the third embodiment in the configurations of the upper housing, for example.

According to the present embodiment, the upper housing 90 includes a bottom portion 91, an inward extended portion 92, and an outward extended portion 93.

The bottom portion 91, the inward extended portion 92, and the outward extended portion 93 are integrally formed and are made of a magnetic material such as metal. The bottom portion 91 is approximately C-shaped. The inward extended portion 92 is approximately C-shaped cylindrically to extend from the inner edge portion of the bottom portion 91 in the axial direction of the bottom portion 91. The outward extended portion 93 is approximately C-shaped cylindrically to extend from the outer edge portion of the bottom portion 91 in the axial direction of the bottom portion 91. The upper housing 90 includes a cutout portion at a part in the circumferential direction and is C-shaped when viewed in the axial direction.

An approximately C-shaped groove 900 is formed between the inward extended portion 92 and the outward extended portion 93. The outward extended portion 93 is formed with a recessed portion 94 that is radially inward recessed from the outer peripheral wall. For example, five recessed portions 94 are formed at equal intervals in the circumferential direction of the outward extended portion 93.

The upper housing 90 is provided between the fixed core 50 and the housing 20 opposite to the nozzle hole 13 with respect to the coil 55. The outer edge portion of the bottom portion 91 of the upper housing 90 abuts on the stepped surface 205 of the housing 20.

The present embodiment further includes an intermediate member 95. The intermediate member 95 is approximately C-shaped cylindrically and is made of a magnetic material such as metal. The inner peripheral wall of the intermediate member 95 is tapered to approach the axis of the intermediate member 95 at a predetermined ratio from one side to the other side in the axial direction of the intermediate member 95. The outer peripheral wall of the intermediate member 95 is tapered to separate from the axis of the intermediate member 95 at a predetermined ratio from one side to the other side in the axial direction of the intermediate member 95.

The intermediate member 95 is provided for the groove portion 900 between the inward extended portion 92 and the outward extended portion 93 of the upper housing 90. The intermediate member 95 is provided so that the radially shorter or narrower one of the two axial end faces the bottom portion 91. When one end face of the intermediate member 95 abuts on the bottom portion 91, the other end face is positioned farther from the nozzle hole 13 than the end faces opposite to the bottom portion 91 of the inward extended portion 92 and the outward extended portion 93 of the upper housing 90.

Suppose the intermediate member 95 is provided between the inward extended portion 92 and the outward extended portion 93. Then, the intermediate member 95 can press the inward extended portion 92 of the upper housing 90 radially inward of the bottom portion 91. The intermediate member 95 can press the outward extended portion 93 of the upper housing 90 radially outward of the bottom portion 91.

When the intermediate member 95 is provided for the groove portion 900 as illustrated in FIG. 15, the inner peripheral wall of the intermediate member 95 closely adheres to the outer peripheral wall of inward extended portion 92 of the upper housing 90. The outer peripheral wall of the intermediate member 95 closely adheres to the outer peripheral wall of the outer extended portion 93 of the upper housing 90. The inner peripheral wall of the upper housing 90 closely adheres to the outer peripheral wall of the fixed core 50. The outer peripheral wall of the upper housing 90 closely adheres to the inner peripheral wall of the outer cylinder portion 21 of the housing 20.

The outer peripheral wall of the inward extended portion 92 of the upper housing 90 is tapered to approach the axis of the inward extended portion 92 at a predetermined ratio from the side of the inward extended portion 92 axially toward the nozzle hole 13 to the side opposite to the nozzle hole 13. The inner peripheral wall of the outer peripheral portion 93 of the upper housing 90 is tapered to separate from the axis of the outward extended portion 93 at a predetermined ratio from the side of the outward extended portion 93 axially toward the nozzle hole 13 to the side opposite to the nozzle hole 13.

The description below explains how to assemble the upper housing 90 between the fixed core 50 and the housing 20.

Upper Housing Assembling Process

After the coil assembling process, insert the upper housing 90 between the fixed core 50 and the housing 20. Specifically, first, insert the upper housing 90 from the fixed core 50 opposite to the nozzle hole 13. Then, insert the upper housing 90 between the fixed core 50 and the housing 20 while positioning the bobbin extension portion 552 at the cutout portion. The upper housing 90 abuts on the stepped surface 205 and is restrained from moving toward the nozzle hole 13 (see FIG. 18).

Insert the intermediate member 95 from the fixed core 50 opposite to the nozzle hole 13. Press-fit the intermediate member 95 into the groove portion 900 of the upper housing 90 while positioning the bobbin extension portion 552 at the cutout portion.

Figure 18:
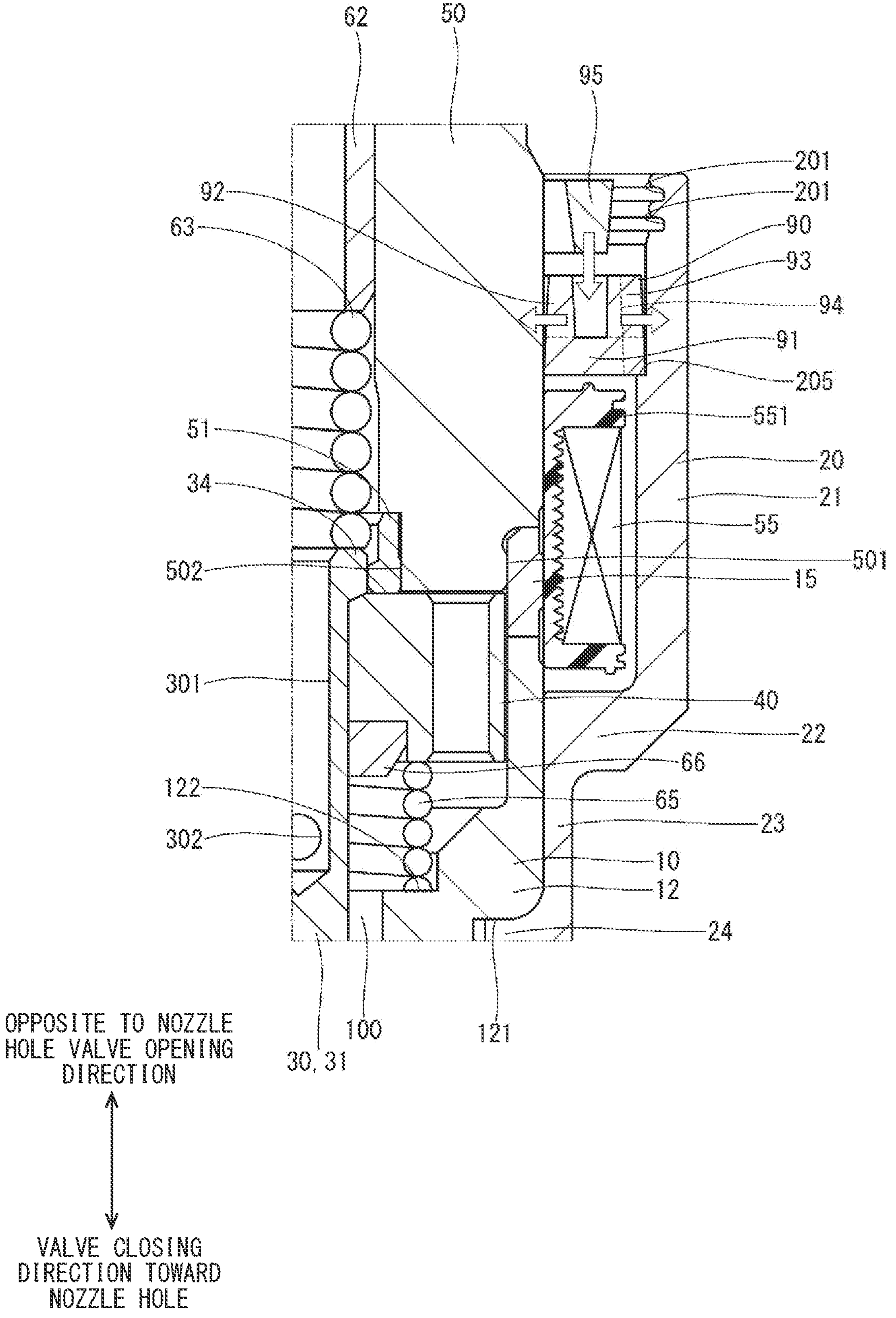
FIG. 18 is a sectional view illustrating an assembling process for the upper housing of the fuel injection valve according to the fifth embodiment.

FIG. 18 illustrates the state before the intermediate member 95 is press-fitted into the groove portion 900. In this state, the inner peripheral wall of the intermediate member 95 and the outer peripheral wall of the inward extended portion 92 do not radially face each other. The outer peripheral wall of the intermediate member 95 and the inner peripheral wall of the outward extended portion 93 do not radially face each other. The inner peripheral wall of the inward extended portion 92 is tapered to separate from the axis at a predetermined ratio axially from the side toward the nozzle hole 13 to the side opposite to the nozzle hole 13. The inner peripheral wall opposite to the nozzle hole 13 is distant from the outer peripheral wall of the fixed core 50. In this state, the outer peripheral wall of the outward extended portion 93 is tapered to approach the axis at a predetermined ratio axially from the side toward the nozzle hole 13 to the side opposite to the nozzle hole 13. The outer peripheral wall opposite to the nozzle hole 13 is distant from the inner peripheral wall of the outer cylinder portion 21 of the housing 20.

In this state, the outer peripheral wall of the inward extended portion 92 is tapered to approach the axis at a predetermined ratio axially from the side toward the nozzle hole 13 to the side opposite to the nozzle hole 13. The inner peripheral wall of the outward extended portion 93 is tapered to separate from the axis at a predetermined ratio axially from the side toward the nozzle hole 13 to the side opposite to the nozzle hole 13.

In this state, insert the intermediate member 95 into the groove portion 900 and move it toward the nozzle hole 13. Then, the inner peripheral wall of the intermediate member 95 and the outer peripheral wall of the inward extended portion 92 touch and slide. The outer peripheral wall of the intermediate member 95 and the inner peripheral wall of the outward extended portion 93 touch and slide. The inward extended portion 92 deforms radially inward so that the inner and outer diameters decrease. The inner peripheral wall of the inward extended portion 92 abuts on and closely adheres to the outer peripheral wall of the fixed core 50.

The outward extended portion 93 deforms radially outward so that the inner and outer diameters increase. The outer peripheral wall of the outward extended portion 93 abuts on and closely adheres to the inner peripheral wall of the outer cylinder portion 21 of the housing 20.

After the upper housing 90 and the intermediate member 95 are assembled, the inner peripheral wall of the intermediate member 95 closely adheres to the outer peripheral wall of the inward extended portion 92. The outer peripheral wall of the intermediate member 95 closely adheres to the inner peripheral wall of the outward extended portion 93. The inner peripheral wall of the upper housing 90 closely adheres to the outer peripheral wall of the fixed core 50. The outer peripheral wall of the upper housing 90 closely adheres to the inner peripheral wall of the outer cylinder portion 21 of the housing 20 (see FIG. 17).

When the coil 55 is energized, the above-described configuration can form an efficient magnetic circuit having a small magnetic gap and a low magnetic resistance through the fixed core 50, the upper housing 90, the intermediate member 95, and the housing 20 (see FIG. 17).

According to the present embodiment, as above, the upper housing 90 includes the bottom portion 91, the inward extended portion 92, and the outward extended portion 93. The inward extended portion 92 is formed to extend from the inner edge portion of the bottom portion 91 in the axial direction of the bottom portion 91. The outward extended portion 93 is formed to extend from the outer edge portion of the bottom portion 91 in the axial direction of the bottom portion 91.

The present embodiment further includes the intermediate member 95 provided between the inward extended portion 92 and the outward extended portion 93.

Before assembling the upper housing 90, appropriately configure the inner diameter of the inward extended portion 92 and the outer diameter of the outer extended portion 93 of the upper housing 90, the outer diameter of the fixed core 50, the inner diameter of the housing 20, and the inner and outer diameters of the intermediate member 95. When assembling the upper housing 90 and the intermediate member 95, insert the upper housing 90 between the fixed core 50 and the housing 20 with respect to the coil 55 opposite to the nozzle hole 13. Insert the intermediate member 95 between inward extended portion 92 and outward extended portion 93. Then, the inner peripheral wall of the intermediate member 95 and the outer peripheral wall of the inward extended portion 92 can axially slide. The outer peripheral wall of the intermediate member 95 and the inner peripheral wall of the outward extended portion 93 can axially slide. Meanwhile, the inward extended portion 92 can be deformed radially inward. The outward extended portion 93 can be deformed radially outward.

After the upper housing 90 and the intermediate member 95 are assembled, the inner peripheral wall of intermediate member 95 closely adheres to the outer peripheral wall of the inward extended portion 92. The outer peripheral wall of the intermediate member 95 closely adheres to the inner peripheral wall of the outward extended portion 93. The inner peripheral wall of the inward extended portion 92 closely adheres to the outer peripheral wall of the fixed core 50. The outer peripheral wall of the outward extended portion 93 closely adheres to the inner peripheral wall of the housing 20.

Therefore, the fixed core 50, the upper housing 90, the intermediate member 95, and the housing 20 can form an efficient magnetic circuit having a small magnetic gap and a low magnetic resistance. It is possible to efficiently generate an attractive force corresponding to the current supplied to the coil 55 and decrease the energy required to drive the fuel injection valve 1. Consequently, it is possible to reduce the power consumption of the fuel injection valve 1.

According to the present embodiment, the intermediate member 95 is provided to be able to press the inward extended portion 92 inward in the radial direction of the bottom portion 91. Therefore, the inner peripheral wall of the inward extended portion 92 can more closely adhere to the outer peripheral wall of the fixed core 50.

According to the present embodiment, the intermediate member 95 is provided to be able to press the outward extended portion 93 outward in the radial direction of the bottom portion 91. Therefore, the outer peripheral wall of the outward extended portion 93 can more closely adhere to the inner peripheral wall of the housing 20.

According to the present embodiment, the intermediate member 95, as well as the upper housing 90, can form a magnetic circuit. Therefore, the fixed core 50, the upper housing 90, the intermediate member 95, and the housing 20 can reliably form an efficient magnetic circuit having a small magnetic gap and a low magnetic resistance.

Sixth Embodiment

Figure 19:
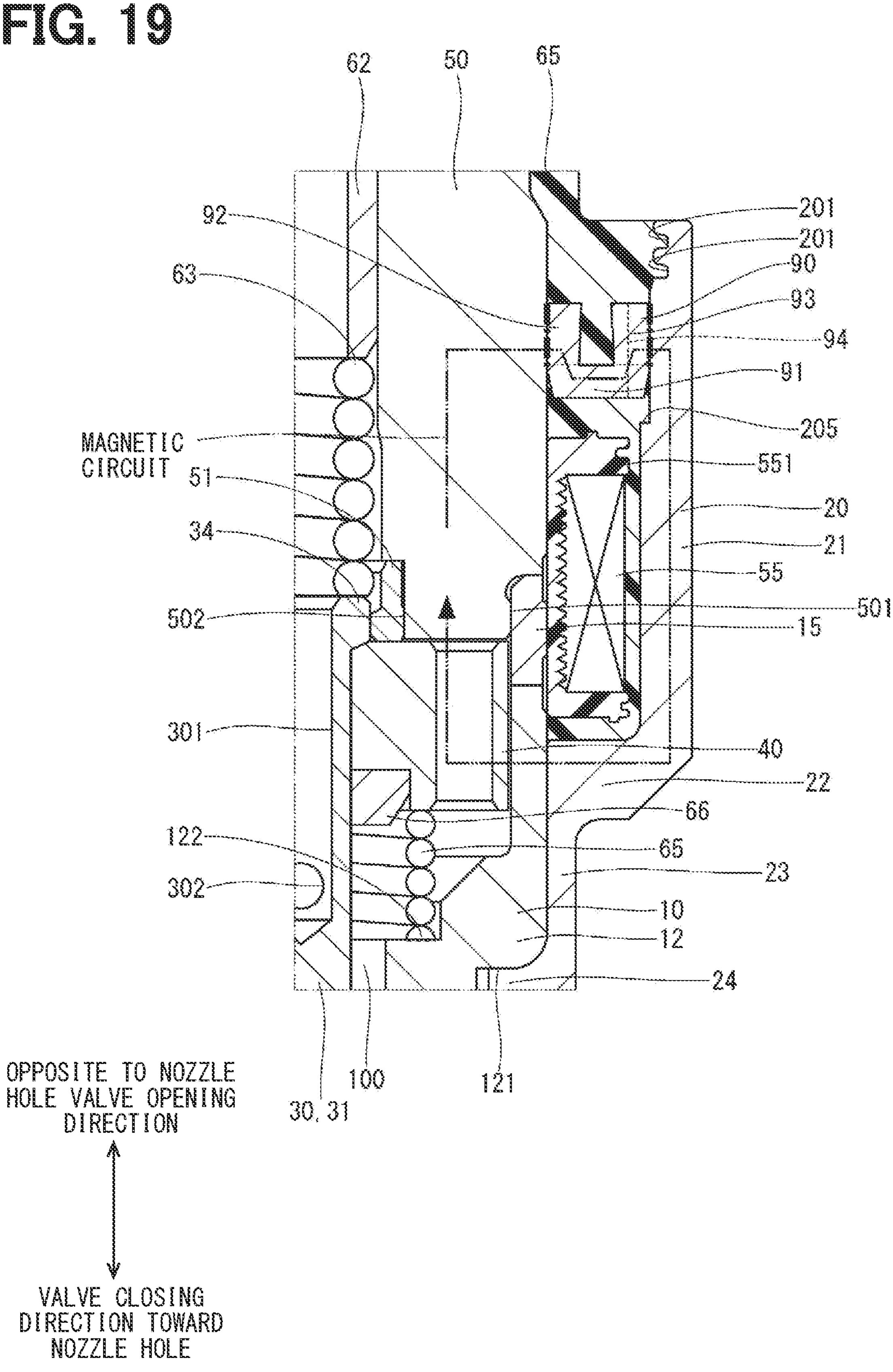
FIG. 19 is a sectional view illustrating the upper housing and the vicinity of the fuel injection valve according to a sixth embodiment.

FIG. 19 illustrates part of the fuel injection valve according to the sixth embodiment. The sixth embodiment differs from the fifth embodiment in the configurations of the upper housing, for example.

The present embodiment excludes the intermediate member 95 described in the fifth embodiment.

According to the present embodiment, as illustrated in FIG. 19, the upper housing 90 is provided between the fixed core 50 and the outer cylinder portion 21 of the housing 20. The inner peripheral wall of the upper housing 90 opposite to the nozzle hole 13 closely adheres to the outer peripheral wall of fixed core 50. The outer peripheral wall of the upper housing 90 opposite to the nozzle hole 13 closely adheres to the inner peripheral wall of the outer cylinder portion 21 of the housing 20.

The inner peripheral wall of the upper housing 90 on the side of the nozzle hole 13 is distant from the outer peripheral wall on the fixed core 50 are separated. The outer peripheral wall of the upper housing 90 on the side of the nozzle hole 13 is distant from the inner peripheral wall of the outer cylinder portion 21 of the housing 20.

The bottom surface of the groove portion 900 corresponds to the end face of the bottom portion 91 opposite to the nozzle hole 13. With respect to this end face toward the nozzle hole 13, the inner peripheral wall of the upper housing 90 is distant from the outer peripheral wall of the fixed core 50. The outer peripheral wall of the upper housing 90 is distant from the inner peripheral wall of the outer cylinder portion 21 of the housing 20.

From the end of the upper housing 90 opposite to the nozzle hole 13 to the bottom surface of the groove portion 900 toward the nozzle hole 13, the inner peripheral wall of the upper housing 90 closely adheres to the outer peripheral wall of the fixed core 50. The outer peripheral wall of the upper housing 90 closely adheres to the inner peripheral wall of the outer cylinder portion 21 of the housing 20.

A magnetic path area can be ensured between the inner peripheral wall of the upper housing 90 and the outer peripheral wall of the fixed core 50. A magnetic path area can be ensured between the outer peripheral wall of the upper housing 90 and the inner peripheral wall of the outer cylinder portion 21 of the housing 20.

The description below explains how to assemble the upper housing 90 between the fixed core 50 and the housing 20.

Upper Housing Assembling Process

After the coil assembling process, insert the upper housing 90 between the fixed core 50 and the housing 20. Specifically, insert the upper housing 90 from the fixed core 50 opposite to the nozzle hole 13. Press-fit the upper housing 90 between the fixed core 50 and the housing 20 while positioning the bobbin extension portion 552 at the cutout portion.

Figure 20:
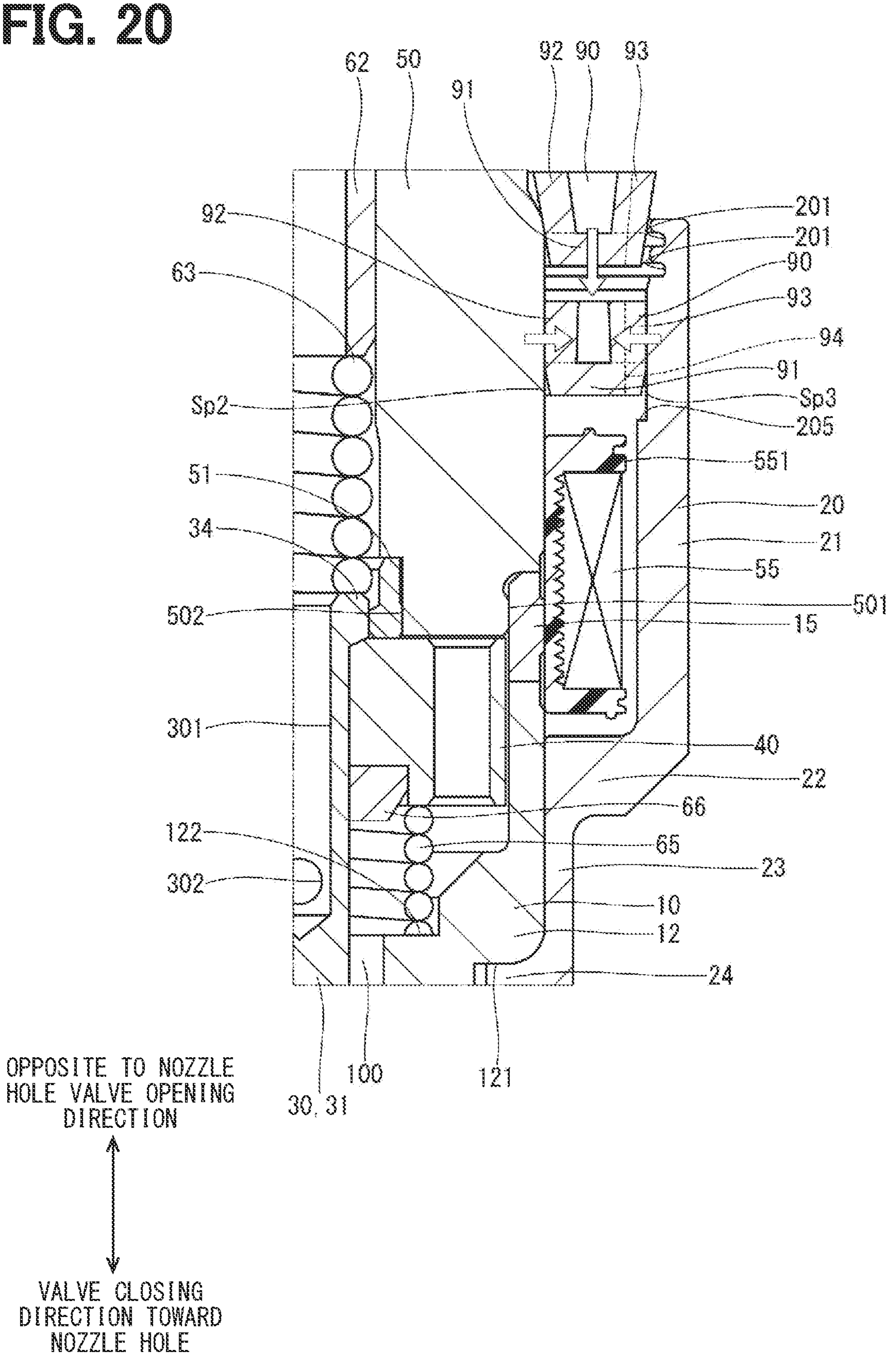
FIG. 20 is a sectional view illustrating an assembling process for the upper housing of the fuel injection valve according to the sixth embodiment.

FIG. 20 illustrates the state before the upper housing 90 is press-fitted between the fixed core 50 and the housing 20. The inner peripheral wall of the upper housing 90 is tapered to approach the axis at a predetermined ratio from the side axially toward the nozzle hole 13 to the side opposite to the nozzle hole 13. In this state, the outer peripheral wall of the upper housing 90 is tapered to separate from the axis at a predetermined ratio from the side axially toward the nozzle hole 13 to the side opposite to the nozzle hole 13.

When the upper housing 90 is moved toward the nozzle hole 13 in this state, the inner peripheral wall of the upper housing 90 touches and slides on the outer peripheral wall of the fixed core 50. The outer peripheral wall of the upper housing 90 touches and slides on the inner peripheral wall of the outer cylinder portion 21 of the housing 20. The inward extended portion 92 deforms radially outward to increase the inner and outer diameters. Therefore, the inner peripheral wall of the inward extended portion 92 closely adheres to the outer peripheral wall of the fixed core 50.

The outward extended portion 93 deforms radially inward to decrease the inner and outer diameters. Therefore, the outer peripheral wall of the outward extended portion 93 closely adheres to the inner peripheral wall of the outer cylinder portion 21 of the housing 20.

After the upper housing 90 is assembled, the inner peripheral wall of the upper housing 90 closely adheres to the outer peripheral wall of the fixed core 50. The outer peripheral wall of the upper housing 90 closely adheres to the inner peripheral wall of the outer cylinder portion 21 of the housing 20 (see FIGS. 19 and 20).

When the coil 55 is energized, the above-described configuration can form an efficient magnetic circuit having a small magnetic gap and a low magnetic resistance through the fixed core 50, the upper housing 90, and the housing 20 (see FIG. 19).

According to the present embodiment, as above, the upper housing 90 includes the bottom portion 91, the inward extended portion 92, and the outward extended portion 93. The inward extended portion 92 is formed to extend from the inner edge portion of the bottom portion 91 in the axial direction of the bottom portion 91. The outward extended portion 93 is formed to extend from the outer edge portion of the bottom portion 91 in the axial direction of the bottom portion 91.

Before assembling the upper housing 90, appropriately configure the inner diameter of the inward extended portion 92 and the outer diameter of the outer extended portion 93 of the upper housing 90, the outer diameter of the fixed core 50, and the inner diameter of the housing 20. When assembling the upper housing 90, insert the upper housing 90 between the fixed core 50 and the housing 20 with respect to the coil 55 opposite to the nozzle hole 13. Then, the inner peripheral wall of the inward extended portion 92 and the outer peripheral wall of the fixed core 50 can axially slide. The outer peripheral wall of the outward extended portion 93 and the inner peripheral wall of the housing 20 can axially slide. Meanwhile, the inward extended portion 92 can be deformed radially outward. The outward extended portion 93 can be deformed radially inward.

After the upper housing 90 is assembled, the inner peripheral wall of the inward extended portion 92 closely adheres to the outer peripheral wall of the fixed core 50. The outer peripheral wall of the outward extended portion 93 closely adheres to the inner peripheral wall of the housing 20.

Therefore, the fixed core 50, the upper housing 90, and the housing 20 can form an efficient magnetic circuit having a small magnetic gap and a low magnetic resistance. It is possible to efficiently generate an attractive force corresponding to the current supplied to the coil 55 and decrease the energy required to drive the fuel injection valve 1. Consequently, it is possible to reduce the power consumption of the fuel injection valve 1.

According to the present embodiment, the upper housing 90 is provided so that the outer peripheral wall at the end on the side of the nozzle hole 13 is distant from the inner peripheral wall of the housing 20 and the inner peripheral wall at the end on the side of the nozzle hole 13 is distant from the outer peripheral wall of the fixed core 50.

During the molding process, the melted resin is prevented from entering between the inner peripheral wall of the upper housing 90 and the outer peripheral wall of the fixed core 50 and between the outer peripheral wall of the upper housing 90 and the inner peripheral wall of the housing 20 from the upper housing 90 opposite to the nozzle hole 13. It is possible to inhibit the separation between the inner peripheral wall of the upper housing 90 and the outer peripheral wall of the fixed core 50 and the separation between the outer peripheral wall of the upper housing 90 and the inner peripheral wall of the housing 20. Therefore, the fixed core 50, the upper housing 90, and the housing 20 can reliably form an efficient magnetic circuit having a small magnetic gap and a low magnetic resistance.

Seventh Embodiment

Figure 21:
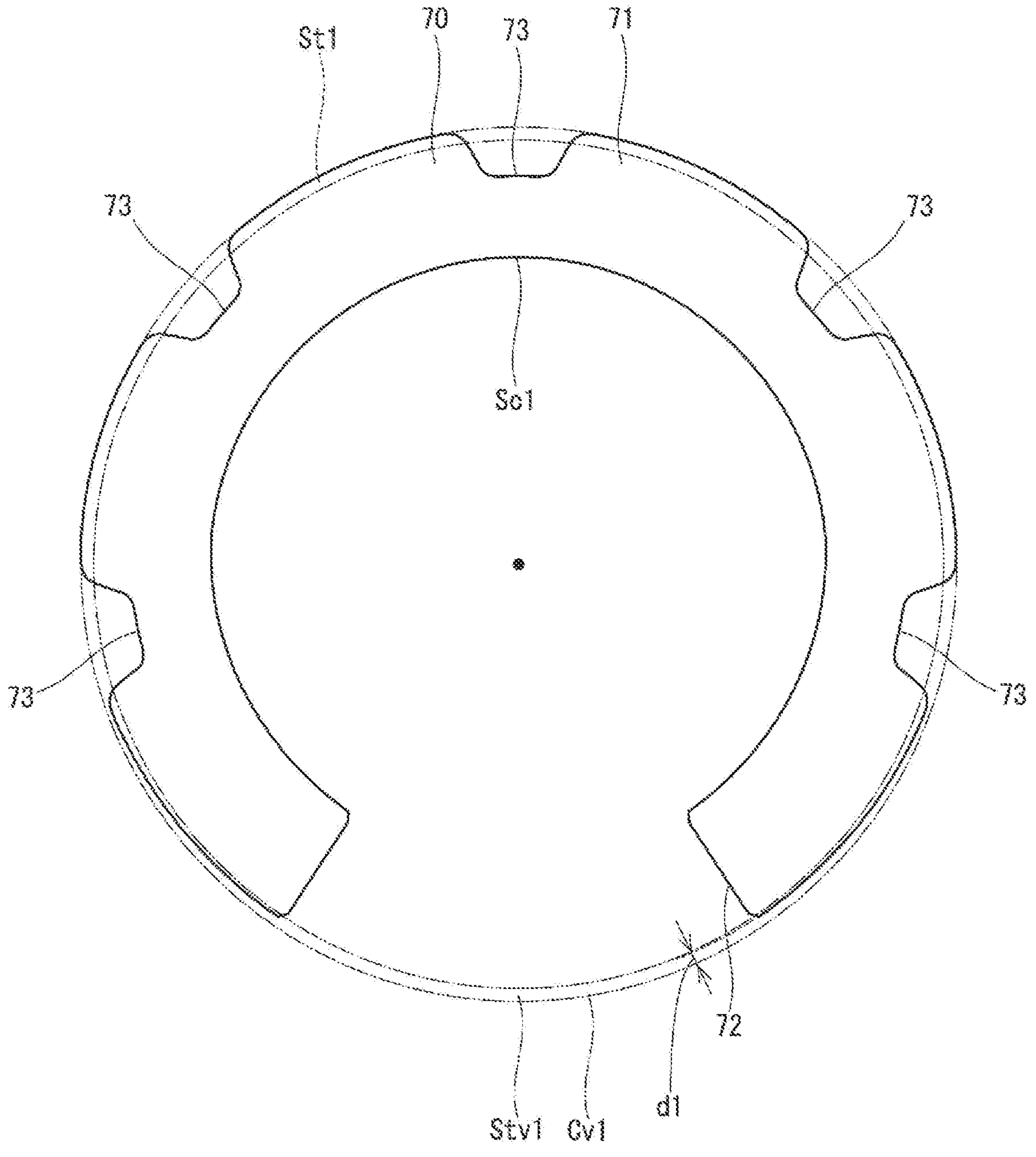
FIG. 21 is a plan view illustrating the upper housing of the fuel injection valve according to a seventh embodiment.

FIG. 21 illustrates part of the fuel injection valve according to the seventh embodiment. The seventh embodiment differs from the first embodiment in the configurations of the upper housing.

According to the present embodiment, the outer peripheral wall of the upper housing 70 at the circumferential end of the body 71 is distant from the virtual tapered surface Stv1 by a predetermined distance d1.

Suppose the upper housing 70 is press-fitted into the outer cylinder portion 21 of the housing 20 during the upper housing assembling process. Then, a radial force is applied to the inner peripheral wall of the outer cylinder portion 21 of the housing 20 from the outer peripheral wall (first tapered surface St1) at the circumferential end of the body 71 of the upper housing 70. The present embodiment can reduce the radial force compared to the first embodiment. It is possible to improve the assembly efficiency for the upper housing 70.

After the upper housing 70 is assembled, it is also possible to reduce the radial force applied to the inner peripheral wall (second tapered surface St2) of the outer cylinder portion 21 of the housing 20 from the outer peripheral wall (first tapered surface St1) at the circumferential end of the body 71 of the upper housing 70. It is possible to reduce a stress generated on the part that belongs to the inner peripheral wall of the outer cylinder portion 21 of the housing 20 and faces the outer peripheral wall at the peripheral end of the body 71 of the upper housing 70.

Eighth Embodiment

Figure 22:
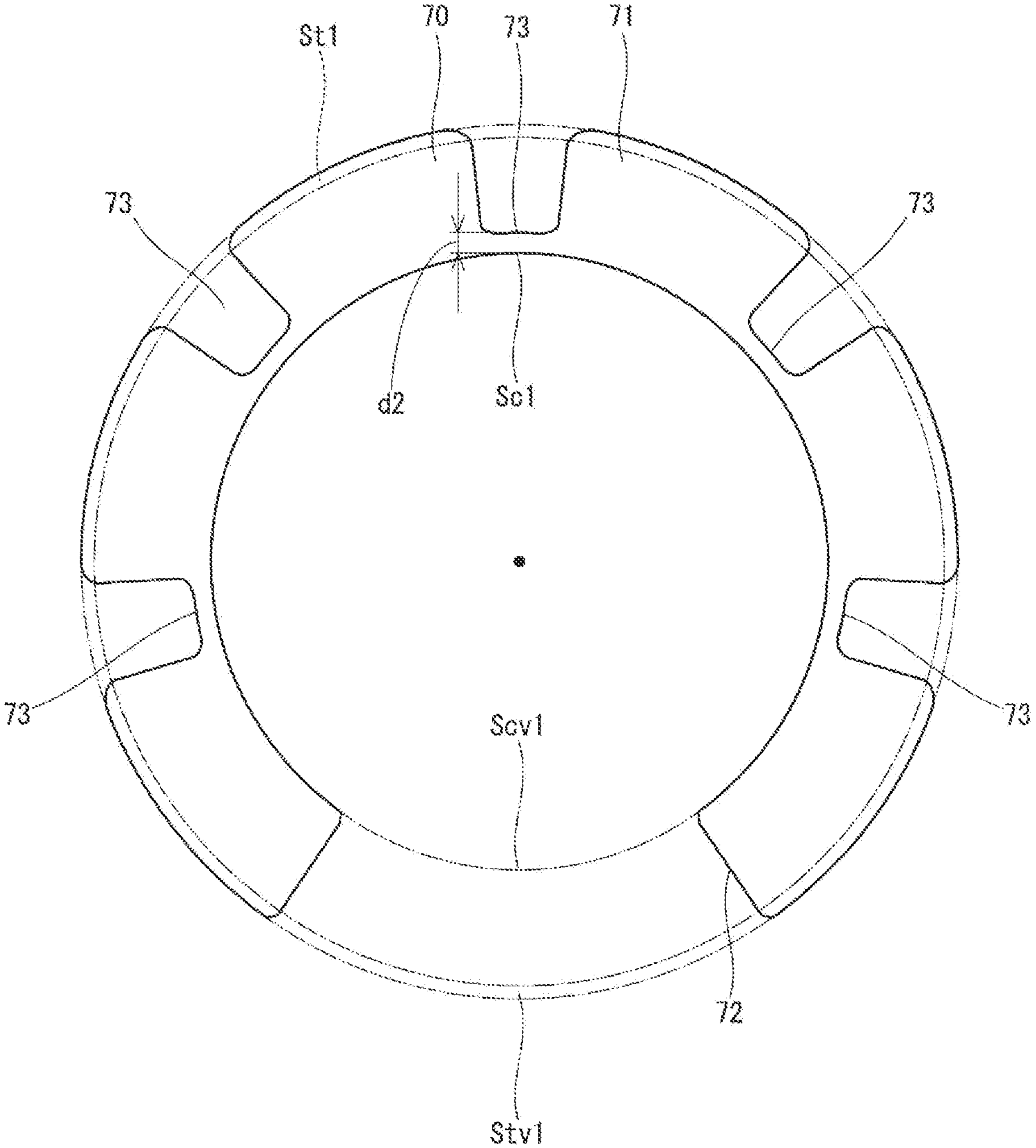
FIG. 22 is a plan view illustrating the upper housing of the fuel injection valve according to an eighth embodiment.

FIG. 22 illustrates part of the fuel injection valve according to the eighth embodiment. The eighth embodiment differs from the first embodiment in the configurations of the upper housing.

The present embodiment provides a distance d2 between the bottom surface of the recessed portion 73 of the upper housing 70 and the inner peripheral wall (first cylindrical surface Sc1) of the body 71. The distance d2 is smaller than the distance between the bottom surface of the recessed portion 73 and the inner peripheral wall (first cylindrical surface Sc1) of the body 71 according to the first embodiment (see FIG. 3). The body 71 is easily deformable in the radial direction at the recessed portion 73. Particularly, the circumferential end of the body 71 of the upper housing 70 is easily deformable in the radial direction.

Suppose the upper housing 70 is press-fitted into the outer cylinder portion 21 of the housing 20 during the upper housing assembling process. Then, a radial force is applied to the inner peripheral wall of the outer cylinder portion 21 of the housing 20 from the outer peripheral wall (first tapered surface St1) at the circumferential end of the body 71 of the upper housing 70. The present embodiment can particularly reduce the radial force compared to the first embodiment. It is possible to improve the assembly efficiency for the upper housing 70.

After the upper housing 70 is assembled, it is also possible to reduce particularly the radial force applied to the inner peripheral wall (second tapered surface St2) of the outer cylinder portion 21 of the housing 20 from the outer peripheral wall (first tapered surface St1) at the circumferential end of the body 71 of the upper housing 70. It is possible to reduce a stress generated on the part that belongs to the inner peripheral wall of the outer cylinder portion 21 of the housing 20 and faces the outer peripheral wall at the peripheral end of the body 71 of the upper housing 70.

Ninth Embodiment

Figure 23:
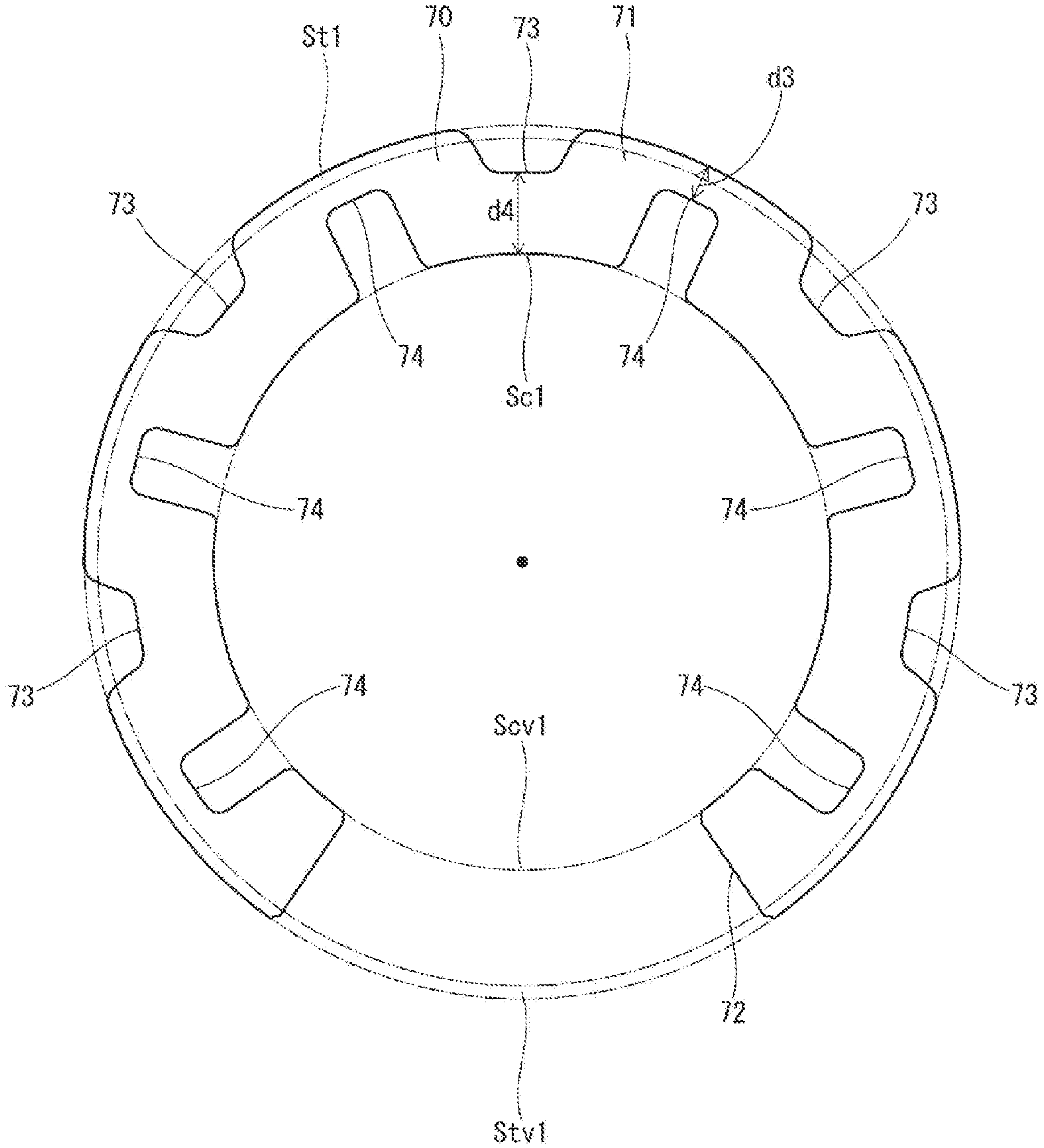
FIG. 23 is a plan view illustrating the upper housing of the fuel injection valve according to a ninth embodiment.

FIG. 23 illustrates part of the fuel injection valve according to the ninth embodiment. The ninth embodiment differs from the first embodiment in the configurations of the upper housing.

According to the present embodiment, the upper housing 70 further includes an inner recessed portion 74. The inner recessed portion 74 is formed to be radially outward recessed from the inner peripheral wall of the body 71. Six inner recessed portions 74 are formed at equal intervals in the circumferential direction of the body 71. The inner recessed portion 74 is formed between two adjacent recessed portions 73 in the circumferential direction of the body 71.

There is a maximum distance d3 between the bottom surface of the inner recessed portion 74 and the outer peripheral wall (first tapered surface St1) of the body 71. There is a distance d4 between the bottom surface of the recessed portion 73 and the inner peripheral wall (first cylindrical surface Sc1) of the body 71. In this case, d3 is smaller than d4. The body 71 is easily deformable in the radial direction at the inner recessed portion 74. Particularly, the circumferential end of the body 71 of the upper housing 70 is easily deformable in the radial direction.

Suppose the upper housing 70 is press-fitted into the outer cylinder portion 21 of the housing 20 during the upper housing assembling process. Then, a radial force is applied to the inner peripheral wall of the outer cylinder portion 21 of the housing 20 from the outer peripheral wall (first tapered surface St1) at the circumferential end of the body 71 of the upper housing 70. The present embodiment can particularly reduce the radial force compared to the first embodiment. It is possible to improve the assembly efficiency for the upper housing 70.

After the upper housing 70 is assembled, it is also possible to reduce particularly the radial force applied to the inner peripheral wall (second tapered surface St2) of the outer cylinder portion 21 of the housing 20 from the outer peripheral wall (first tapered surface St1) at the circumferential end of the body 71 of the upper housing 70. It is possible to reduce a stress generated on the part that belongs to the inner peripheral wall of the outer cylinder portion 21 of the housing 20 and faces the outer peripheral wall at the peripheral end of the body 71 of the upper housing 70.

Tenth Embodiment

Figure 24:
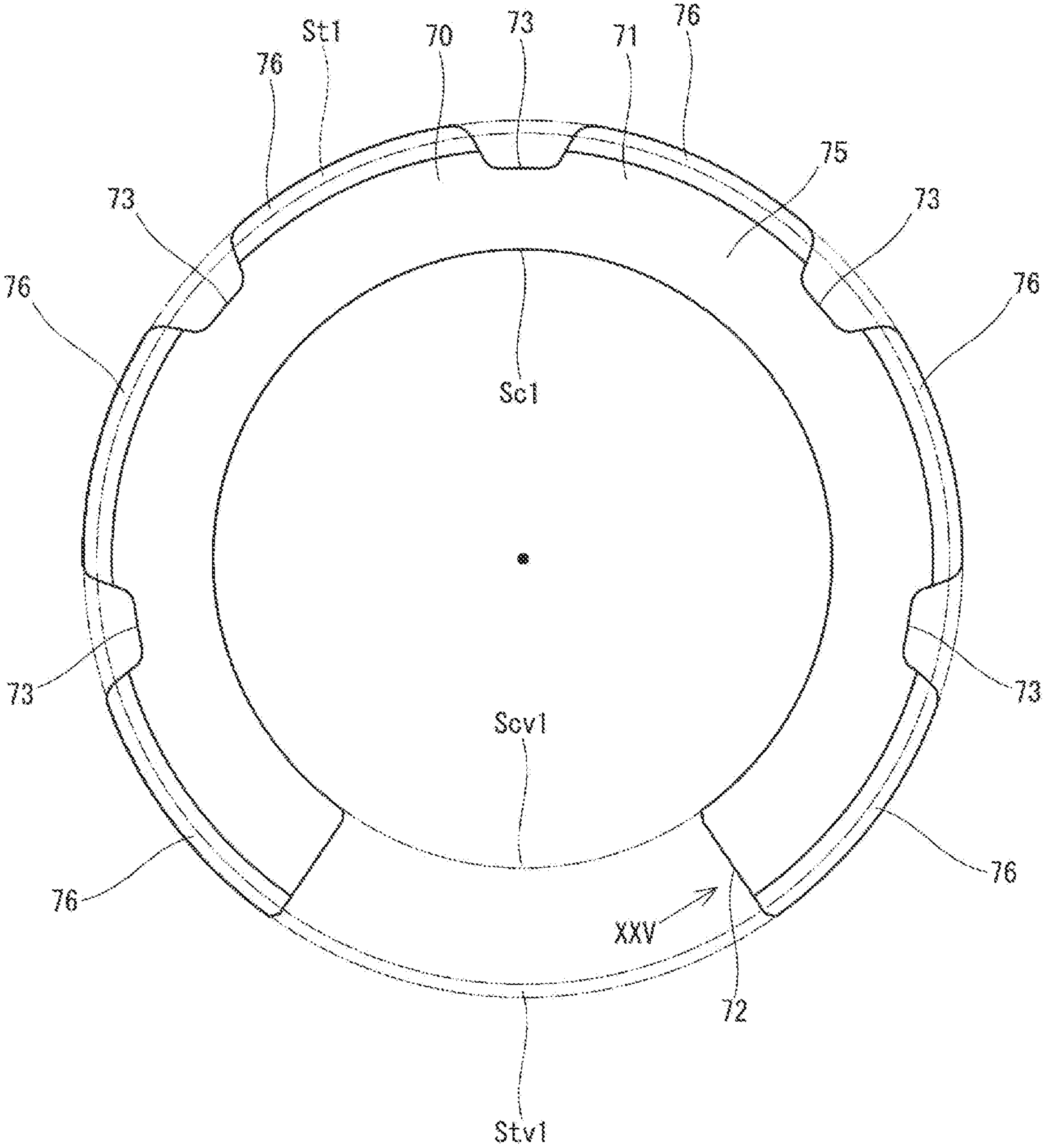
FIG. 24 is a plan view illustrating the upper housing of the fuel injection valve according to a tenth embodiment.
Figure 25:
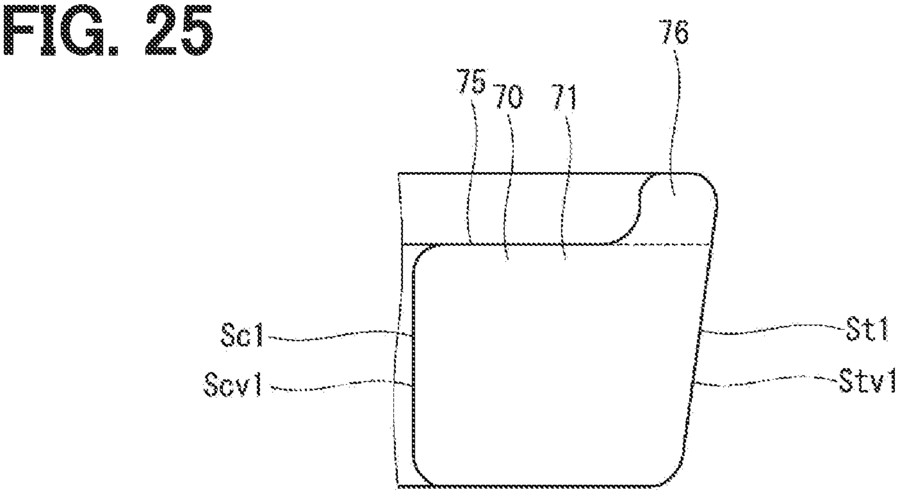
FIG. 25 is a diagram viewed in the direction of arrow XXV in FIG. 24.

FIGS. 24 and 25 illustrate parts of the fuel injection valve according to the tenth embodiment. The tenth embodiment differs from the first embodiment in the configurations of the upper housing.

According to the present embodiment, the upper housing 70 further includes an axially recessed portion 75. The axially recessed portion 75 is formed to be axially recessed from the end face of the upper housing 70 opposite to the nozzle hole 13 of the body 71. An arc-shaped wall portion 76 is formed between two adjacent recessed portions 73 and at both circumferential ends of the body 71 on the radial outside of the axially recessed portion 75 of the body 71. The body 71 allows the wall portions 76 to be easily deformable radially inward of the body 71.

Suppose the upper housing 70 is press-fitted into the outer cylinder portion 21 of the housing 20 during the upper housing assembling process. Then, a radial force is applied to the inner peripheral wall of the outer cylinder portion 21 of the housing 20 from the outer peripheral wall of the wall portion 76 of the upper housing 70. The present embodiment can particularly reduce the radial force compared to the first embodiment. It is possible to improve the assembly efficiency for the upper housing 70.

After the upper housing 70 is assembled, it is also possible to reduce particularly the radial force applied to the inner peripheral wall (second tapered surface St2) of the outer cylinder portion 21 of the housing 20 from the outer peripheral wall of the wall portion 76 of the upper housing 70. It is possible to reduce a stress generated on the part that belongs to the inner peripheral wall of the outer cylinder portion 21 of the housing 20 and faces the outer peripheral wall of the wall portion 76 of the upper housing 70.

Eleventh Embodiment

Figure 26:
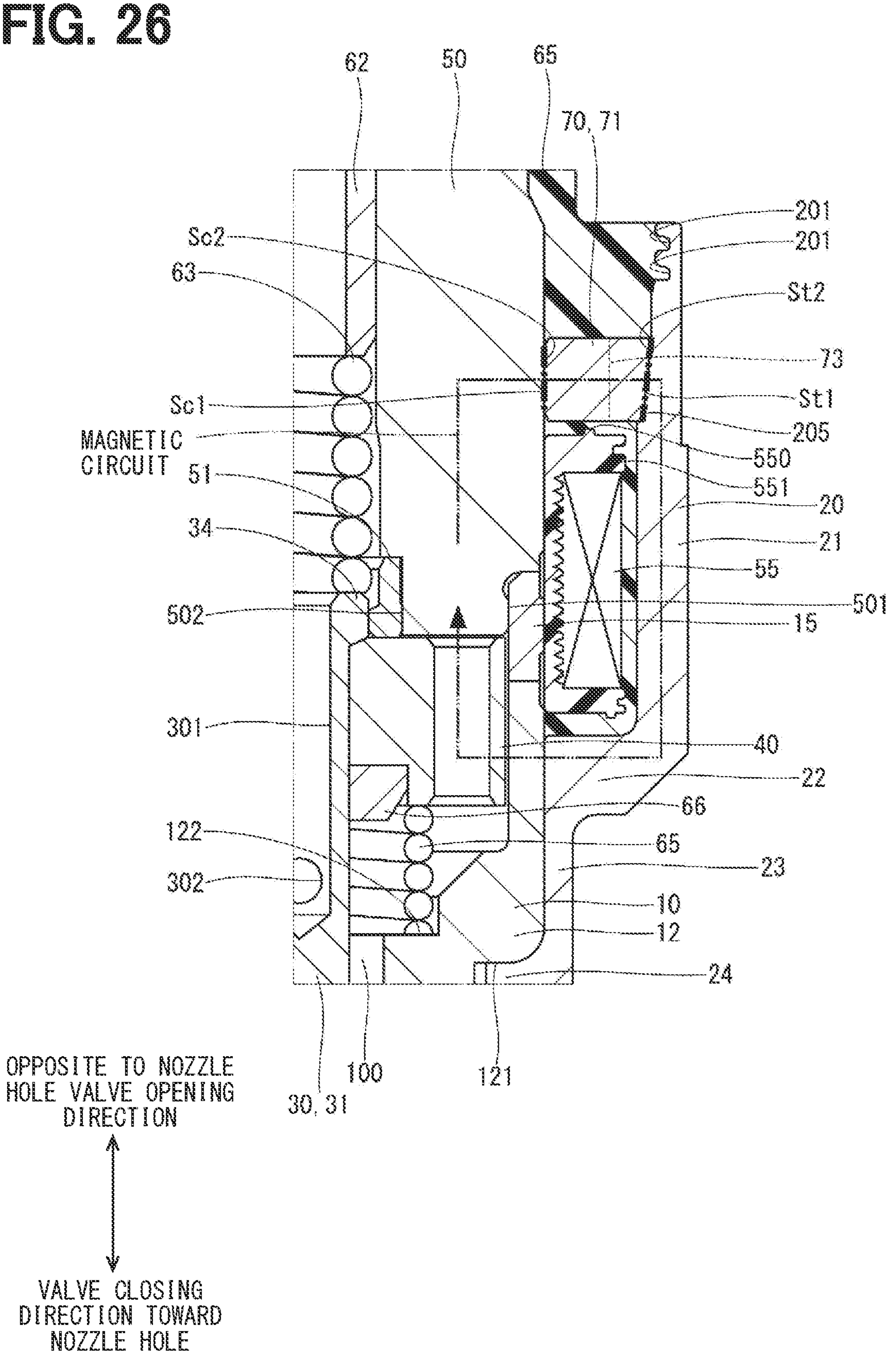
FIG. 26 is a sectional view illustrating the upper housing and the vicinity of the fuel injection valve according to an eleventh embodiment.

FIG. 26 illustrates part of the fuel injection valve according to the eleventh embodiment. The eleventh embodiment differs from the first embodiment in the configurations of the housing, for example.

According to the present embodiment, an annular stepped surface 205 is formed on the inner peripheral wall of the outer cylinder portion 21 of the housing 20. The upper housing 70 abuts on the stepped surface 205 and is restrained from moving toward the nozzle hole 13.

The description below explains the "upper housing assembling process" regarding the manufacturing methods of the fuel injection valve 1 according to the present embodiment.

Upper Housing Assembling Process

Figure 27:
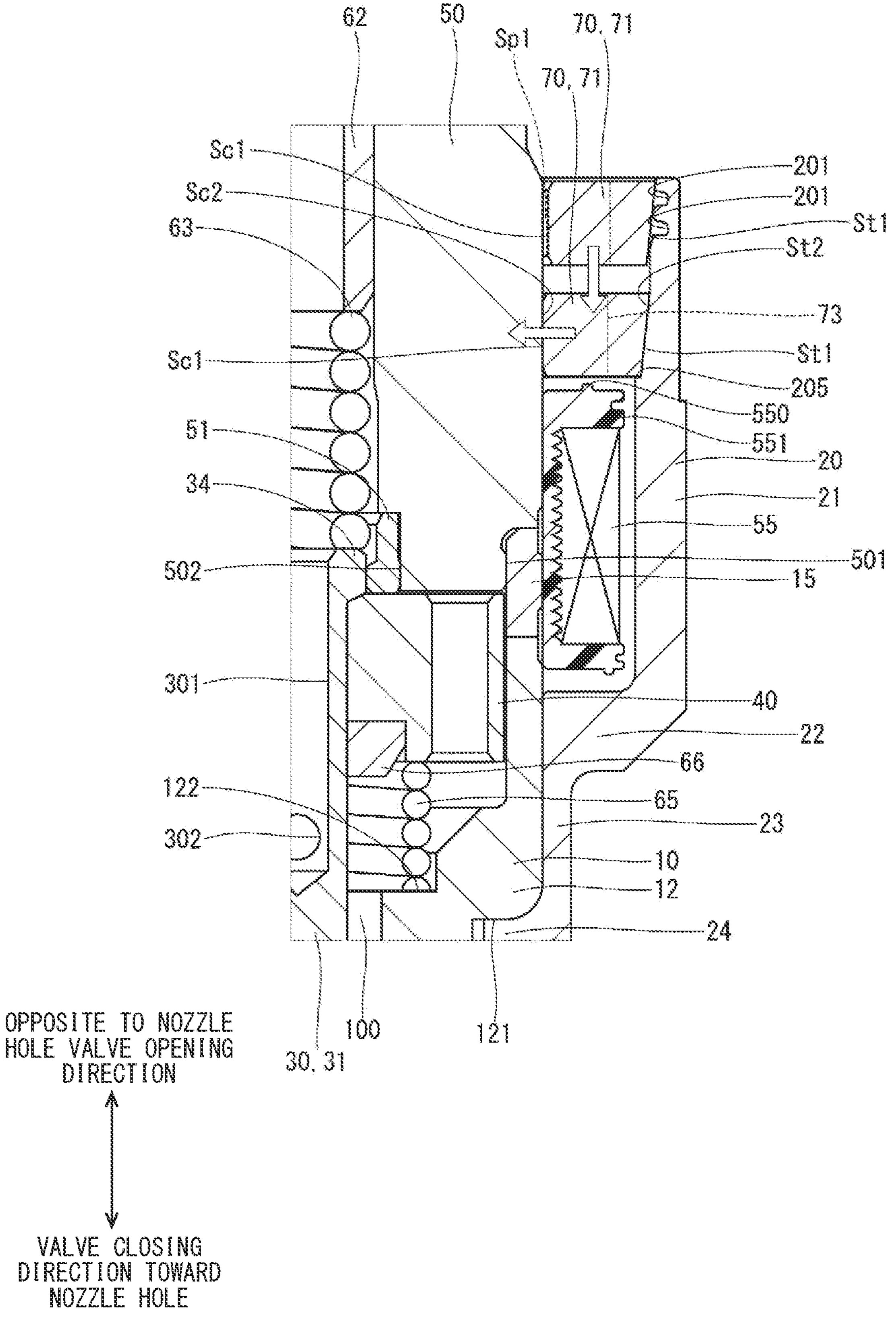
FIG. 27 is a sectional view illustrating an assembling process for the upper housing of the fuel injection valve according to the eleventh embodiment.

As illustrated in FIG. 27, the first tapered surface St1 and the second tapered surface St2 do not face each other in the radial direction and a gap Sp1 is formed between the first cylindrical surface Sc1 and the outer peripheral wall of the fixed core 50. When the upper housing 70 is further moved toward the nozzle hole 13 in this state, the first tapered surface St1 of the upper housing 70 and the second tapered surface St2 of the housing 20 slide. The upper housing 70 deforms radially inward to decrease the inner and outer diameters. Therefore, the first cylindrical surface Sc1 of the upper housing 70 abuts on and closely adheres to the second cylindrical surface Sc2 of the fixed core 50. When the upper housing 70 is further moved toward the nozzle hole 13, the outer edge portion of the surface of the upper housing 70 toward the nozzle hole 13 abuts on the stepped surface 205. After the upper housing 70 is assembled, the first tapered surface St1 closely adheres to the second tapered surface St2. The first cylindrical surface Sc1 closely adheres to the second cylindrical surface Sc2 (see FIG. 27).

Before the upper housing 70 is assembled into the housing 20 according to the present embodiment, similar to the first embodiment, the first tapered surface St1 of the upper housing 70 shows a diameter reduction rate slightly larger than that of the second tapered surface St2 of the housing 20. The diameter reduction rate represents a degree of decreasing the diameter. The taper angle or the inclination angle against the axis of the first tapered surface St1 is larger than the taper angle of the second tapered surface St2. When the upper housing 70 is press-fitted into the housing 20 during the upper housing assembling process, the outer peripheral wall of the upper housing 70 at the end opposite to the nozzle hole 13 first touches the inner peripheral wall of the housing 20. It is possible to inhibit peeling during press-fitting of the upper housing 70 and reduce press-fitting loads.

The upper housing 70 moves toward the nozzle hole 13 while sliding the first tapered surface St1 and the second tapered surface St2. At this time, the surface pressure between the first tapered surface St1 and the second tapered surface St2 is larger than the surface pressure between the first cylindrical surface Sc1 and the second cylindrical surface Sc2. The first tapered surface St1 corresponds to the outer peripheral wall of the upper housing 70 at the end opposite to the nozzle hole 13 and the second tapered surface St2 corresponds to the inner peripheral wall of the housing 20. When the upper housing 70 moves toward the nozzle hole 13, at least the outer peripheral wall of the upper housing 70 at the end opposite to the nozzle hole 13 or the inner peripheral wall of the housing 20 is deformed or crushed. The outer peripheral wall of the upper housing 70 closely adheres to the inner peripheral wall of the housing 20. Therefore, the fixed core 50, the upper housing 70, and the housing 20 can reliably form an efficient magnetic circuit having a small magnetic gap and a low magnetic resistance.

According to the present embodiment, the outer edge portion of the surface of the upper housing 70 toward the nozzle hole 13 abuts on the stepped surface 205 at the end of the upper housing assembling process. The upper housing 70 is restrained from moving toward the nozzle hole 13. It is possible to inhibit the upper housing 70 from positionally varying with respect to the housing 20 and ensure a constant distance between the upper housing 70 and the bobbin 551. When the constant distance is maintained between the upper housing 70 and the bobbin 551, the high-temperature resin flows between the upper housing 70 and the bobbin 551 during the molding process to be able to reliably melt a bobbin protrusion portion 550 as a protrusion from the bobbin 551 toward the upper housing 70. Therefore, it is possible to improve sealing properties between the upper housing 70 and the coil 55.

The above-described configuration can decrease the surface pressure between the upper housing 70 and the housing 20 during press-fitting of the upper housing 70. It is possible to improve the assembly efficiency for the upper housing 70. A decrease in the surface pressure between the upper housing 70 and the housing 20 can more effectively inhibit peeling. It is possible to prevent foreign matters from falling onto the coil 55 and a layer short from occurring.

Twelfth Embodiment

The description below explains the fuel injection valve according to the twelfth embodiment. The twelfth embodiment differs from the eleventh embodiment in the configurations of the upper housing and the housing, for example.

According to the present embodiment, the base material hardness of the housing 20 is lower than that of the upper housing 70. Part of the inner peripheral wall of the outer cylinder portion 21 of the housing 20 corresponds to the second tapered surface St2 and indicates the surface hardness higher than the base material hardness due to the surface treatment such as shot blasting, increased cutting resistance, and Super Roll. A part of the inner peripheral wall of the outer cylinder portion 21 corresponds to the second tapered surface St2. The surface hardness of this part is approximately equal to the surface hardness of the part of the outer peripheral wall of the upper housing 70 corresponding to the first tapered surface St1.

Suppose the upper housing 70 is press-fitted into the housing 20 during the upper housing assembling process according to the above-described configuration. The inner peripheral wall of housing 20 is particularly pressed by the outer peripheral wall at the end portion of the upper housing 70 opposite to the nozzle hole 13. The inside of the housing 20, namely, the base material is deformed to be compressed. Consequently, the outer peripheral wall of the upper housing 70 can closely adhere to the inner peripheral wall of the housing 20.

The above-described configuration can decrease the surface pressure between the upper housing 70 and the housing 20 during press-fitting of the upper housing 70. It is possible to improve the assembly efficiency for the upper housing 70. A decrease in the surface pressure between the upper housing 70 and the housing 20 can more effectively inhibit peeling. It is possible to prevent foreign matters from falling onto the coil 55 and a layer short from occurring.

Thirteenth Embodiment

Figure 28:
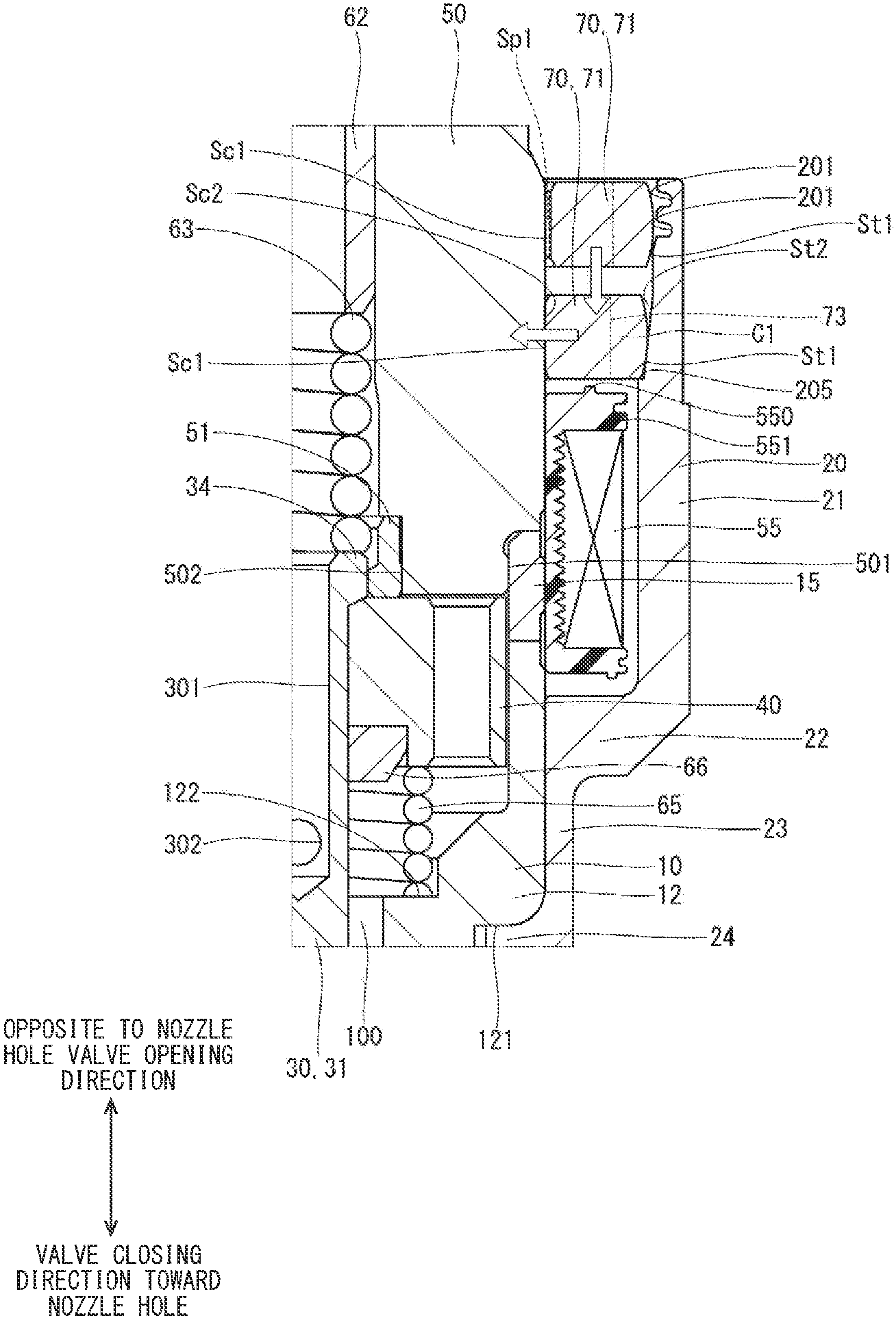
FIG. 28 is a sectional view illustrating the state of an assembling process for the upper housing of the fuel injection valve according to a thirteenth embodiment.

FIG. 28 illustrates the fuel injection valve according to the thirteenth embodiment. The thirteenth embodiment differs from the eleventh embodiment in the configurations of the upper housing, for example.

According to the present embodiment, the outer peripheral wall (first tapered surface St1) of the upper housing 70 is curved so that the center part of the upper housing 70 in the axial direction protrudes radially outward. The outer peripheral wall of the upper housing 70 is arc-shaped when viewed in cross section according to a plane including the axis of the upper housing 70 (see FIG. 28).

The first tapered surface St1 is tapered so that part of the first tapered surface St1, toward the nozzle hole 13 from the axial center C1 of the upper housing 70, approaches the axis toward the nozzle hole 13 from the center C1. The diameter reduction rate of the first tapered surface St1 increasingly varies toward the nozzle hole 13 from the center C1.

The first tapered surface St1 is tapered so that part of the first tapered surface St1, opposite to the nozzle hole 13 from the axial center C1 of the upper housing 70, approaches the axis toward the side opposite to the nozzle hole 13 from the center C1. The diameter reduction rate of the first tapered surface St1 increasingly varies toward the side opposite to the nozzle hole 13 from the center C1.

The above-described configuration can decrease the surface pressure between the upper housing 70 and the housing 20 during press-fitting of the upper housing 70. It is possible to improve the assembly efficiency for the upper housing 70. A decrease in the surface pressure between the upper housing 70 and the housing 20 can more effectively inhibit peeling. It is possible to prevent foreign matters from falling onto the coil 55 and a layer short from occurring.

Fourteenth Embodiment

Figure 29:
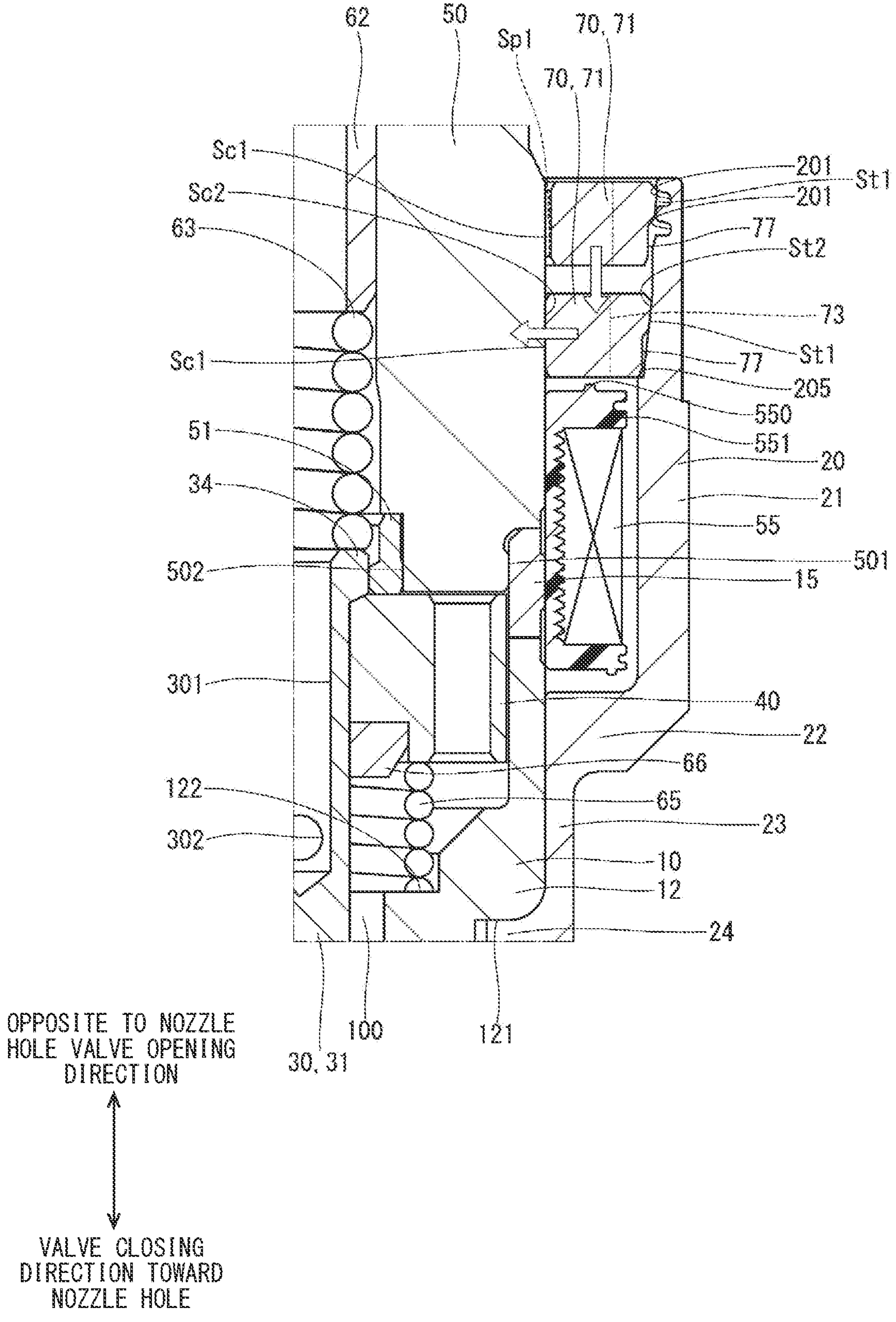
FIG. 29 is a sectional view illustrating the state of an assembling process for the upper housing of the fuel injection valve according to a fourteenth embodiment.

FIG. 29 illustrates the fuel injection valve according to the fourteenth embodiment. The fourteenth embodiment differs from the eleventh embodiment in the configurations of the upper housing, for example.

According to the present embodiment, the upper housing 70 includes an outer peripheral recessed portion 77. The outer peripheral recessed portion 77 is formed to be radially inward recessed from the outer peripheral wall of the body 71 of the upper housing 70. The outer peripheral recessed portion 77 is formed from the end portion of the body 71 toward the nozzle hole 13 to the center of the body 71 in the axial direction. Consequently, the axial length of the first tapered surface St1 according to the present embodiment is smaller than that of the first tapered surface St1 according to the eleventh embodiment. A contact area between the first tapered surface St1 and the second tapered surface St2 is also smaller than that of the eleventh embodiment.

The above-described configuration can reduce the press-fitting length between the upper housing 70 and the housing 20 during press-fitting of the upper housing 70 and reduce the amount of movement at the sliding parts. It is possible to improve the assembly efficiency. A decrease in the amount of sliding movement between the upper housing 70 and the housing 20 can more effectively inhibit peeling. It is possible to prevent foreign matters from falling onto the coil 55 and a layer short from occurring.

Fifteenth Embodiment

Figure 30:
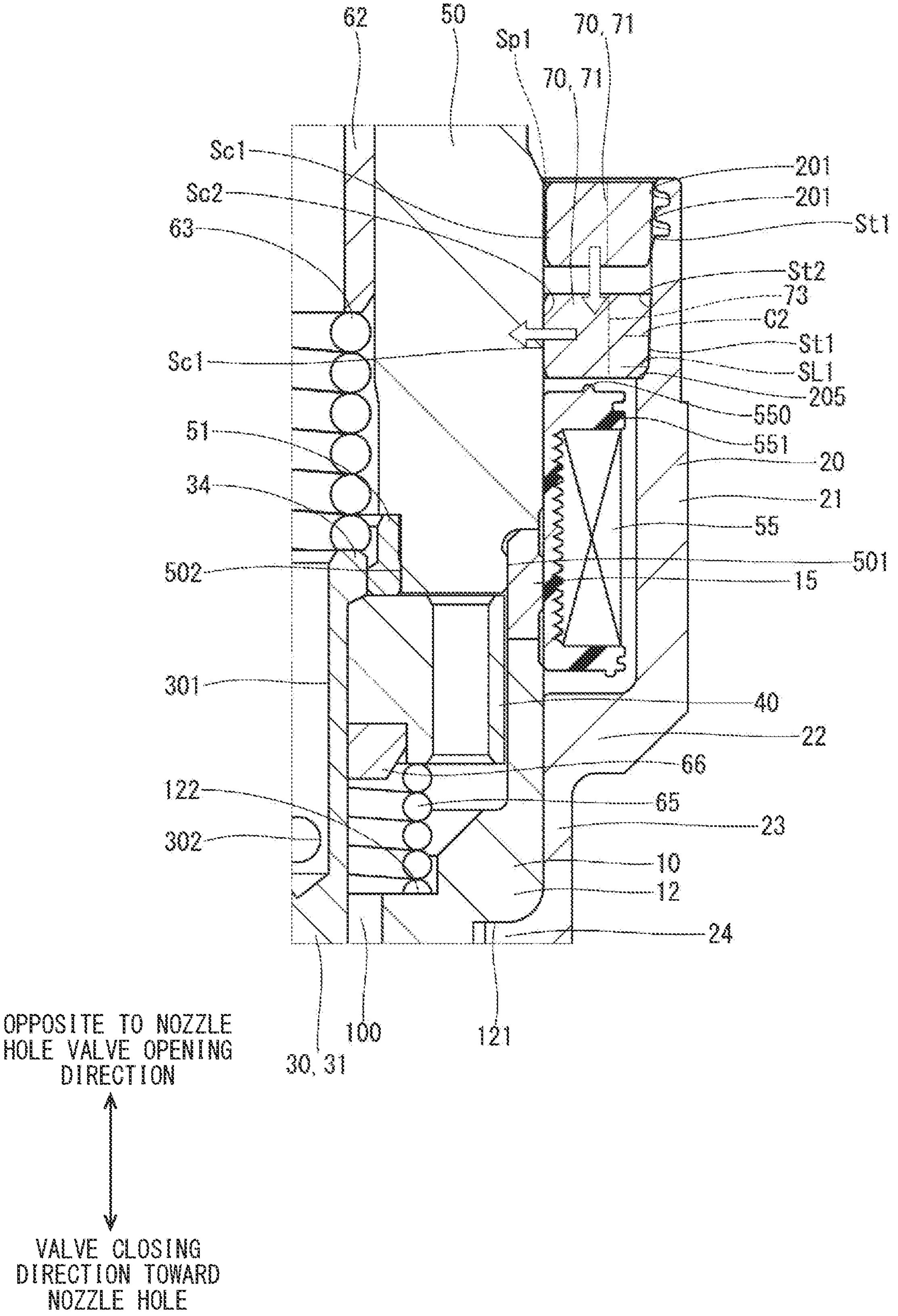
FIG. 30 is a sectional view illustrating the state of an assembling process for the upper housing of the fuel injection valve according to a fifteenth embodiment.

FIG. 30 illustrates the fuel injection valve according to the fifteenth embodiment. The fifteenth embodiment differs from the eleventh embodiment in the configurations of the upper housing, for example.

The present embodiment uses different diameter reduction rates for the second tapered surface St2 of the housing 20 on the sides toward and opposite to the nozzle hole 13 with respect to an axially specific location SL1. With respect to the specific location SL1 of the second tapered surface St2, the diameter reduction rate toward the nozzle hole 13 is larger than the diameter reduction rate opposite to the nozzle hole 13.

The specific location SL1 is settled toward the nozzle hole 13 apart from the axial center C2 of the second tapered surface St2. Part of the second tapered surface St2, opposite to the nozzle hole 13 with respect to the specific location SL1, is tapered approximately to be cylindrical.

The end face of the upper housing 70 toward the nozzle hole 13 and the outer peripheral wall form a corner that is chamfered to form a curved surface.

According to the present embodiment, suppose the upper housing 70 is press-fitted into the housing 20 during the upper housing assembling process. The outer peripheral wall (first tapered surface St1) of the upper housing 70 slides on the second tapered surface St2 at the part opposite to the nozzle hole 13 with respect to the specific location SL1. At this time, the upper housing 70 hardly deforms radially inward. The upper housing 70 is temporarily press-fitted into the housing 20.

Suppose the outer peripheral wall (first tapered surface St1) of the upper housing 70 slides on the second tapered surface St2 at the part toward the nozzle hole 13 with respect to the specific location SL1. At this time, the upper housing 70 deforms radially inward to decrease the inner and outer diameters. The upper housing 70 is fully press-fitted into the housing 20.

When the upper housing 70 is press-fitted, the surface pressure increases between the upper housing 70 and the housing 20 at the part of the specific location SL1 toward the nozzle hole 13. The above-described configuration can decrease the press-fitting length at that part and reduce the amount of sliding movement at the part to which a large surface pressure may be applied. It is possible to improve the assembly efficiency. A decrease in the amount of sliding movement at the part to which a large surface pressure may be applied can more effectively inhibit peeling. It is possible to prevent foreign matters from falling onto the coil 55 and a layer short from occurring.

Sixteenth Embodiment

The description below explains the fuel injection valve according to the sixteenth embodiment. The sixteenth embodiment differs from the eleventh embodiment in the configurations between the upper housing and the housing, for example.

Suppose the upper housing 70 is press-fitted into the housing 20 during the upper housing assembling process according to the present embodiment. Then, lubricating oil is applied to at least the outer peripheral wall (first tapered surface St1) of the upper housing 70 or the inner peripheral wall (second tapered surface St2) of the outer cylinder portion 21 of the housing 20.

The above-described configuration can decrease a friction coefficient between the upper housing 70 and the housing 20 when the upper housing 70 is press-fitted. It is possible to improve the assembly efficiency. A decrease in the friction coefficient between the upper housing 70 and the housing 20 can more effectively inhibit peeling. It is possible to prevent foreign matters from falling onto the coil 55 and a layer short from occurring.

Seventeenth Embodiment

The description below explains the fuel injection valve according to the seventeenth embodiment. The seventeenth embodiment differs from the sixteenth embodiment in the configurations of the upper housing and the housing, for example.

Suppose the surface roughness is smaller than a specified value on the outer peripheral wall (first tapered surface St1) of the upper housing 70 or the inner peripheral wall (second tapered surface St2) of the outer cylinder portion 21 of housing 20. Then, the friction coefficient between the upper housing 70 and the housing 20 may increase when the upper housing 70 is press-fitted.

The present embodiment configures the surface roughness to be greater than or equal to the specified value on the outer peripheral wall (first tapered surface St1) of the upper housing 70 or the inner peripheral wall (second tapered surface St2) of the outer cylinder portion 21 of the housing 20 so that the friction coefficient between the upper housing 70 and the housing 20 is smaller than or equal to the specified value.

The above-described configuration can decrease the friction coefficient between the upper housing 70 and the housing 20 when the upper housing 70 is press-fitted. The surface roughness may be configured to be greater than or equal to the specified value on the outer peripheral wall (first tapered surface St1) of the upper housing 70 or the inner peripheral wall (second tapered surface St2) of the outer cylinder portion 21 of the housing 20. Then, lubricating oil can remain on the first tapered surface St1 or the second tapered surface St2 that is finely indented. It is possible to improve the assembly efficiency. A decrease in the friction coefficient between the upper housing 70 and the housing 20 can more effectively inhibit peeling. It is possible to prevent foreign matters from falling onto the coil 55 and a layer short from occurring.

Eighteenth Embodiment

The description below explains the fuel injection valve according to the eighteenth embodiment. The eighteenth embodiment differs from the eleventh embodiment in the upper housing assembling process.

According to the present embodiment, the upper housing 70 is press-fitted into the housing 20 at a specified speed during the upper housing assembling process. The upper housing 70 needs to be press-fitted at the speed or higher not to prevent the upper housing 70 from moving due to static friction. At the same time, the upper housing 70 needs to be press-fitted at the speed or lower to prevent the outer peripheral wall of the upper housing 70 and the inner peripheral wall of the housing 20 from being baked to each other.

As above, the optimization of the speed to press-fit the upper housing 70 can inhibit the baking and improve the assembly efficiency. The optimization of the speed to press-fit the upper housing 70 can more effectively inhibit peeling. It is possible to prevent foreign matters from falling onto the coil 55 and a layer short from occurring.

Nineteenth Embodiment

Figure 31:
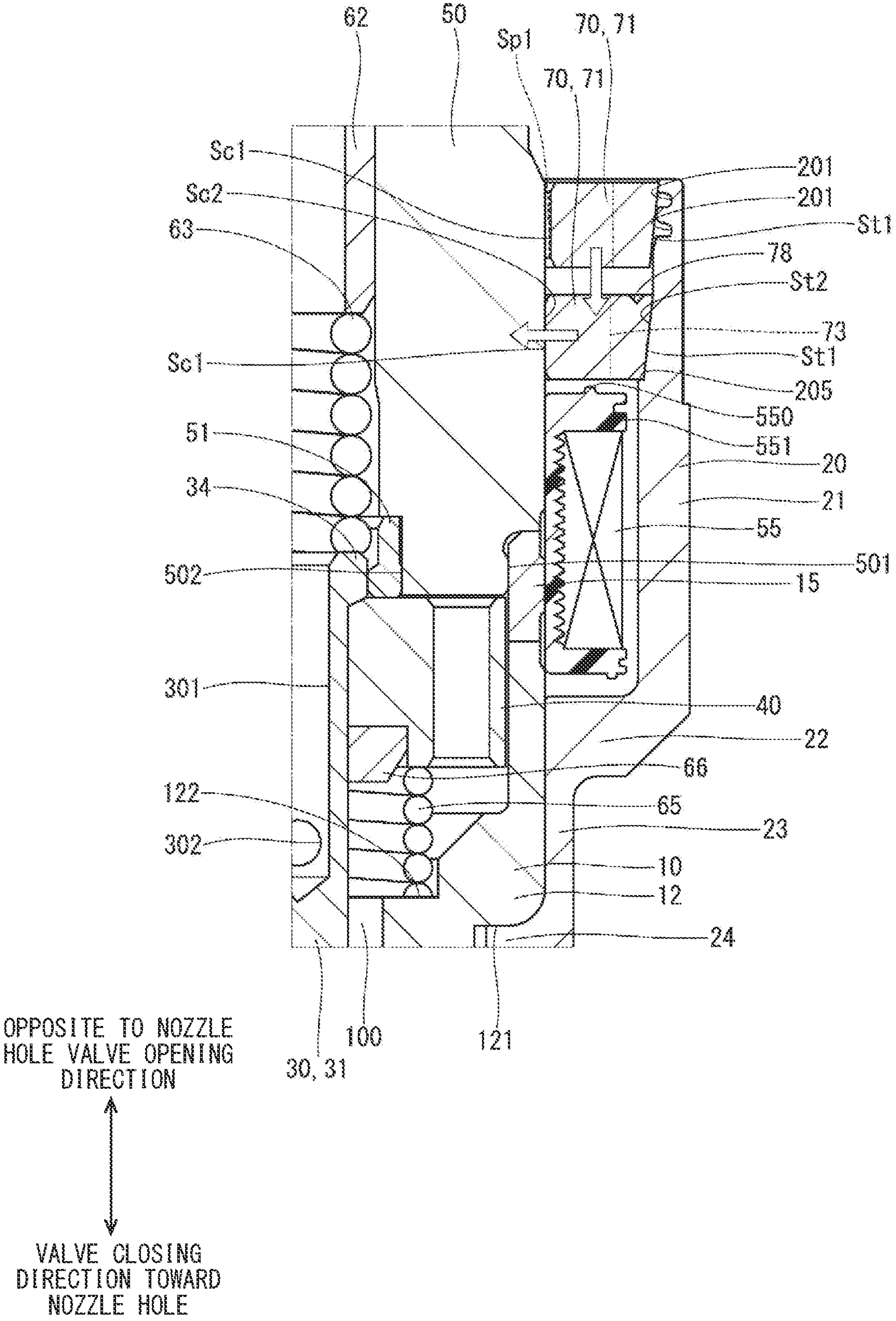
FIG. 31 is a sectional view illustrating the state of an assembling process for the upper housing of the fuel injection valve according to a nineteenth embodiment.

FIG. 31 illustrates the fuel injection valve according to the nineteenth embodiment. The nineteenth embodiment differs from the eleventh embodiment in the configurations of the upper housing, for example.

According to the present embodiment, the upper housing 70 includes a punched recessed portion 78. The punched recessed portion 78 is formed to be recessed toward the nozzle hole 13 at the outer edge portion of the upper housing 70 of the body 71 on the surface opposite to the nozzle hole 13.

During the upper housing assembling process according to the present embodiment, the upper housing 70 devoid of the punched recessed portion 78 is press-fitted into the housing 20 until abutting on the stepped surface 205. At this time, the surface pressure between the outer peripheral wall (first tapered surface St1) of the upper housing 70 and the inner peripheral wall (second tapered surface St2) of the housing 20 is configured to be lower than that of the eleventh embodiment.

After the upper housing 70 abuts on the stepped surface 205, a jig is pressed against the outer edge portion of the upper housing 70 of the body 71 on the surface opposite to the nozzle hole 13 to form the punched recessed portion 78. The consequence is to radially outward deform the outer peripheral wall of the upper housing 70 at the end opposite to the nozzle hole 13. Consequently, the outer peripheral wall of the upper housing 70 closely adheres to the inner peripheral wall of the housing 20. Therefore, the fixed core 50, the upper housing 70, and the housing 20 can reliably form an efficient magnetic circuit having a small magnetic gap and a low magnetic resistance.

As above, a decrease in the surface pressure between the upper housing 70 and the housing 20 during press-fitting of the upper housing 70 can improve the assembly efficiency. A decrease in the surface pressure between the upper housing 70 and the housing 20 during press-fitting of the upper housing 70 can more effectively inhibit peeling. It is possible to prevent foreign matters from falling onto the coil 55 and a layer short from occurring.

First Referential Mode

Figure 32:
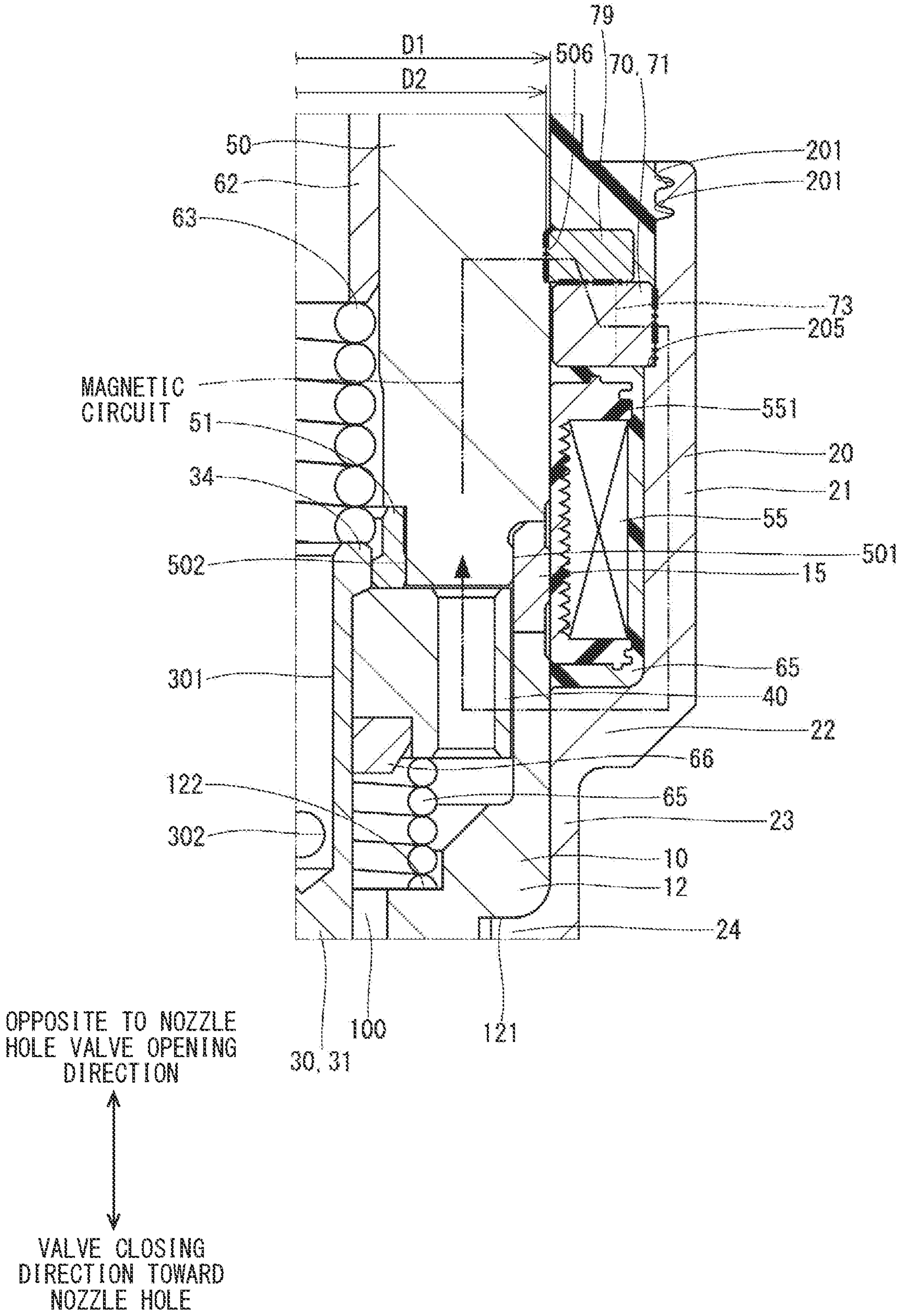
FIG. 32 is a sectional view illustrating the upper housing and the vicinity of the fuel injection valve according to a first referential mode.

FIG. 32 illustrates part of the fuel injection valve according to the first referential mode. The first referential mode differs from the second comparative mode in the configurations of the fixed core, for example.

According to the present referential mode, the fixed core 50 includes a core outer periphery recessed portion 506. The core outer periphery recessed portion 506 is annularly formed to be radially inward recessed from the outer peripheral wall of the fixed core 50. The core outer periphery recessed portion 506 is formed in the axial direction of the fixed core 50 farther from the nozzle hole 13 than the upper housing 70.

The magnetic ring 79 is provided so that the inner edge portion engages the core outer periphery recessed portion 506. The inner edge portion of the magnetic ring 79 closely adheres to the core outer periphery recessed portion 506. The end face of the magnetic ring 79 toward the nozzle hole 13 closely adheres to the end face of the upper housing 70 opposite to the nozzle hole 13. The magnetic ring 79 engages the core outer periphery recessed portion 506 and is restrained from moving axially.

Before the assembly, the inner diameter of the magnetic ring 79 is smaller than an outer diameter D1 of the fixed core 50 and an outer diameter D2 of the cylindrical bottom surface of the core outer periphery recessed portion 506. During the assembly, the magnetic ring 79 is press-fitted into the fixed core 50 with the inner peripheral wall expanded radially outward and engages the core outer periphery recessed portion 506 while pressed against the upper housing 70.

Figure 14:
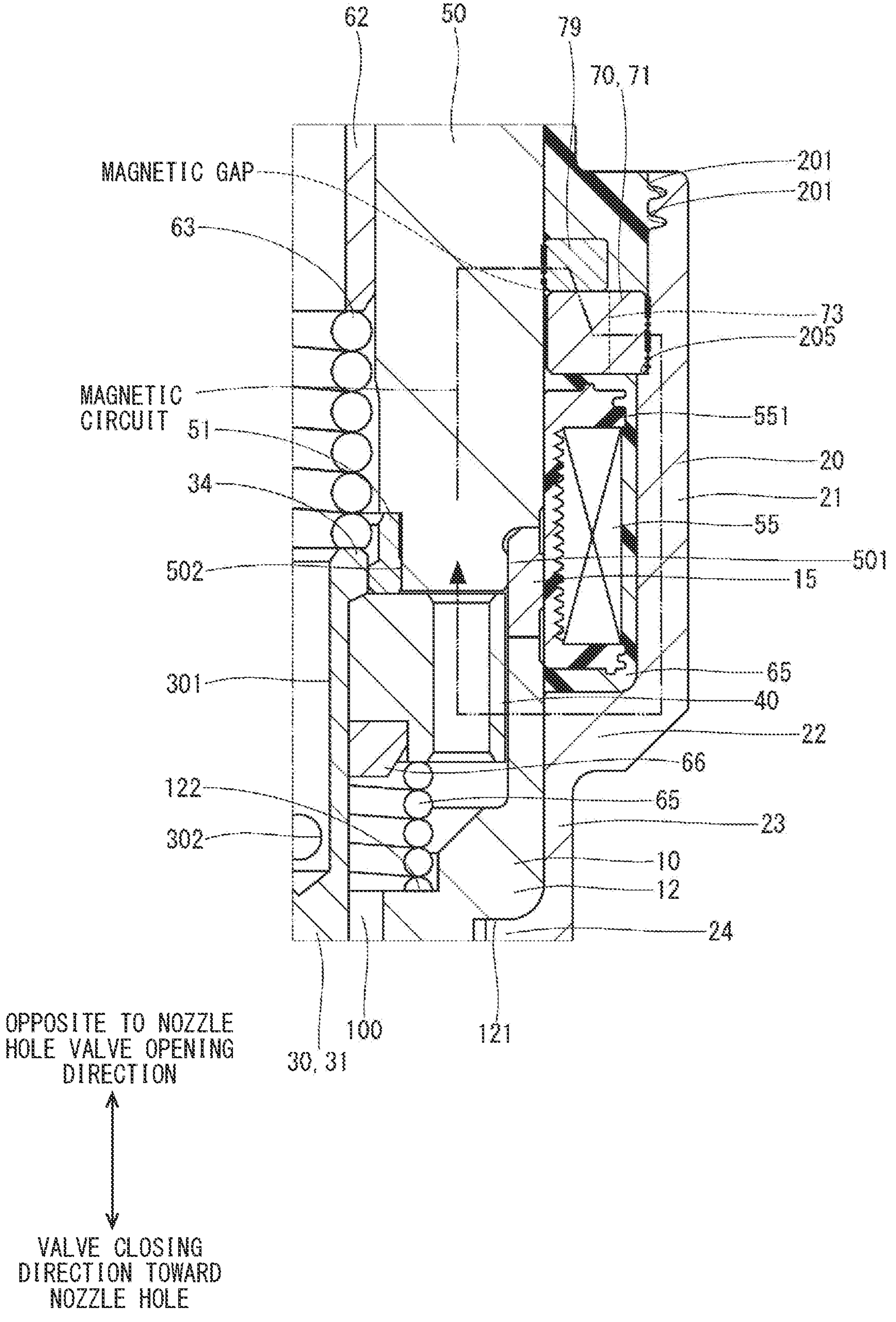
FIG. 14 is a sectional view illustrating the upper housing and the vicinity of the fuel injection valve according to a second comparative mode.

The second comparative mode may cause springback when the magnetic ring 79 is press-fitted. After the magnetic ring 79 is assembled, a gap as a magnetic gap may be formed between the end face of the upper housing 70 toward the magnetic ring 79 and the end face of the magnetic ring 79 toward the upper housing 70 (see FIG. 14).

According to the present referential mode, the magnetic ring 79 engages the core outer peripheral recessed portion 506 and is restrained from moving axially. Even if springback occurs when the magnetic ring 79 is press-fitted, it is possible to inhibit the formation of a gap as a magnetic gap between the end face of the upper housing 70 toward the magnetic ring 79 and the end face of the magnetic ring 79 toward the upper housing 70.

When the coil 55 is energized, the fixed core 50, the magnetic ring 79, the upper housing 70, and the housing 20 can form an efficient magnetic circuit having a small magnetic gap and a low magnetic resistance (see FIG. 32). It is possible to efficiently generate an attractive force corresponding to the current supplied to the coil 55 and decrease the energy required to drive the fuel injection valve 1. Consequently, it is possible to reduce the power consumption of the fuel injection valve 1.

Second Referential Mode

Figure 33:
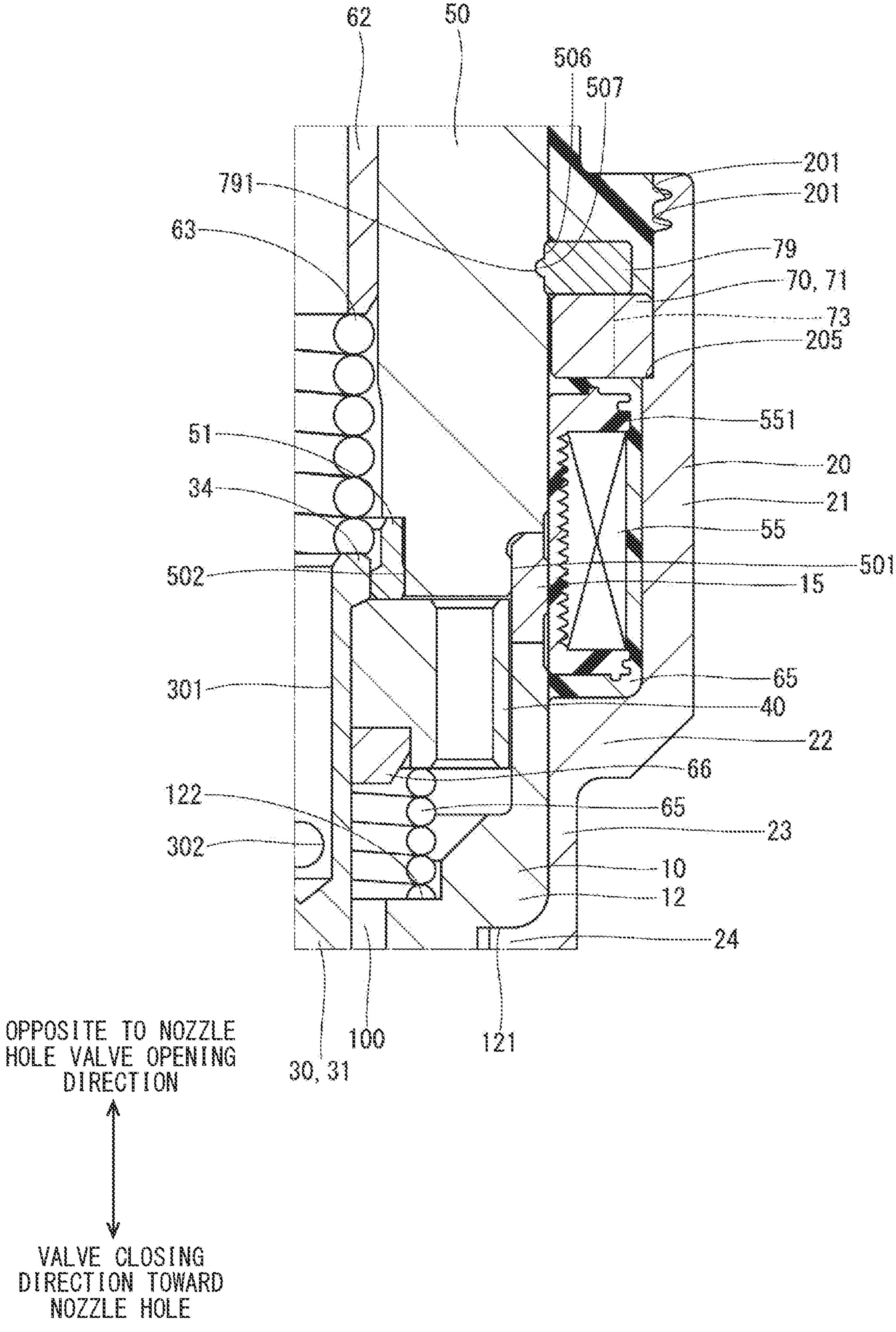
FIG. 33 is a sectional view illustrating the upper housing and the vicinity of the fuel injection valve according to a second referential mode.

FIG. 33 illustrates part of the fuel injection valve according to the second referential mode. The second referential mode differs from the first referential mode in the configurations of the magnetic ring and the fixed core, for example.

According to the present referential mode, a ring protrusion portion 791 is formed on the magnetic ring 79. The ring protrusion portion 791 is formed to protrude radially inward from the inner peripheral wall of the magnetic ring 79. The ring protrusion portion 791 is approximately C-shaped along the inner peripheral wall of the magnetic ring 79 when axially viewed from the magnetic ring 79. The ring protrusion portion 791 is formed at the center of the inner peripheral wall of the magnetic ring 79 in the axial direction. The wall surface forming the ring protrusion portion 791 is arc-shaped in cross section according to a plane including the axis of the magnetic ring 79.

The fixed core 50 further includes a core recessed portion 507. The core recessed portion 507 is annularly formed to be radially inward recessed from the cylindrical bottom surface of the core outer peripheral recessed portion 506. To correspond to the shape of the ring protrusion portion 791, the core recessed portion 507 is formed so that the wall surface forming the core recessed portion 507 is arc-shaped in cross section according to a plane including the axis of the fixed core 50.

The magnetic ring 79 is provided so that the inner edge portion engages the core outer peripheral recessed portion 506 and the ring protrusion portion 791 engages the core recessed portion 507. The inner edge portion of the magnetic ring 79 closely adheres to the core outer peripheral recessed portion 506. The ring protrusion portion 791 closely adheres to the core recessed portion 507. The end face of the magnetic ring 79 toward the nozzle hole 13 closely adheres to the end face of the upper housing 70 opposite to the nozzle hole 13. The magnetic ring 79 is restrained from moving axially due to engagement with the core outer peripheral recessed portion 506 and engagement between the ring protrusion portion 791 and the core recessed portion 507.

According to the present referential mode similar to the first referential mode, the above-described configuration can inhibit the formation of a gap as a magnetic gap between the upper housing 70 and the magnetic ring 79 after the magnetic ring 79 is assembled. When the coil 55 is energized, it is possible to form an efficient magnetic circuit having a small magnetic gap and a low magnetic resistance. It is possible to decrease the energy required to drive the fuel injection valve 1 and reduce the power consumption of the fuel injection valve 1.

Third Referential Mode

Figure 34:
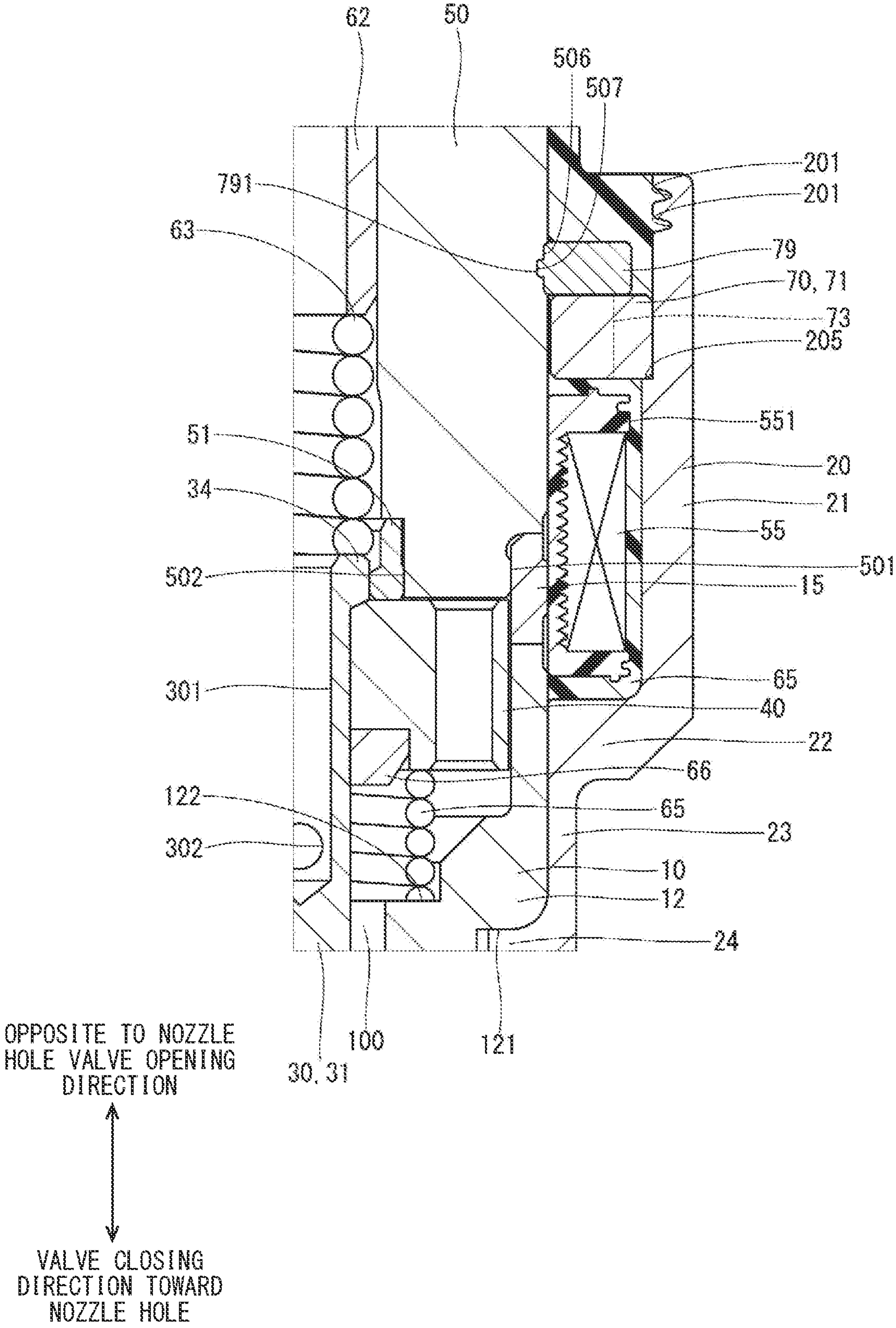
FIG. 34 is a sectional view illustrating the upper housing and the vicinity of the fuel injection valve according to a third referential mode.

FIG. 34 illustrates part of the fuel injection valve according to the third referential mode. The third referential mode differs from the second referential mode in the configurations of the magnetic ring and the fixed core, for example.

According to the present referential mode, the wall surface forming the ring protrusion portion 791 is shaped to correspond to three sides of a rectangle in cross section according to a plane including the axis of the magnetic ring 79.

To correspond to the shape of the ring protrusion portion 791, the core recessed portion 507 is formed so that the wall surface forming the core recessed portion 507 corresponds to three sides of a rectangle in cross section according to a plane including the axis of the fixed core 50.

According to the present referential mode similar to the second referential mode, the above-described configuration can inhibit the formation of a gap as a magnetic gap between the upper housing 70 and the magnetic ring 79 after the magnetic ring 79 is assembled.

Fourth Referential Mode

Figure 35:
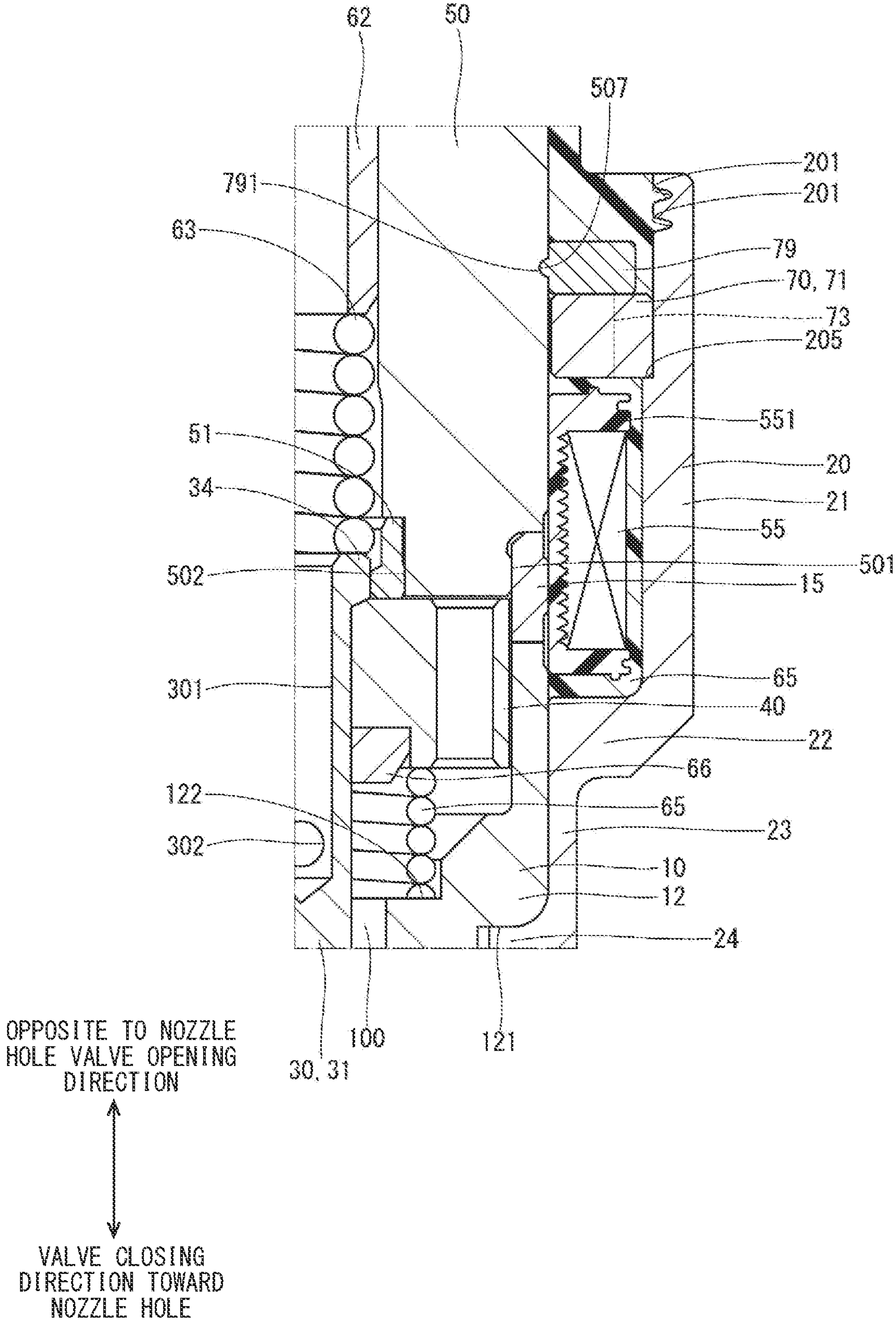
FIG. 35 is a sectional view illustrating the upper housing and the vicinity of the fuel injection valve according to a fourth referential mode.

FIG. 35 illustrates part of the fuel injection valve according to the fourth referential mode. The fourth referential mode differs from the second referential mode in the configurations of the fixed core, for example.

According to the present referential mode, the fixed core 50 does not include the core outer periphery recessed portion 506 described in the first referential mode.

The magnetic ring 79 is provided so that the ring protrusion portion 791 engages the core recessed portion 507. The inner peripheral wall of the magnetic ring 79 closely adheres to the outer peripheral wall of the fixed core 50. The ring protrusion portion 791 closely adheres to the core recessed portion 507. The end face of the magnetic ring 79 toward the nozzle hole 13 closely adheres to the end face of the upper housing 70 opposite to the nozzle hole 13. The magnetic ring 79 is restrained from moving axially due to engagement between the ring protrusion portion 791 and the core recessed portion 507.

According to the present referential mode similar to the second referential mode, the above-described configuration can inhibit the formation of a gap as a magnetic gap between the upper housing 70 and the magnetic ring 79 after the magnetic ring 79 is assembled.

Twentieth Embodiment

Figure 36:
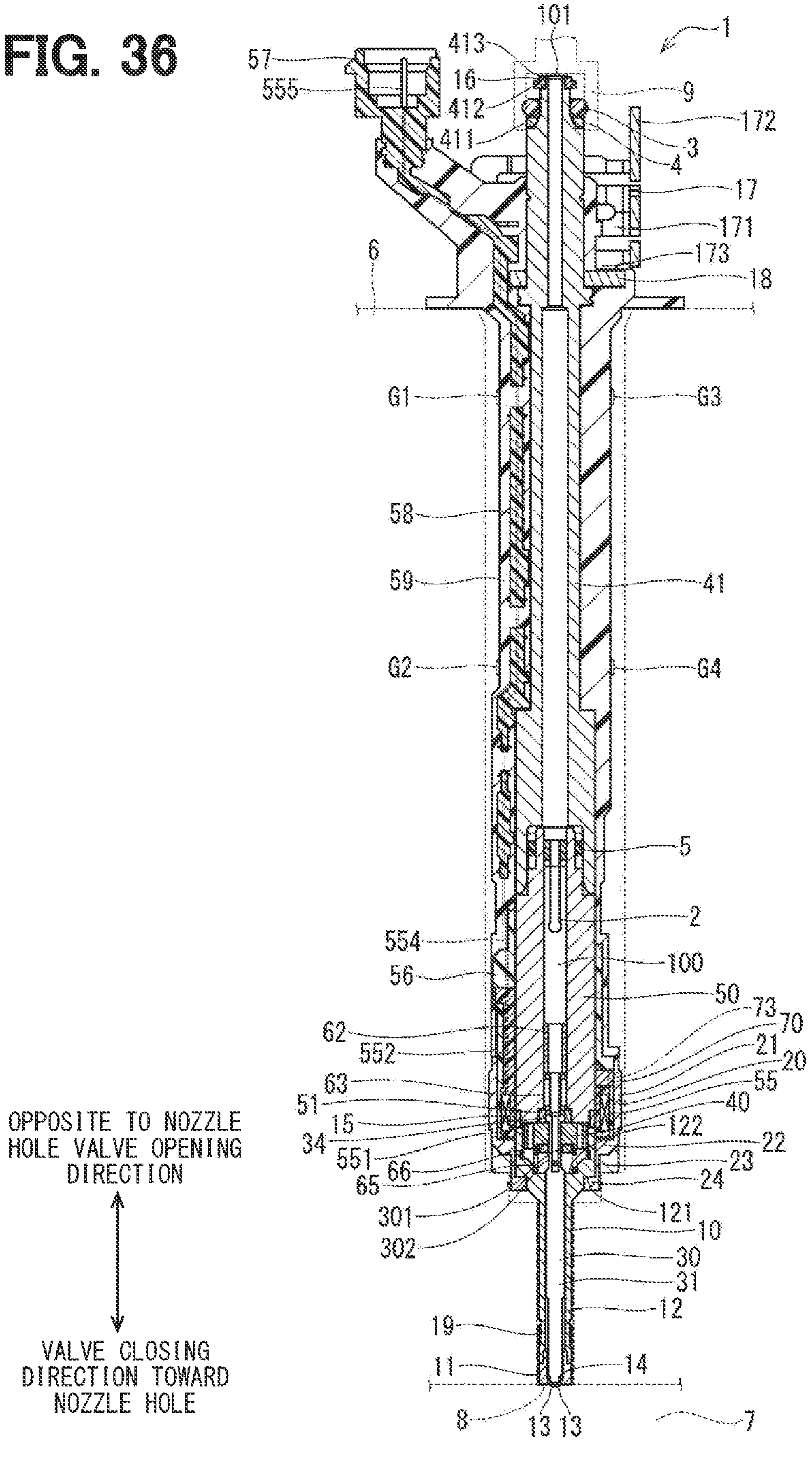
FIG. 36 is a sectional view illustrating the fuel injection valve according to a twentieth embodiment.

FIG. 36 illustrates the fuel injection valve according to the twentieth embodiment. The twentieth embodiment differs from the first embodiment in addition of multiple components.

The fuel injection valve 1 according to the present embodiment is provided for a head hole portion 8 formed at the upper center of a combustion chamber 7 of a cylinder head 6 and injects fuel into the combustion chamber 7 vertically from above the combustion chamber 7. The present embodiment is applied to so-called central-injection internal combustion engines. A central-injection internal combustion engine includes parts such as an ignition plug placed around the fuel injection valve. There is a relatively large distance from a cup 9 for a fuel line to the combustion chamber 7. The cup 9 is connected to a fuel inlet 101 of the fuel injection valve 1. The fuel injection valve 1 according to the present embodiment maintains a relatively large length from the fuel inlet 101 to the nozzle hole 13.

As illustrated in FIG. 36, the present embodiment further includes a pipe inlet 41, a lower O-ring 5, a flange inlet 18, a terminal 555, a terminal mold portion 58, an outer peripheral mold portion 59, and a retainer 17, for example.

The pipe inlet 41 is cylindrically shaped and is made of a metal such as stainless steel. The pipe inlet 41 is formed so that the inner and outer diameters are different in the axial direction. Therefore, multiple annular stepped surfaces are formed inside and outside of the pipe inlet 41.

One end of the pipe inlet 41 is formed with the fuel inlet 101 to which the cup 9 of the fuel line is connected. The fuel inlet 101 and the nozzle hole 13 are communicated via the fuel channel 100. The fuel flowing from the fuel inlet 101 can be distributed to the nozzle hole 13 via the fuel channel 100.

The other end of the pipe inlet 41 is press-fitted to the fixed core 50 at the end opposite to the nozzle hole 13. The lower O-ring 5 is annularly shaped and is made of an elastic member such as rubber. The lower O-ring 5 is provided to be radially compressed between the inner peripheral wall at the other end of the pipe inlet 41 and the outer peripheral wall of the fixed core 50 at the end opposite to the nozzle hole 13. Consequently, liquid tightness is maintained between the other end of the pipe inlet 41 and the end of the fixed core 50 opposite to the nozzle hole 13.

The flange inlet 18 is annularly shaped and is made of metal such as stainless steel. The flange inlet 18 is press-fitted to a part of the pipe inlet 41 opposite to the fixed core 50.

The terminal 555 is made of a conductor such as metal. The resin-made terminal mold portion 58 is formed integrally with the connector portion 57 and molds the terminal 555 along with the connector portion 57. One end of the terminal 555 is exposed to the space inside the connector portion 57.

The present embodiment includes a conduction portion 554 instead of the terminal 553. The conduction portion 554 is made of a conductor such as metal. One end of the conduction portion 554 is connected to the coil 55 and is covered with the bobbin extension portion 552 and the mold portion 56. The other end of the conduction portion 554 is exposed from the mold portion 56.

The terminal mold portion 58 is provided along the outer wall of the pipe inlet 41 in the axial direction of the pipe inlet 41 radially outside of the pipe inlet 41. The other end of the terminal 555 and the other end of the conduction portion 554 are electrically connected by welding.

The outer mold portion 59 is made of resin and covers part of the outer peripheral wall of the mold portion 56, part of the outer peripheral wall of the pipe inlet 41, part of the flange inlet 18, the terminal mold portion 58, and part of the connector portion 57.

The retainer 17 is made of metal, for example, and is provided at the end of the outer mold portion 59 opposite to the nozzle hole 13.

Figure 37:
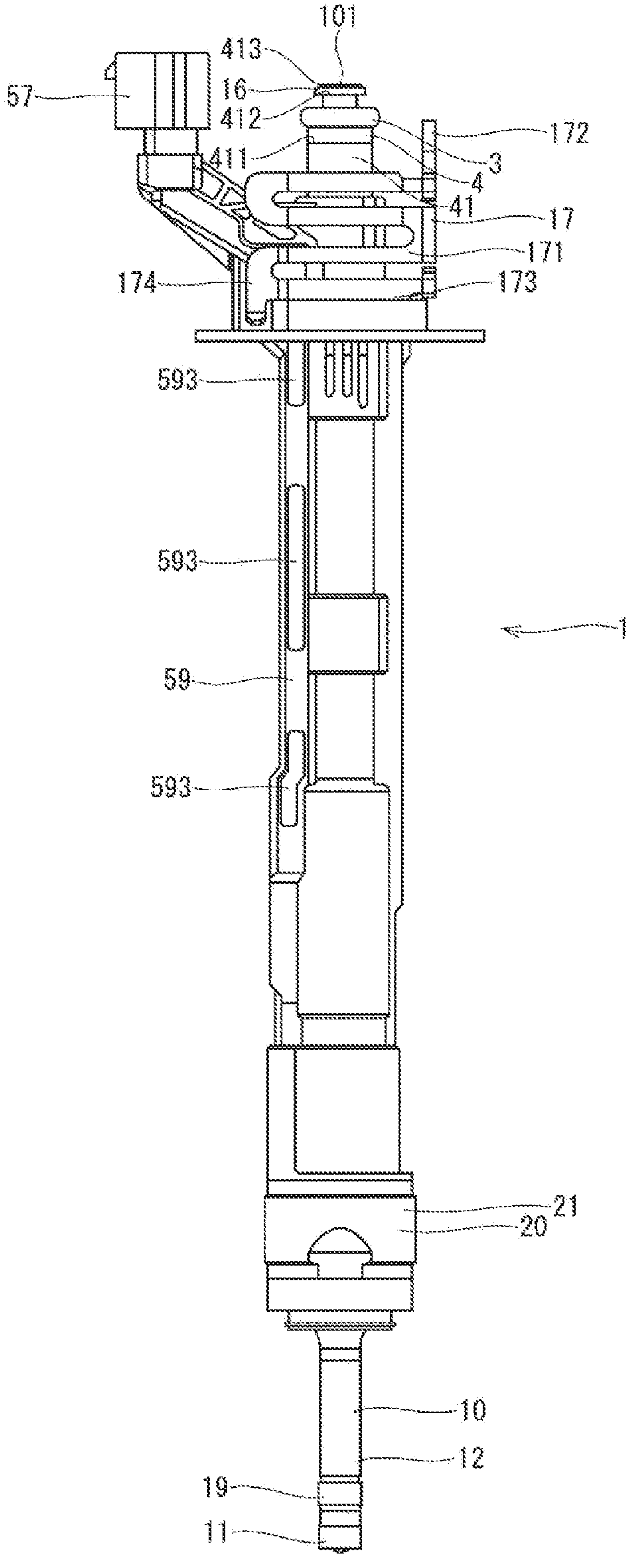
FIG. 37 is a front view illustrating the fuel injection valve according to the twentieth embodiment.
Figure 38:
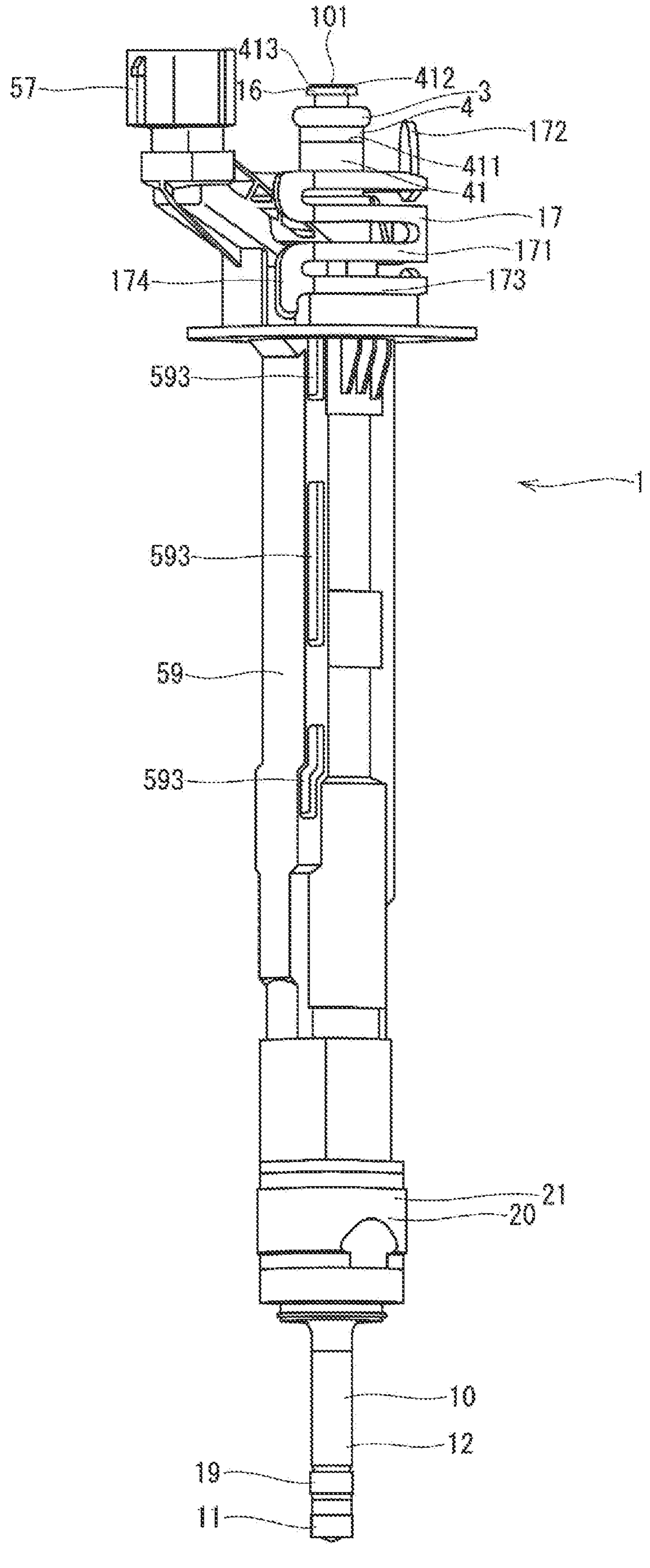
FIG. 38 is a perspective view illustrating the fuel injection valve according to the twentieth embodiment.
Figure 39:
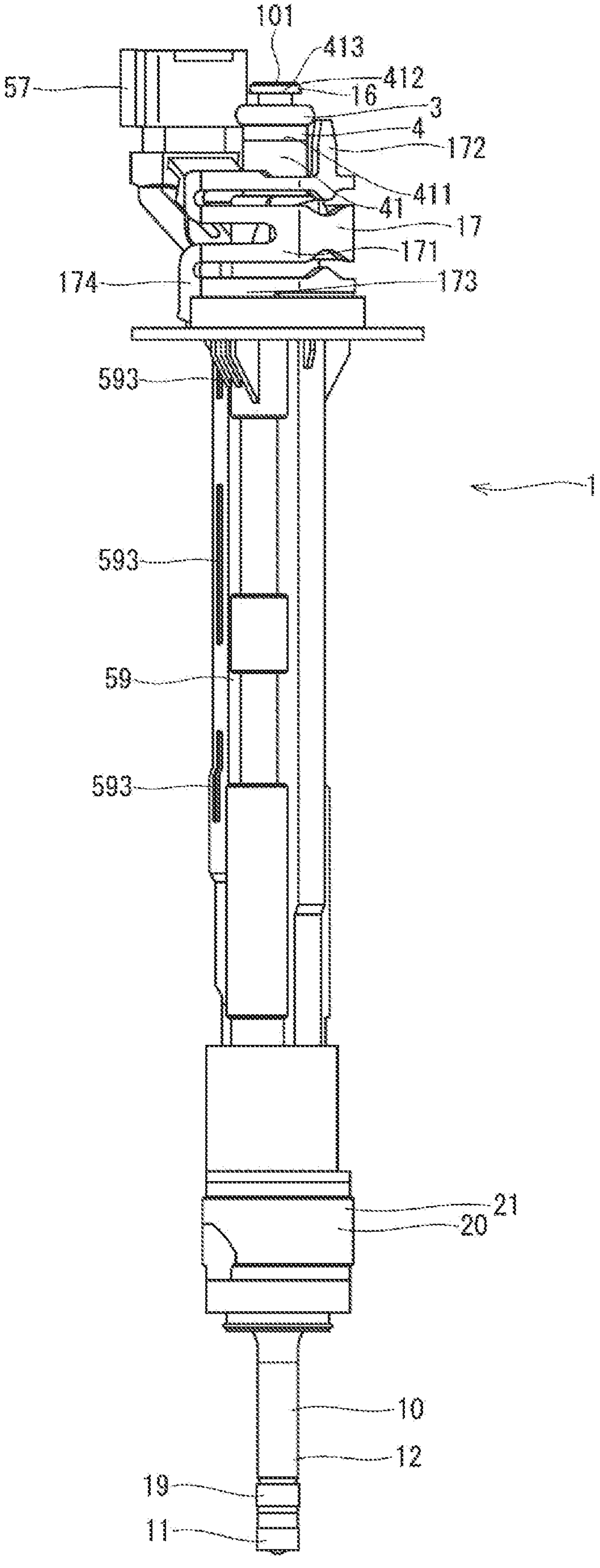
FIG. 39 is a perspective view illustrating the fuel injection valve according to the twentieth embodiment.

As illustrated in FIGS. 37 through 39, multiple mold recessed portions 593 are formed on the outer wall of the outer mold portion 59. The mold recessed portion 593 is formed to recess from the outer wall of the outer mold portion 59 and extend along the terminal mold portion 58 inside the outer mold portion 59. The mold recessed portion 593 can allow the entire resin to flow uniformly during the formation of the outer mold portion 59 and maintain the thickness of each part.

The retainer 17 is made of metal such as stainless steel. The retainer 17 includes a spring portion 171, a fitting portion 172, an abutting portion 173, and a retainer holding portion 174.

The spring portion 171 includes multiple slits that are formed in a rectangular plate-like member to extend in the longitudinal direction. The member is curved in the longitudinal direction and is approximately C-shaped when viewed in the axial direction. The spring portion 171 is elastically deformable in the axial direction.

The fitting portion 172 is formed to axially extend from the circumferential center of the spring portion 171. The fitting portion 172 can be fitted to other members such as the fuel line. This makes it possible to position the retainer 17 in the circumferential direction (rotational direction).

The abutting portion 173 is formed at the end of the spring portion 171 opposite to the fitting portion 172. The abutting portion 173 can abut to the flange inlet 18 exposed from the outer mold portion 59 (see FIG. 36).

The retainer holding portion 174 is formed at both ends of the spring portion 171 in the circumferential direction. The retainer holding portion 174 can engage the outer wall of the outer mold portion 59.

The retainer 17 is provided so that the abutting portion 173 abuts on the flange inlet 18 and the retainer holding portion 174 engages the outer wall of the outer mold portion 59.

When the fuel injection valve 1 is provided for the head hole portion 8 of the cylinder head 6, the fuel injection valve 1 can be positioned in the circumferential direction (rotational direction) by fitting the fitting portion 172 to other members such as the fuel line. After the fuel injection valve 1 is provided for the head hole portion 8, the spring portion 171 of the retainer 17 is compressed in the axial direction. The pressing force of the spring portion 171 acts on the flange inlet 18 to press the fuel injection valve 1 toward the combustion chamber 7. It is possible to inhibit the combustion pressure generated in the combustion chamber 7 from moving the fuel injection valve 1 in the direction to be removed from the head hole portion 8.

Figure 40:
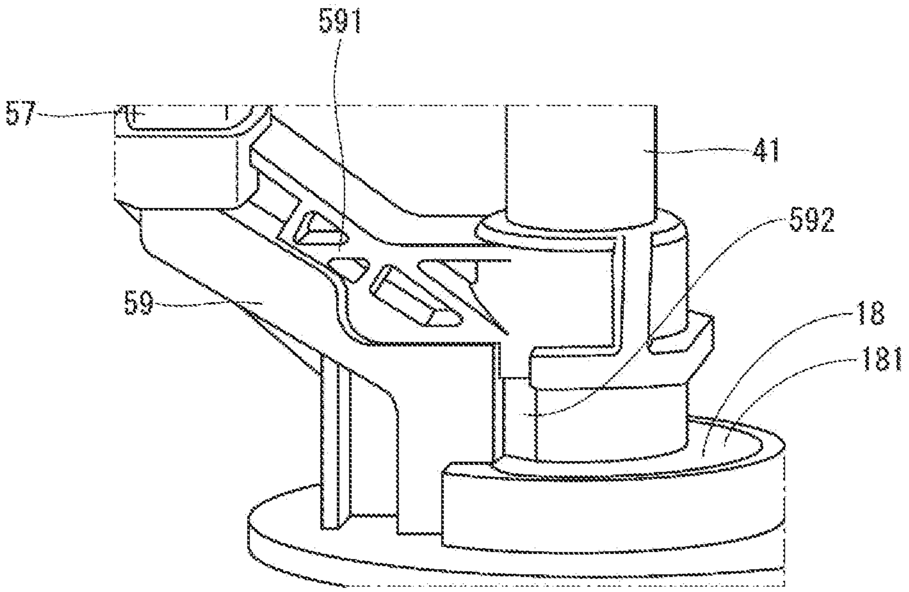
FIG. 40 is a perspective view illustrating part of the fuel injection valve according to the twentieth embodiment.

As illustrated in FIG. 40, a rib 591 is formed at a part of the outer mold portion 59 adjacent to the connector portion 57. It is possible to reinforce the part of the outer mold portion 59 adjacent to the connector portion 57. The outer mold portion 59 can be prevented from being damaged even if an external force acts on the outer mold portion 59 from a harness connected to the connector portion 57 or a human hand holding the vicinity of the connector portion 57.

A dented portion 592 is formed near the flange inlet 18 of the outer mold portion 59. It is possible to inhibit a void from being formed inside the outer mold portion 59.

Figure 41:
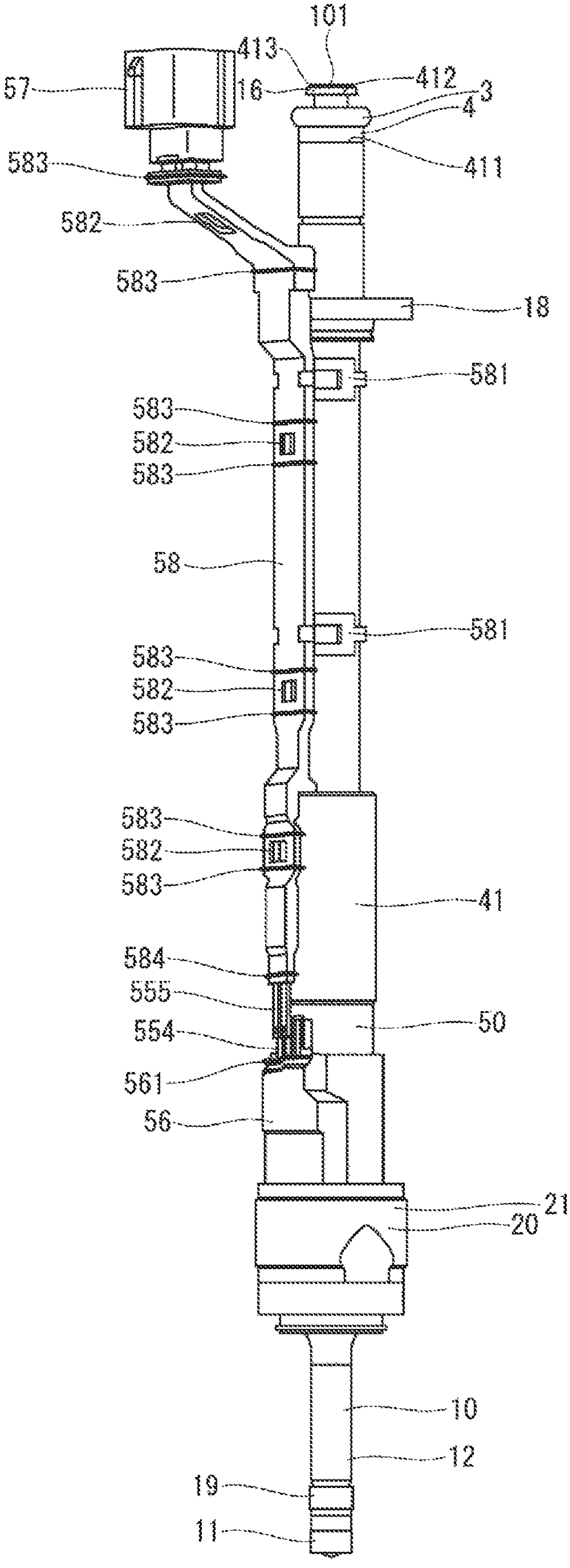
FIG. 41 is a perspective view illustrating a state of the fuel injection valve in process of manufacture according to the twentieth embodiment.

As illustrated in FIG. 41, the terminal mold portion 58 includes a holding portion 581. Two holding portions 581 are formed in the longitudinal direction of the terminal mold portion 58. The terminal mold portion 58 is provided so that the holding portions 581 catch the outer peripheral wall of the pipe inlet 41 before the outer mold portion 59 covers the pipe inlet 41, for example, by resin molding. The terminal mold portion 58 is provided so that the end of the conduction portion 554 abuts on the end of the terminal 555.

Figure 42:
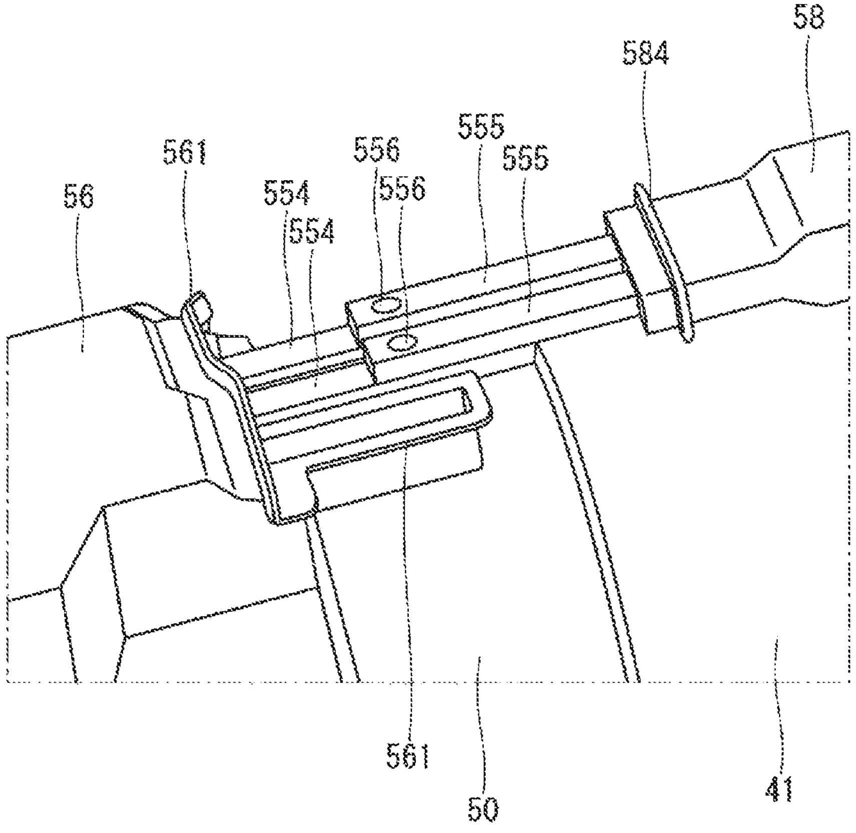
FIG. 42 is a partial perspective view illustrating a state of the fuel injection valve in process of manufacture according to the twentieth embodiment.

As illustrated in FIG. 42, press working forms a pressed hole portion 556 at the end of the terminal 555. For example, projection welding is used to weld the end of the conduction portion 554 and the end of the terminal 555. Specifically, a large current is applied to the pressed hole portion 556 of the terminal 555. The generated heat melts to weld between the pressed hole portion 556 and the conduction portion 554. The projection welding can inhibit variations in welding resistances and stabilize welding.

Figure 43:
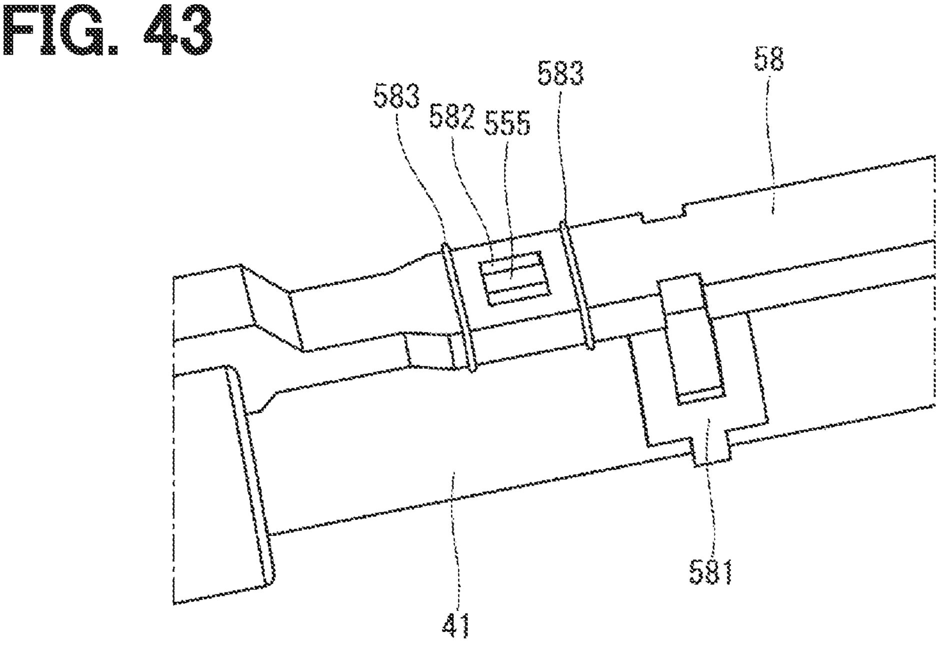
FIG. 43 is a partial perspective view illustrating a state of the fuel injection valve in process of manufacture according to the twentieth embodiment.

As illustrated in FIGS. 41 and 43, a mold hole portion 582 is formed in the terminal mold portion 58. The mold hole portion 582 is formed to hold the terminal 555 when the terminal mold portion 58 is resin-molded. After the terminal 555 is covered with the terminal mold portion 58, the terminal 555 is exposed to be visible through the mold hole portion 582. Four mold hole portions 582 are formed in the longitudinal direction of the terminal mold portion 58.

Welding protrusions 583 and 584 are formed on the terminal mold portion 58. Multiple welding protrusions 583 are formed so that each mold hole portion 582 is positioned between the welding protrusions 583 in the longitudinal direction of the terminal mold portion 58. The welding protrusion 583 is annularly formed around the terminal mold portion 58 to protrude from the outer wall of the terminal mold portion 58.

The welding protrusion 584 is annularly formed around the terminal mold portion 58 to protrude from the outer wall of the terminal mold portion 58 at the end opposite to the connector portion 57.

The welding protrusion 561 is formed at the end of the mold portion 56 toward the terminal mold portion 58 (see FIG. 42). The welding protrusion 561 is formed around the exposed conduction portion 554 to protrude from the outer wall of the mold portion 56.

When the outer mold portion 59 is formed, the welding protrusion 583 melts due to the heat of the melted resin and integrates with part of the outer mold portion 59. It is possible to seal the mold hole portion 582 from the surrounding and inhibit water from the outside from adhering to the terminal 555 through the mold hole portion 582. The terminal 555 can be protected against corrosion.

When the outer mold portion 59 is formed, the welding protrusion 584 and the welding protrusion 561 melt due to the heat of the melted resin and integrate with part of the outer mold portion 59. It is possible to seal the welded part between the terminal 555 and the conduction portion 554 from the surrounding and inhibit water from the outside from adhering to the welded part. The welded part can be protected against corrosion.

As illustrated in FIG. 36, the melted resin is poured into the mold from gates G1 through G4 to form the outer mold portion 59. The gates G1 and G2 are provided at points corresponding to the terminal mold portion 58 in the circumferential direction of the outer mold portion 59. The gates G1 and G2 are provided to separate from each other at a predetermined distance in the longitudinal direction of the outer mold portion 59.

The gate G3 is provided opposite the gate G1 with respect to the axis of the pipe inlet 41. The gate G4 is provided opposite the gate G2 with respect to the axis of the pipe inlet 41.

Since the gates G1 through G4 are positioned as above, a weld of the outer mold portion 59 can be formed between the gates G1 and G3 and between the gates G2 and G4. It is possible to inhibit the weld of the outer mold portion 59 from being formed near the welding protrusions 583 and 584 of the terminal mold portion 58. Sealing properties of the welding protrusions 583 and 584 can be ensured.

As illustrated in FIG. 36, an upper O-ring 3, a spacer 4, and a ring stopper 16 are provided at the end of the pipe inlet 41 toward the fuel inlet 101.

A pipe large-diameter stepped surface 411, a pipe small-diameter stepped surface 412, and a stopper locking portion 413 are formed at the end of the pipe inlet 41 toward the fuel inlet 101. The pipe large-diameter stepped surface 411 is formed into an annularly planar shape to be approximately perpendicular to the axis of the pipe inlet 41 on the outer peripheral wall of the pipe inlet 41.

The pipe small-diameter stepped surface 412 is formed into an annularly planar shape to be approximately perpendicular to the axis of the pipe inlet 41 on the outer peripheral wall of the pipe inlet 41 toward the fuel inlet 101 with respect to the pipe large-diameter stepped surface 411. The inner and outer diameters of the pipe small-diameter stepped surface 412 are smaller than the inner diameter of the pipe large-diameter stepped surface 411.

The stopper locking portion 413 is annularly formed to protrude radially outward from the outer peripheral wall of the pipe inlet 41 at the end toward the fuel inlet 101.

The spacer 4, made of metal such as stainless steel, is annularly formed and is provided to abut on the pipe large-diameter stepped surface 411. The upper O-ring 3, made of an elastic member such as rubber, is annularly formed and is provided to abut on the surface of the spacer 4 opposite to the pipe large-diameter stepped surface 411. The ring stopper 16 is provided between the pipe small-diameter stepped surface 412 and the stopper locking portion 413. The outer diameter of the stopper locking portion 413 is larger than the inner diameter of the ring stopper 16. The stopper locking portion 413 locks the ring stopper 16 and inhibits the ring stopper 16 from falling off from the pipe inlet 41.

The outer diameter of the ring stopper 16 is larger than the inner diameter of the upper O-ring 3. The ring stopper 16 can inhibit the upper O-ring 3 from falling off from the pipe inlet 41.

When the cup 9 of the fuel line is connected to the end of the pipe inlet 41 toward the fuel inlet 101, the upper O-ring 3 is radially compressed between the inner peripheral wall of the cup 9 and the outer peripheral wall of the pipe inlet 41. Consequently, liquid tightness is maintained between the cup 9 and the pipe inlet 41.

The inner diameter of the cup 9 is larger than the inner diameter of the pipe inlet 41 at the end toward the fixed core 50. When the inside of the cup 9 and the fuel channel 100 are filled with fuel, the pressure-receiving area of the upper O-ring 3 is larger than the pressure receiving area of the lower O-ring 5. With respect to the pipe inlet 41, the fuel pressure acting toward the combustion chamber 7 is larger than the fuel pressure acting toward the cup 9. It is possible to inhibit the separation between the pipe inlet 41 and the fixed core 50 even when the inside of the cup 9 and the fuel channel 100 are filled with high-pressure fuel.

Figure 44:
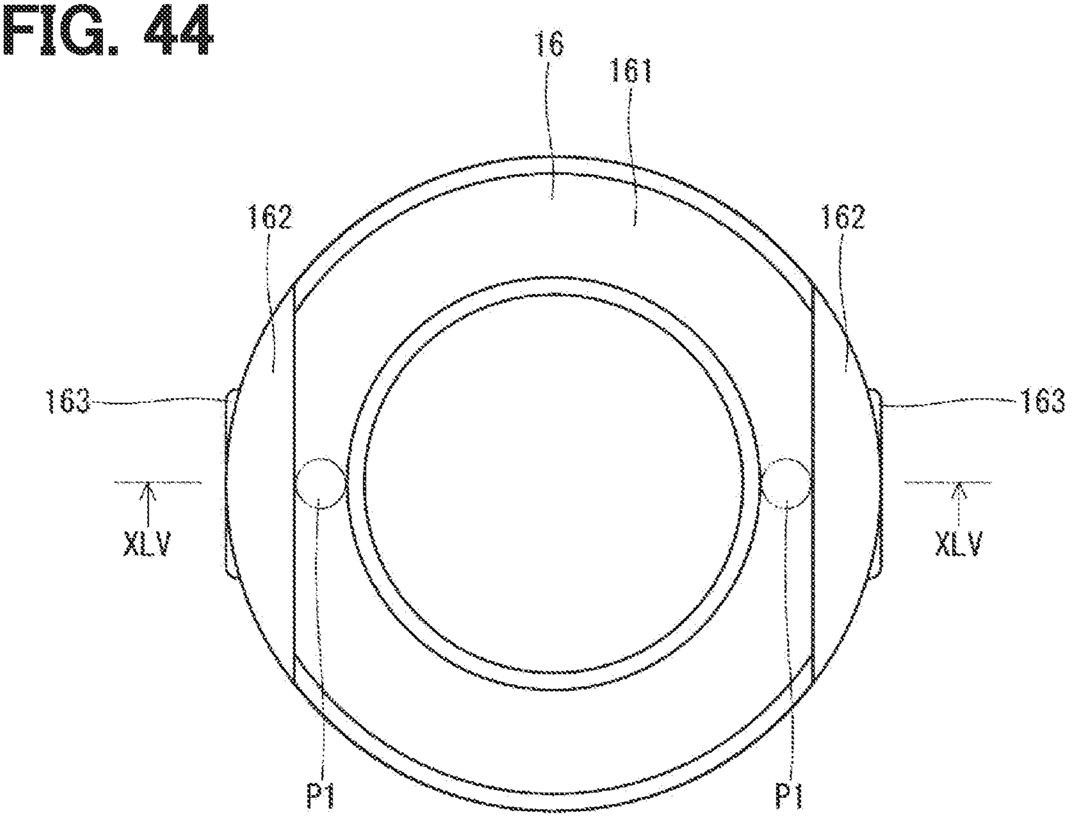
FIG. 44 is a plan view illustrating a ring stopper of the fuel injection valve according to a tenth embodiment.
Figure 45:
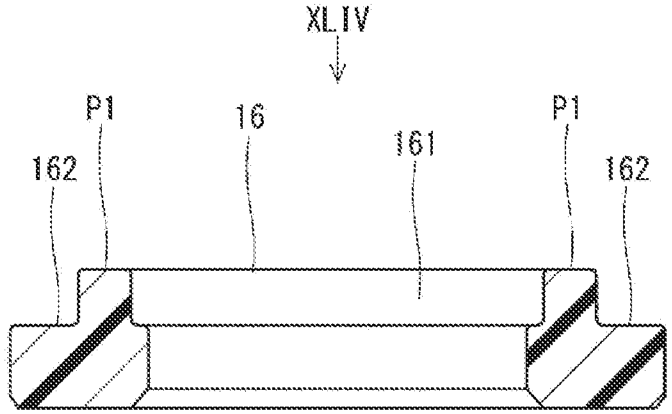
FIG. 45 is a sectional view taken along the line XLV-XLV of FIG. 44.

As illustrated in FIG. 44, the ring stopper 16 includes a stopper body 161, a stepped surface portion 162, and a gate mark 163. The ring stopper 16 is made of resin, for example.

The stopper body 161 is formed approximately annularly. The stepped surface portion 162 is formed to be recessed from the outer edge portion of the stopper body 161 at one end face toward the other end face. The stepped surface portion 162 does not connect the inner peripheral wall and the outer peripheral wall of the stopper body 161. Two stepped surface portions 162 are formed at equal intervals in the circumferential direction of the stopper body 161. The gate mark 163 is a protrusion formed when the ring stopper 16 is injection-molded. The gate mark 163 is formed to protrude outward from the outer peripheral wall at the position where the stepped surface portion 162 of the stopper body 161 is formed. The stepped surface portion 162 can easily distinguish between both sides of the ring stopper 16.

To mount the ring stopper 16, hold it so that the surface devoid of the stepped surface part 162 faces the upper O-ring 3. Push the ring stopper 16 toward the pipe inlet 41 by pressing two points P1 with fingers, for example. The points P1 are located on the surface where the stepped surface part 162 of the stopper body 161 is formed. When the inner edge portion crosses over the stopper locking portion 413, the ring stopper 16 is mounted between the pipe small-diameter stepped surface 412 and the stopper locking portion 413.

Figure 46:
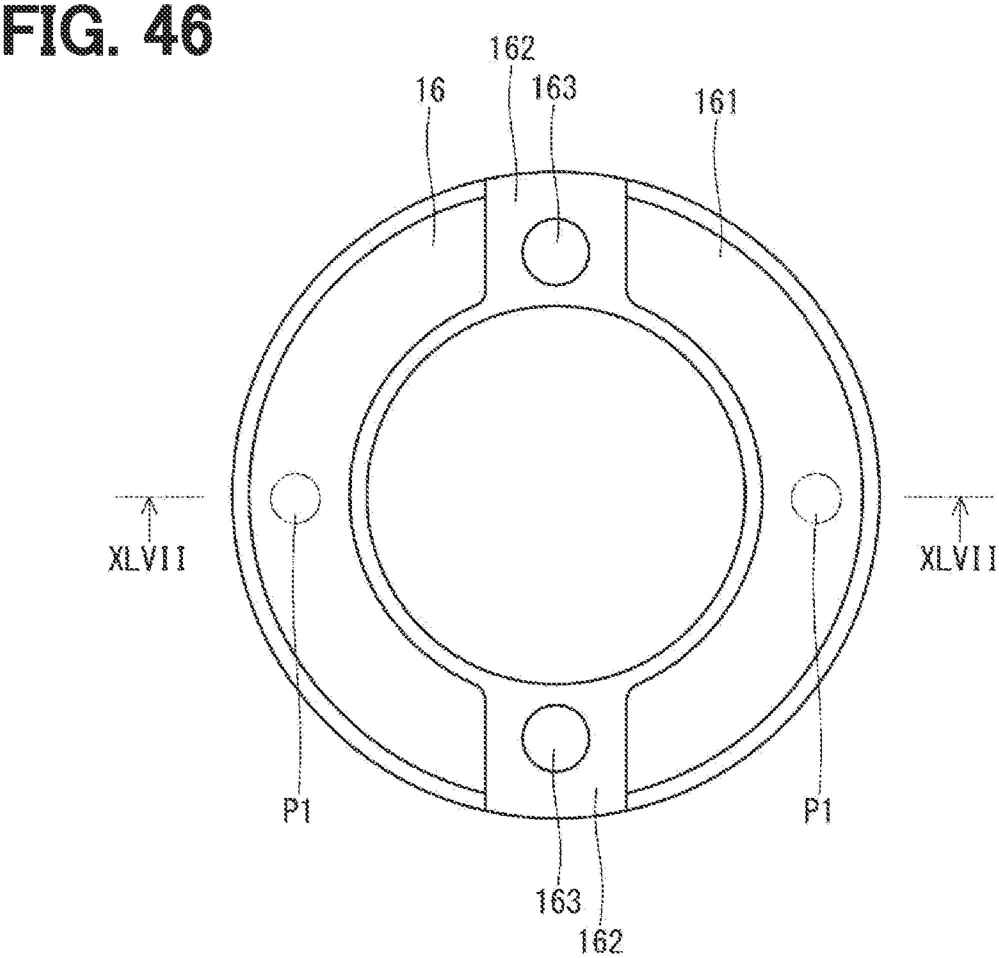
FIG. 46 is a plan view illustrating the ring stopper of the fuel injection valve according to a third comparative mode.
Figure 47:
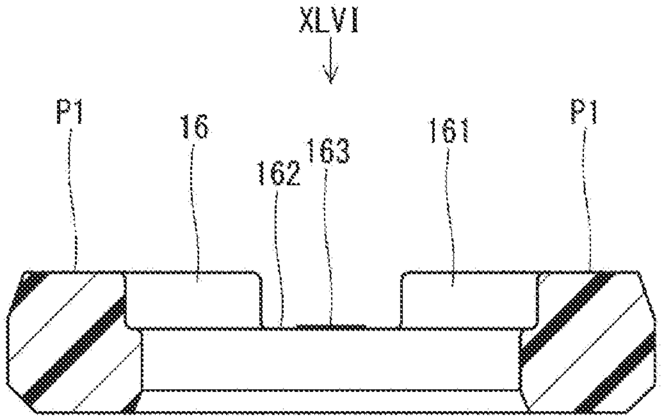
FIG. 47 is a sectional view taken along the line XLVII-XLVII of FIG. 46.

FIG. 46 illustrates the third comparative mode. The stepped surface portion 162 is formed to connect the inner peripheral wall and the outer peripheral wall of the stopper body 161. The gate mark 163 is formed to protrude in the plate thickness direction from the stepped surface portion 162.

According to the third comparative mode, the stepped surface part 162 is formed to connect the inner peripheral wall and the outer peripheral wall of the stopper body 161. When attaching the ring stopper 16 to the pipe inlet 41, the ring stopper 16 may be pushed toward the pipe inlet 41 by pressing two points P1 with fingers, for example. The points P1 are located on the surface where the stepped surface part 162 of the stopper body 161 is formed. In this case, the stopper body 161 may be distorted or greatly deformed where the stepped surface portion 162 is formed.

According to the present embodiment, the stepped surface part 162 does not connect the inner peripheral wall and the outer peripheral wall of the stopper body 161. The strength of the stopper body 161 can be ensured. When the ring stopper 16 is attached to the pipe inlet 41, the stopper body 161 can be inhibited from being distorted or largely deformed even if the ring stopper 16 is pushed toward the pipe inlet 41 by pressing two points P1 on the stopper body 161 with fingers, for example.

Figure 48:
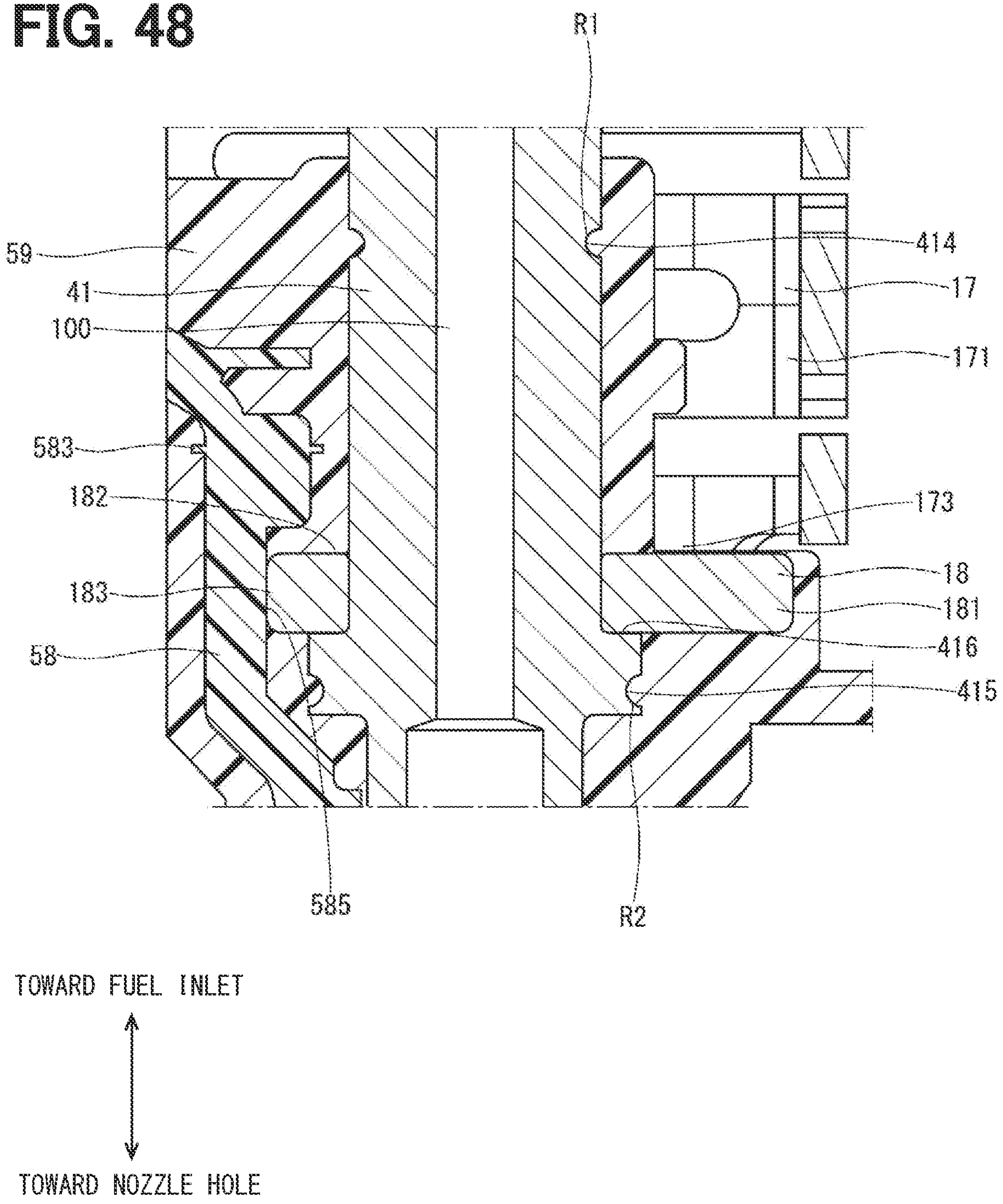
FIG. 48 is a sectional view illustrating part of the fuel injection valve according to the twentieth embodiment.
Figure 49:
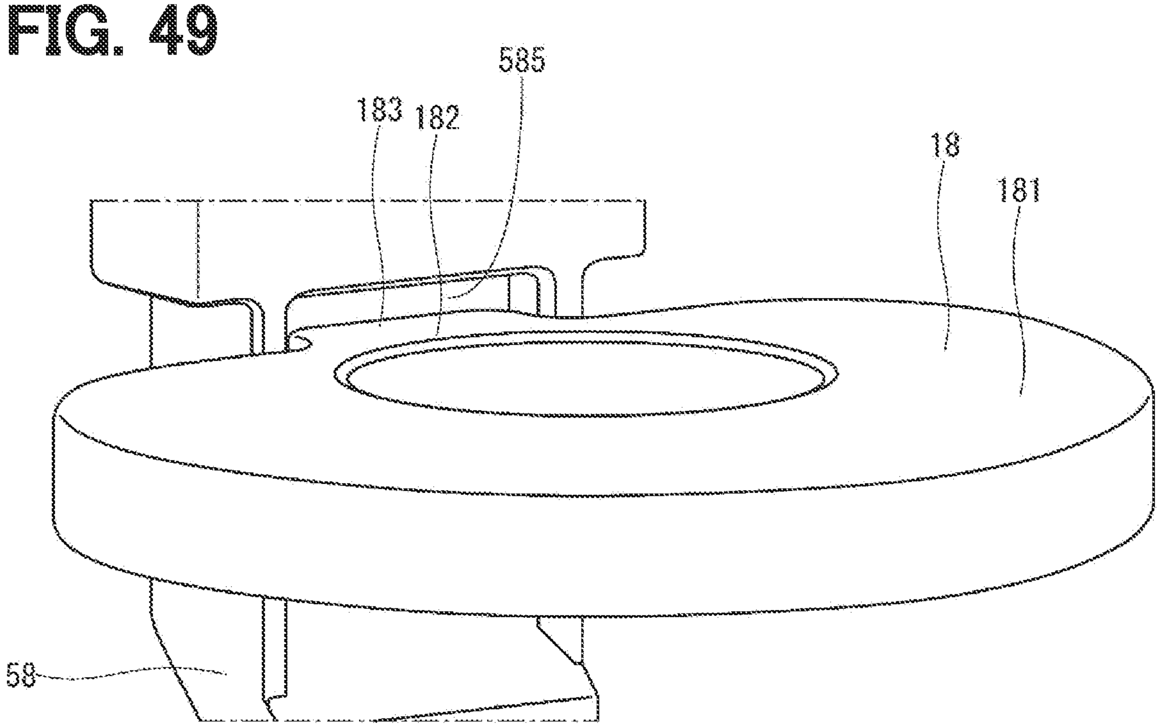
FIG. 49 is a partial perspective view illustrating a state of the fuel injection valve in process of manufacture according to the twentieth embodiment.
Figure 50:
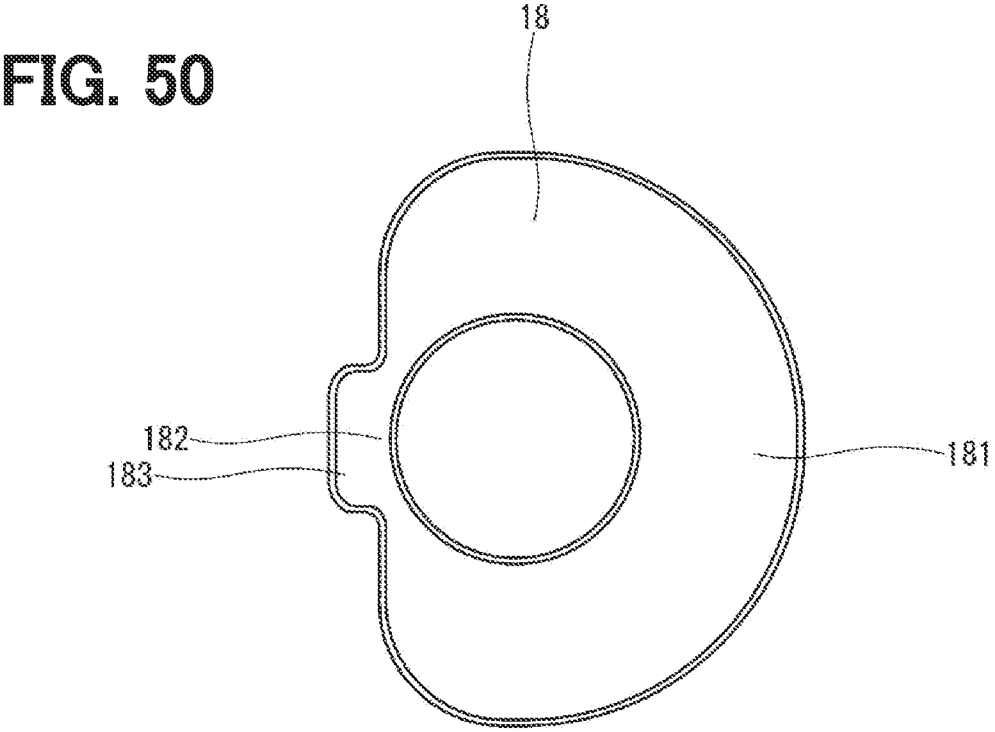
FIG. 50 is a plan view illustrating a flange inlet of the fuel injection valve according to the twentieth embodiment.

As illustrated in FIGS. 48 through 50, the flange inlet 18 includes a flange body 181, a narrow portion 182, and a flange protrusion portion 183. The flange inlet 18 is made of metal such as stainless steel.

The flange body 181 is shaped into an approximately annular plate. The narrow portion 182 is formed as part of the flange body 181 in the circumferential direction and has a narrower radial width than the other parts of the flange body 181. The flange protrusion portion 183 is formed to protrude radially outward from the narrow portion 182.

As illustrated in FIG. 48, the flange inlet 18 is press-fitted to the pipe inlet 41 so that the inner peripheral wall engages the outer peripheral wall of the pipe inlet 41. The inner edge portion of the flange inlet 18 on the surface toward the nozzle hole 13 abuts on a flange locking stepped surface 416 that is formed into an annularly planar shape on the outer peripheral wall of the pipe inlet 41. The flange inlet 18 is restrained from moving toward the nozzle hole 13.

The terminal mold portion 58 is formed with a terminal mold recessed portion 585. The terminal mold recessed portion 585 is formed to be recessed from a part of the outer wall of the terminal mold portion 58 facing the pipe inlet 41. The flange protrusion portion 183 engages the terminal mold recessed portion 585. This makes it possible to position the terminal mold portion 58 and the connector portion 57 in the circumferential direction (rotational direction) of the pipe inlet 41.

The surface of the flange body 181 of the flange inlet 18, opposite to the flange locking stepped surface 416, is exposed from the outer mold portion 59. The abutting portion 173 of the retainer 17 abuts on the flange inlet 18 exposed from the outer mold portion 59. The pressing force (load) from the retainer 17 toward the combustion chamber 7 acts on the flange locking stepped surface 416 via the flange inlet 18.

The pipe inlet 41 is formed with pipe annularly-recessed portions 414 and 415. The pipe annularly-recessed portion 414 is annularly formed to be recessed radially inward from the outer peripheral wall of the flange inlet 18 toward the fuel inlet 101 with respect to the flange inlet 18. The pipe annularly-recessed portion 415 is annularly formed to be recessed radially inward from the outer peripheral wall of the flange inlet 18 toward the nozzle hole 13 with respect to the flange inlet 18.

In the cross-section including the axis of the pipe inlet 41, a labyrinth-like path R1, including at least one curved portion, is formed at the interface between the pipe annularly-recessed portion 414 and the outer mold portion 59 (see FIG. 48). For example, suppose water penetrates between the outer peripheral wall of the pipe inlet 41 and the upper end of the outer mold portion 59. Even in such a case, the path R1 provides a hindrance and can inhibit the water from flowing toward the flange inlet 18.

In the cross-section including the axis of the pipe inlet 41, a labyrinth-like path R2, including at least one curved portion, is formed at the interface between the pipe annularly-recessed portion 415 and the outer mold portion 59 (see FIG. 48). For example, suppose water penetrates between the outer edge portion of the flange inlet 18 and the outer mold portion 59. Even in such a case, the path R2 provides a hindrance and can inhibit the water from flowing toward the terminal 555 of the mold hole portion 582.

Figure 51:
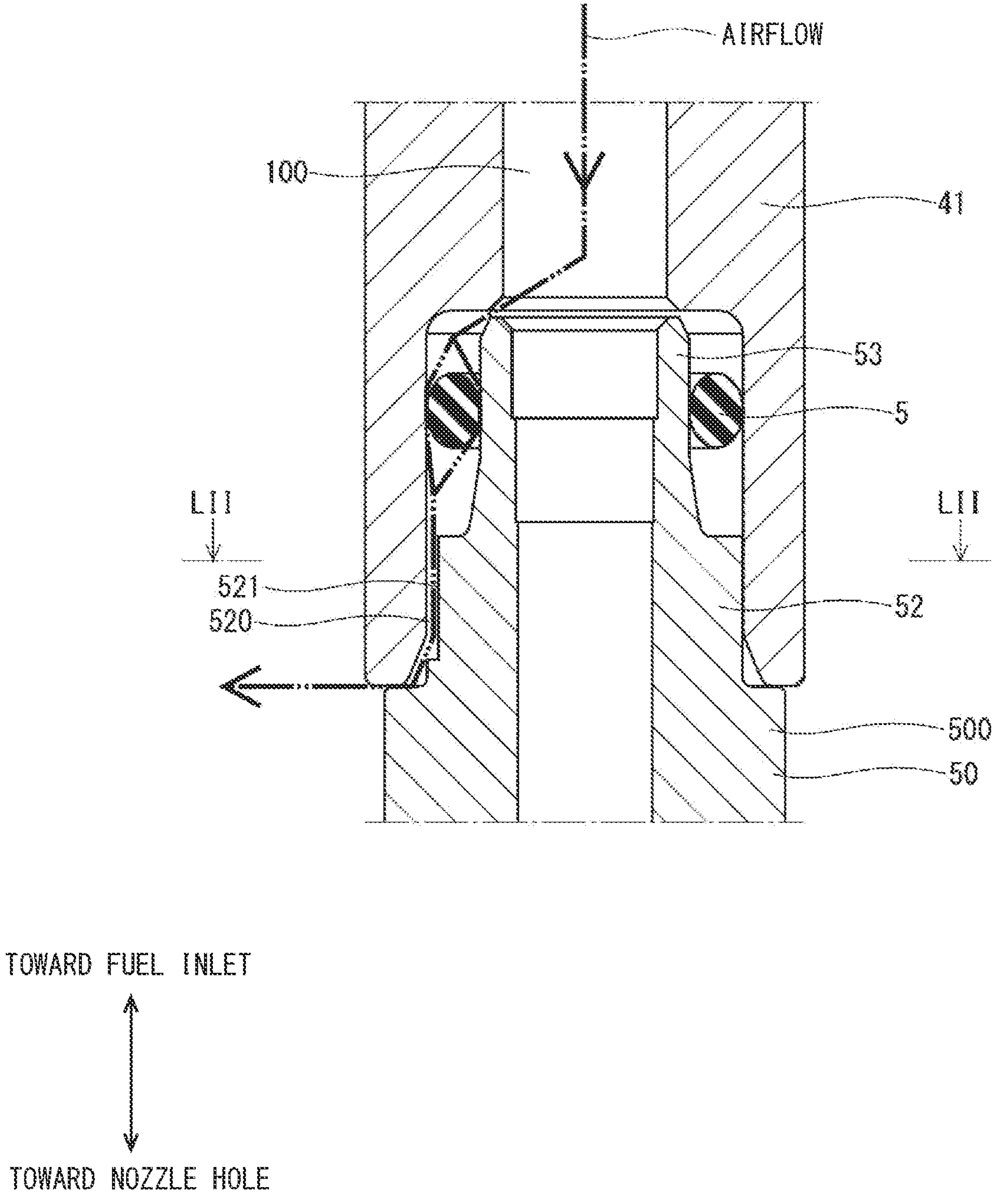
FIG. 51 is a partial perspective view illustrating a state of the fuel injection valve in process of manufacture according to the twentieth embodiment.
Figure 52:
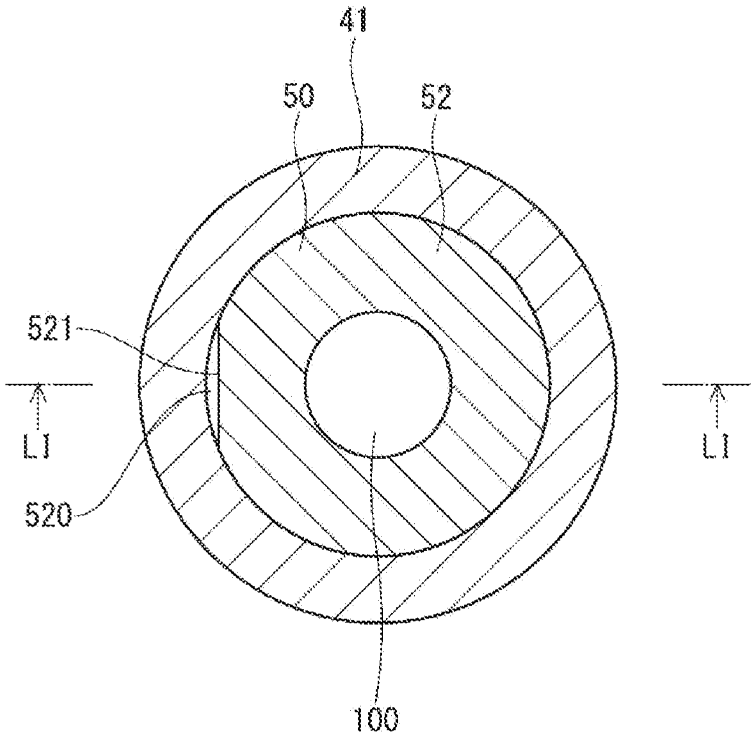
FIG. 52 is a sectional view taken along the line LII-LII of FIG. 51.

As illustrated in FIGS. 51 and 52, a core end portion 500, a core large-diameter portion 52, and a core small-diameter portion 53 are formed at the end of the fixed core 50 toward the pipe inlet 41.

The core end portion 500 is formed approximately cylindrically. The core large-diameter portion 52 is formed approximately cylindrically opposite to the nozzle hole 13 with respect to the core end portion 500. The outer diameter of the core large-diameter portion 52 is smaller than the outer diameter of the core end portion 500. The core small-diameter portion 53 is formed approximately cylindrically opposite to the nozzle hole 13 with respect to the core large-diameter portion 52. The outer diameter of the core small-diameter portion 53 is smaller than the outer diameter of the core large-diameter portion 52. The pipe inlet 41 is press-fitted to the fixed core 50 so that the inner peripheral wall at the end toward the nozzle hole 13 engages the outer peripheral wall of the core large-diameter portion 52.

The lower O-ring 5 is radially compressed and is provided between the inner peripheral wall of the pipe inlet 41 at the end toward the nozzle hole 13 and the outer peripheral wall of the core small-diameter portion 53.

A leak path groove portion 521 is formed for the core large-diameter portion 52. The leak path groove portion 521 is formed by partially cutting the outer peripheral wall of the core large-diameter portion 52 in the circumferential direction. Consequently, a leak path 520 as space is formed between the leak path groove portion 521 and the inner peripheral wall of the pipe inlet 41 at the end toward the nozzle hole 13.

After the pipe inlet 41 and the fixed core 50 are press-fitted, the lower O-ring 5 may provide insufficient sealing. In such a case, blow air into the fuel channel 100. Air flows between the lower O-ring 5 and the pipe inlet 41 or the core small-diameter portion 53, passes through the leak path 520, and flows outside between the core end portion 500 and the pipe inlet 41. After press-fitting the pipe inlet 41 and the fixed core 50, blow air into the fuel channel 100 and check for air outflow between the core end portion 500 and the pipe inlet 41. By doing so, it is possible to confirm whether the lower O-ring 5 ensures sealing properties.

Figure 53:
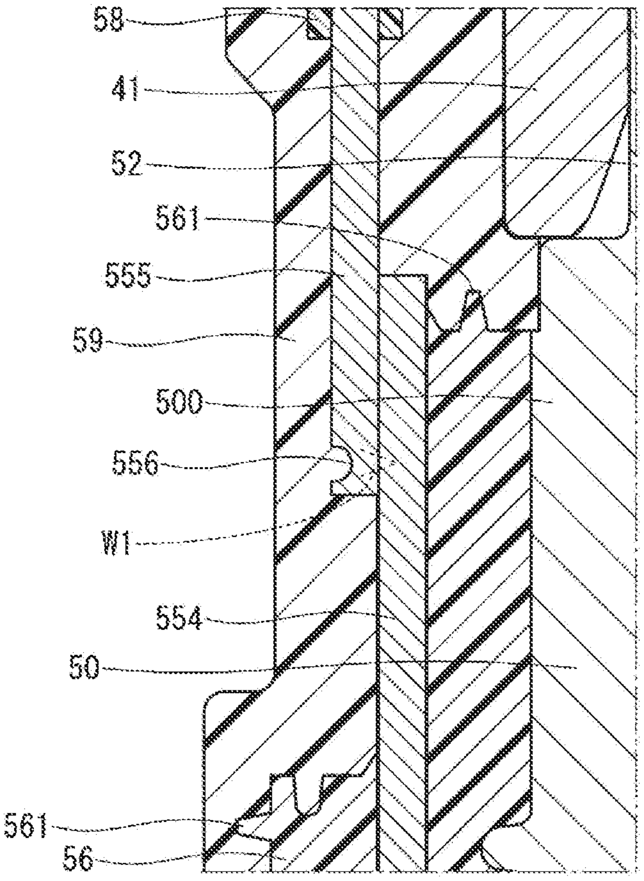
FIG. 53 is a sectional view illustrating part of the fuel injection valve according to the twentieth embodiment.

As illustrated in FIG. 53, the conduction portion 554 and the terminal 555 are welded by projection welding. A welded spot W1 is formed between the pressed hole portion 556 and the conduction portion 554. The terminal 555 and the conduction portion 554 are melted and cooled to form the welded spot W1.

Figure 54:
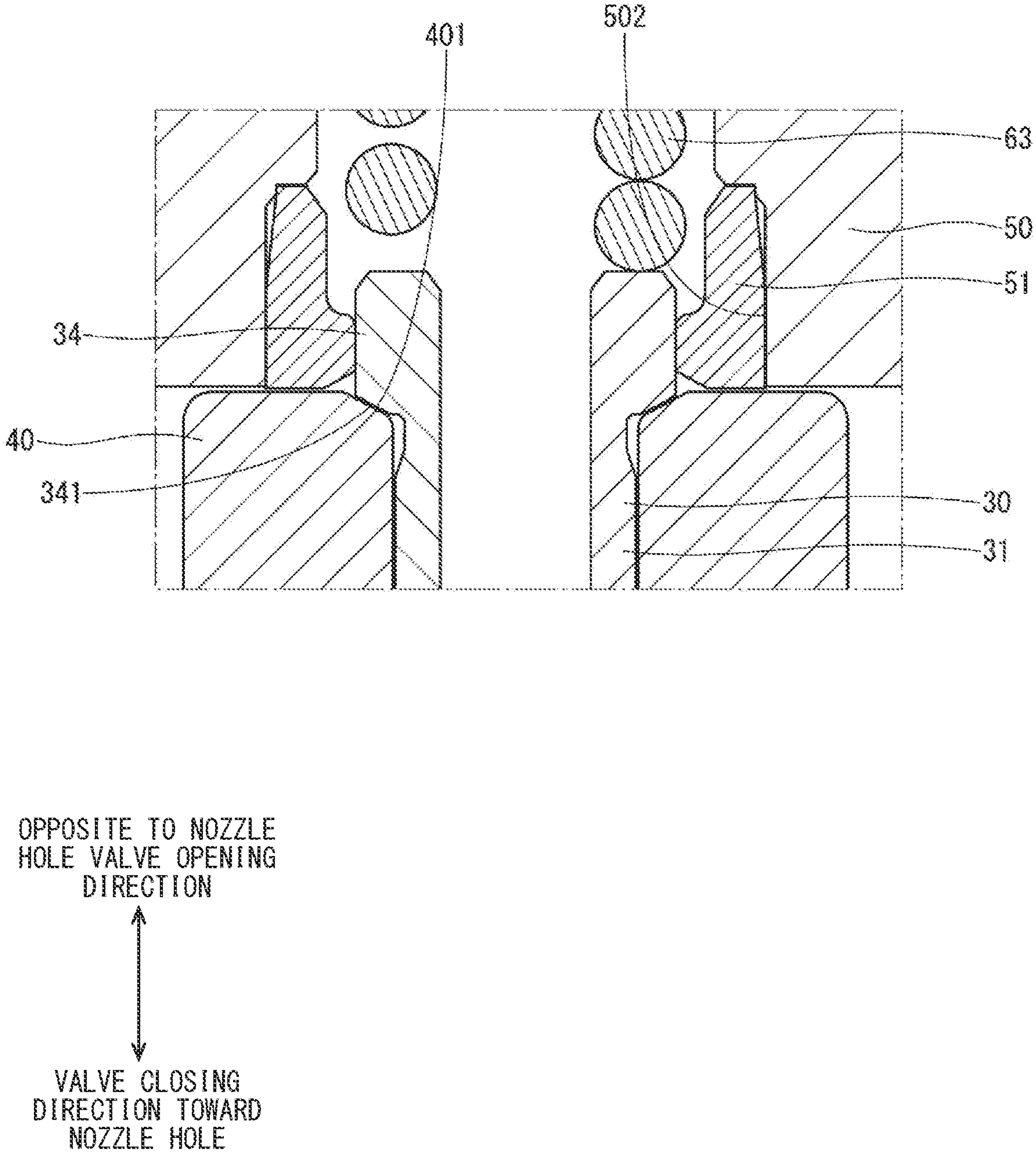
FIG. 54 is a sectional view illustrating part of the fuel injection valve according to the twentieth embodiment.

As illustrated in FIG. 54, a flange portion end face 341 is formed at the end of the flange portion 34 of the needle 30 toward the nozzle hole 13. The flange portion end face 341 is spherically formed into an SR shape. A tapered surface portion 401 is formed at the inner edge portion of the movable core 40 on the end face opposite to the nozzle hole 13. The tapered surface portion 401 is planarly tapered to approach the axis of the movable core 40 from the side opposite to the nozzle hole 13 toward the nozzle hole 13. The tapered surface portion 401 can touch the flange portion end face 341. The needle 30 may tilt against the movable core 40 when the fuel injection valve 1 operates. Even in such a case, a contact region between the movable core 40 and the flange portion 34 relatively shifts to maintain a fully circumferential contact between the flange portion end face 341 and the tapered surface portion 401. It is possible to inhibit the abrasion due to partial contact. The spherically shaped flange portion end face 341 can always maintain the same contact state between the flange portion end face 341 and the tapered surface portion 401. It is possible to inhibit the needle 30 from being axially displaced.

Figure 55:
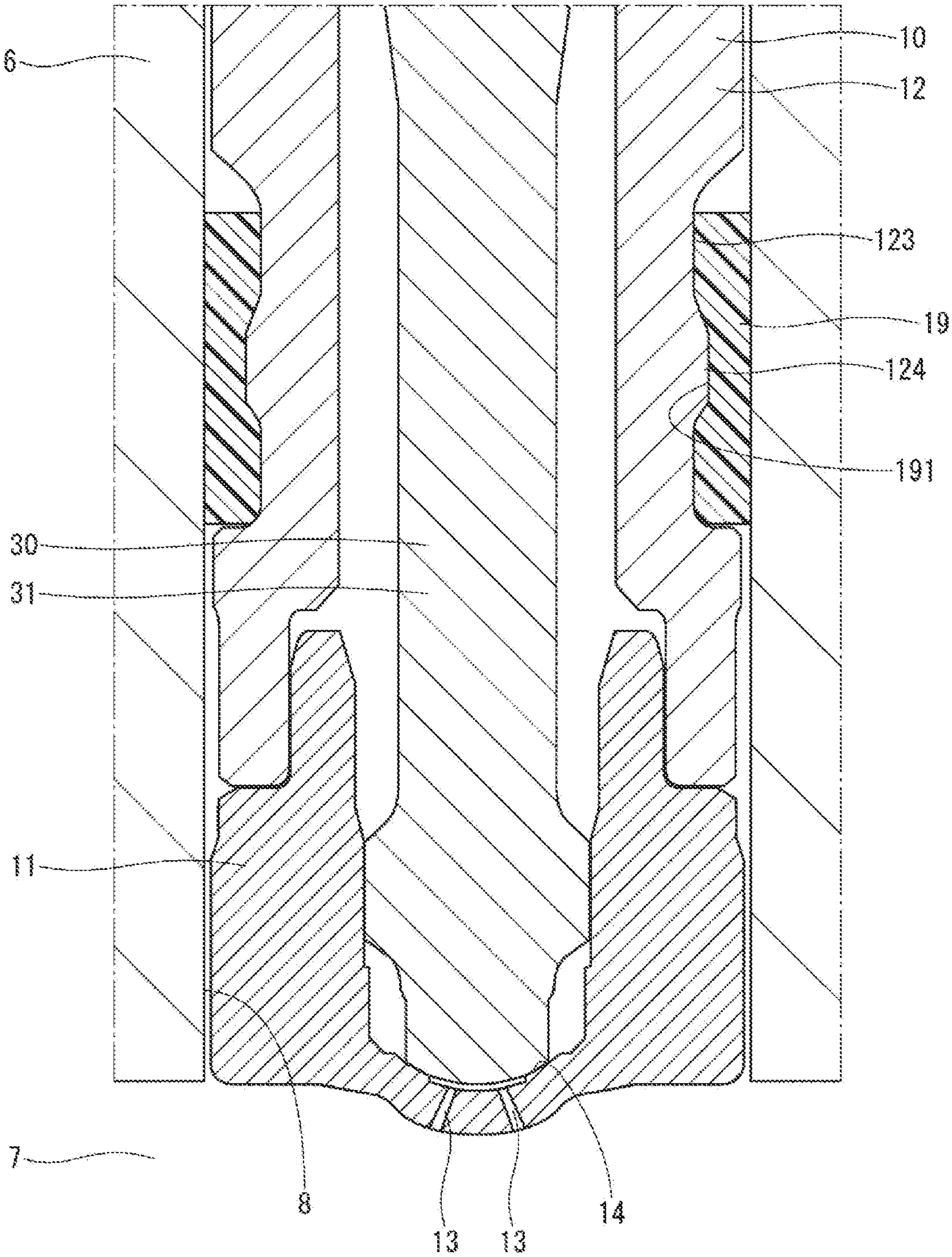
FIG. 55 is a sectional view illustrating part of the fuel injection valve according to the twentieth embodiment.

As illustrated in FIG. 55, the nozzle portion 10 is formed with a nozzle recessed portion 123 and a nozzle protruded portion 124. The nozzle recessed portion 123 is annularly formed to be radially inward recessed from the outer peripheral wall of the nozzle cylinder portion 12. The nozzle protruded portion 124 is annularly formed to protrude radially outward from the cylindrical bottom surface of the nozzle recessed portion 123. The end of the nozzle protruded portion 124 toward the nozzle hole 13 and the end thereof opposite to the nozzle hole 13 are planarly tapered.

A combustion gas seal 19 is provided radially outside the nozzle recessed portion 123 and the nozzle protruded portion 124. The combustion gas seal 19 is formed approximately cylindrically and is made of resin, for example. While the fuel injection valve 1 is provided for the head hole portion 8, the combustion gas seal 19 is radially compressed between the inner peripheral wall of the head hole portion 8 and the nozzle cylinder portion 12. The combustion gas seal 19 can inhibit the combustion gas generated in the combustion chamber 7 from flowing outside of the cylinder head 6 via the head hole portion 8.

Combustion pressure continuously acts on the combustion gas seal 19 in an environment of exposure to high-temperature combustion gas. The combustion gas seal 19 may deform or creep over time. For example, if the nozzle protruded portion 124 is not formed, the combustion gas seal 19 may move opposite to the combustion chamber 7 and may degrade sealing properties.

When the fuel injection valve 1 is provided for the head hole portion 8 according to the present embodiment, the nozzle protruded portion 124 engages the inner peripheral wall of the combustion gas seal 19. The inner peripheral wall of the combustion gas seal 19 is formed with a seal recessed portion 191 shaped along the shape of the nozzle protruded portion 124 (see FIG. 55). Even if the combustion gas seal 19 is subject to creep deformation, the seal recessed portion 191 engages the nozzle protruded portion 124, making it possible to inhibit the combustion gas seal 19 from moving opposite to the combustion chamber 7. It is possible to inhibit the combustion gas seal 19 from degrading sealing properties.

Other Embodiments

According to the third embodiment described above, the axial length of the inner member 81 is larger than the axial length of the outer member 85. According to the other embodiments, the axial length of the inner member 81 may be less than or equal to the axial length of the outer member 85.

According to the above-described embodiments, the end of the first tapered surface toward the nozzle hole is distant from the end of the second tapered surface toward the nozzle hole. According to the other embodiments, the end of the first tapered surface toward the nozzle hole may abut on the end of the second tapered surface toward the nozzle hole.

According to the fifth embodiment, consider the state before the intermediate member 95 is press-fitted between the inward extended portion 92 and the outward extended portion 93. Then, the inner and outer peripheral walls of the intermediate member 95 are tapered. The inner and outer peripheral walls of the upper housing 90 are tapered. The outer peripheral wall of the inward extended portion 92 and the inner peripheral wall of the outward extended portion 93 are tapered. According to the other embodiments, however, suppose the intermediate member 95 is press-fitted between the inward extended portion 92 and the outward extended portion 93. Then, the inward extended portion 92 is pressed radially inward or the outward extended portion 93 is pressed radially outward. The inner peripheral wall of the upper housing 90 closely adheres to the outer peripheral wall of the fixed core 50. The outer peripheral wall of the upper housing 90 closely adheres to the inner peripheral wall of the outer cylinder portion 21 of the housing 20. Under these conditions, the inner and outer peripheral walls of the intermediate member 95, the inner and outer peripheral walls of the upper housing 90, the outer peripheral wall of the inward extended portion 92, and the inner peripheral wall of the outward extended portion 93 may not only be tapered but also be formed into any shapes such as cylinders.

According to the fifth embodiment, the intermediate member 95 is made of a magnetic material. According to the other embodiments, however, the intermediate member 95 may be made of a non-magnetic material.

According to the sixth embodiment, the inner and outer peripheral walls of the upper housing 90 are tapered before the upper housing 90 is press-fitted between the fixed core 50 and the housing 20. According to the other embodiments, however, suppose the upper housing 90 is press-fitted between the fixed core 50 and the housing 20. Then, the inner peripheral wall of the upper housing 90 closely adheres to the outer peripheral wall of the fixed core 50. The outer peripheral wall of the upper housing 90 closely adheres to the inner peripheral wall of the outer cylinder portion 21 of the housing 20. Under these conditions, the inner and outer peripheral walls of the upper housing 90 may not only be tapered but also be formed into any shapes such as cylinders.

According to the above-described embodiments, the upper housing is provided so that the outer peripheral wall at the end on the side of the nozzle hole is distant from the inner peripheral wall at the outer cylinder portion 21 of the housing 20. Alternatively, the upper housing is provided so that the inner peripheral wall at the end on the side of the nozzle hole is distant from the outer peripheral wall of the fixed core 50. According to the other embodiments, however, the upper housing may be provided so that the outer peripheral wall at the end toward the nozzle hole abuts on the inner peripheral wall of the outer cylinder portion 21 of the housing 20. Alternatively, the upper housing may be provided so that the inner peripheral wall at the end toward the nozzle hole abuts on the outer peripheral wall of the fixed core 50.

According to the above-described embodiments, the upper housing includes the cutout portion at the circumferential part and is C-shaped when viewed in the axial direction. According to the other embodiments, however, the upper housing may not include the cutout portion at the circumferential part and may be annularly shaped when viewed in the axial direction.

According to the second through fourth referential modes, the ring protrusion portion 791 is formed at the axial center of the inner peripheral wall of the magnetic ring 79. According to the other embodiments, however, the ring protrusion portion 791 may be formed at the end of the magnetic ring 79 toward or opposite to the nozzle hole 13 in the axial direction of the inner peripheral wall of the magnetic ring 79.

The present disclosure is not limited to the above-mentioned embodiments but may be variously modified without departing from the spirit and scope of the invention.

The present disclosure has been described based on the embodiments. However, the disclosure is not limited to the embodiments and the structures. The disclosure includes various modifications and modifications within a comparable scope. Besides, the category or the scope of the idea of the disclosure covers various combinations or forms and the other combinations or forms including only one element or more or less in the former.

What is claimed is:

1. A fuel injection valve comprising:

a nozzle portion having a nozzle hole to inject fuel and a valve seat formed around the nozzle hole;

a housing that is cylindrical and connected to an opposite side of the nozzle portion from the nozzle hole;

a needle configured to separate from and abut on the valve seat at one end to open and close the nozzle hole;

a movable core provided to the needle;

a fixed core that is cylindrical and provided on an opposite side of the movable core from the nozzle hole, the fixed core being at least partially positioned radially inside the housing at a part in an axial direction;

a coil provided between the fixed core and the housing and configured to, when energized, attract the movable core with the needle toward the fixed core; and an upper housing provided between the fixed core and the housing and positioned on an opposite side of the coil from the nozzle hole, the upper housing configured to form a magnetic circuit with the fixed core and the housing, wherein the upper housing has a first tapered surface and a first cylindrical surface, the first tapered surface is formed on one of outer and inner peripheral walls, the first cylindrical surface is formed on an other of the outer and inner peripheral walls, one of the housing and the fixed core has a second tapered surface that radially faces the first tapered surface, an other of the housing and the fixed core has a second cylindrical surface that radially faces the first cylindrical surface, the second cylindrical surface is formed on the fixed core, the second tapered surface is formed on the housing, each of the first tapered surface and the second tapered surface is tapered, such that a diameter thereof reduces from an opposite side of the nozzle hole toward a side of the nozzle hole, and the upper housing is made of a magnetic material in an annular shape or a C-shape.

2. A fuel injection valve comprising:

a nozzle portion having a nozzle hole to inject fuel and a valve seat formed around the nozzle hole;

a housing that is cylindrical and connected to an opposite side of the nozzle portion from the nozzle hole;

a needle configured to separate from and abut on the valve seat at one end to open and close the nozzle hole;

a movable core provided to the needle;

a fixed core that is cylindrical and provided on an opposite side of the movable core from the nozzle hole, the fixed core being at least partially positioned radially inside the housing at a part in an axial direction;

a coil provided between the fixed core and the housing and configured to, when energized, attract the movable core with the needle toward the fixed core; and an upper housing provided between the fixed core and the housing and positioned on an opposite side of the coil from the nozzle hole, the upper housing configured to form a magnetic circuit with the fixed core and the housing, wherein the upper housing has a first tapered surface and a first cylindrical surface, the first tapered surface is formed on one of outer and inner peripheral walls, the first cylindrical surface is formed on an other of the outer and inner peripheral walls, one of the housing and the fixed core has a second tapered surface that radially faces the first tapered surface, an other of the housing and the fixed core has a second cylindrical surface that radially faces the first cylindrical surface, the second cylindrical surface is formed on the housing, the second tapered surface is formed on the fixed core, each of the first tapered surface and the second tapered surface is tapered, such that a diameter thereof reduces from a side of the nozzle hole toward an opposite side of the nozzle hole, and the upper housing is made of a magnetic material in an annular shape or a C-shape.

3. The fuel injection valve according to claim 1, wherein when the first tapered surface and the second tapered surface do not radially face each other, an inner diameter of the first cylindrical surface is larger than an outer diameter of the second cylindrical surface, or an outer diameter of the first cylindrical surface is smaller than an inner diameter of the second cylindrical surface, and when the first tapered surface and the second tapered surface face radially face each other, the first cylindrical surface abuts on the second cylindrical surface.

4. A fuel injection valve comprising:

a nozzle portion having a nozzle hole to inject fuel and a valve seat formed around the nozzle hole;

a housing that is cylindrical and connected to an opposite side of the nozzle portion from the nozzle hole;

a needle configured to separate from and abut on the valve seat at one end to open and close the nozzle hole;

a movable core provided to the needle;

a fixed core that is cylindrical and provided on an opposite side of the movable core from the nozzle hole, the fixed core being at least partially positioned radially inside the housing at a part in an axial direction;

a coil provided between the fixed core and the housing and configured to, when energized, attract the movable core with the needle toward the fixed core; and an upper housing provided between the fixed core and the housing and provided on an opposite side of the coil from the nozzle hole, the upper housing configured to form a magnetic circuit with the fixed core and the housing, wherein the upper housing includes an inner member and an outer member provided radially outside the inner member, the inner member has a first tapered surface formed on an outer peripheral wall and a first cylindrical surface formed on an inner peripheral wall, the outer member has a second tapered surface formed on the inner peripheral wall to radially face the first tapered surface and a second cylindrical surface formed on the outer peripheral wall, the fixed core has a third cylindrical surface that radially faces the first cylindrical surface, the housing has a fourth cylindrical surface that radially faces the second cylindrical surface, and the upper housing is made of a magnetic material in an annular shape or a C-shape.

5. The fuel injection valve according to claim 4, wherein when the first tapered surface and the second tapered surface do not radially face each other, an inner diameter of the first cylindrical surface is larger than an outer diameter of the third cylindrical surface, or an outer diameter of the second cylindrical surface is smaller than an inner diameter of the fourth cylindrical surface, and when the first tapered surface and the second tapered surface radially face each other, the first cylindrical surface abuts on the third cylindrical surface, or the second cylindrical surface abuts on the fourth cylindrical surface.

6. The fuel injection valve according to claim 4, wherein a length of the inner member in the axial direction is greater than a length of the outer member in the axial direction.

7. The fuel injection valve according to claim 1, an end of the first tapered surface on a side of the nozzle hole is distant from an end of the second tapered surface on the side of the nozzle hole.

8. A fuel injection valve comprising:

a nozzle portion having a nozzle hole to inject fuel and a valve seat formed around the nozzle hole;

a housing that is cylindrical and connected to an opposite side of the nozzle portion from the nozzle hole;

a needle configured to separate from and abut on the valve seat at one end to open and close the nozzle hole;

a movable core provided to the needle;

a fixed core that is cylindrical and provided on an opposite side of the movable core from the nozzle hole, the fixed core being at least partially positioned radially inside the housing at a part in an axial direction;

a coil provided between the fixed core and the housing and configured to, when energized, attract the movable core with the needle toward the fixed core; and an upper housing provided between the fixed core and the housing and provided on an opposite side of the coil from the nozzle hole, the upper housing configured to form a magnetic circuit with the fixed core and the housing, wherein the upper housing includes a bottom portion, an inward extended portion, and an outward extended portion, the inward extended portion is formed to extend from an inner edge portion of the bottom portion in the axial direction of the bottom portion, the outward extended portion is formed to extend from an outer edge portion of the bottom portion in the axial direction of the bottom portion, and the upper housing is made of a magnetic material in an annular shape or a C-shape.

9. The fuel injection valve according to claim 8, further comprising:

an intermediate member provided between the inward extended portion and the outward extended portion.

10. The fuel injection valve according to claim 9, wherein the intermediate member is provided to press the inward extended portion inward in a radial direction of the bottom portion.

11. The fuel injection valve according to claim 9, wherein the intermediate member is provided to press the outward extended portion outward in a radial direction of the bottom portion.

12. The fuel injection valve according to claim 9, wherein the intermediate member is configured to form a magnetic circuit with the fixed core and the housing.

13. The fuel injection valve according to claim 1, wherein the upper housing is provided such that an outer peripheral wall at an end on a side of the nozzle hole is distant from an inner peripheral wall of the housing, or an inner peripheral wall at an end on the side of the nozzle hole is distant from an outer peripheral wall at the fixed core.

14. The fuel injection valve according to claim 1, wherein the upper housing includes a cutout portion at a part in a circumferential direction and is C-shaped when viewed in the axial direction.

* * * * *